Jan. 6, 1953     A. H. DICKINSON ET AL     2,624,508
ELECTRONIC DIVIDING AND MULTIPLYING APPARATUS
Filed Oct. 22, 1946     33 Sheets-Sheet 1
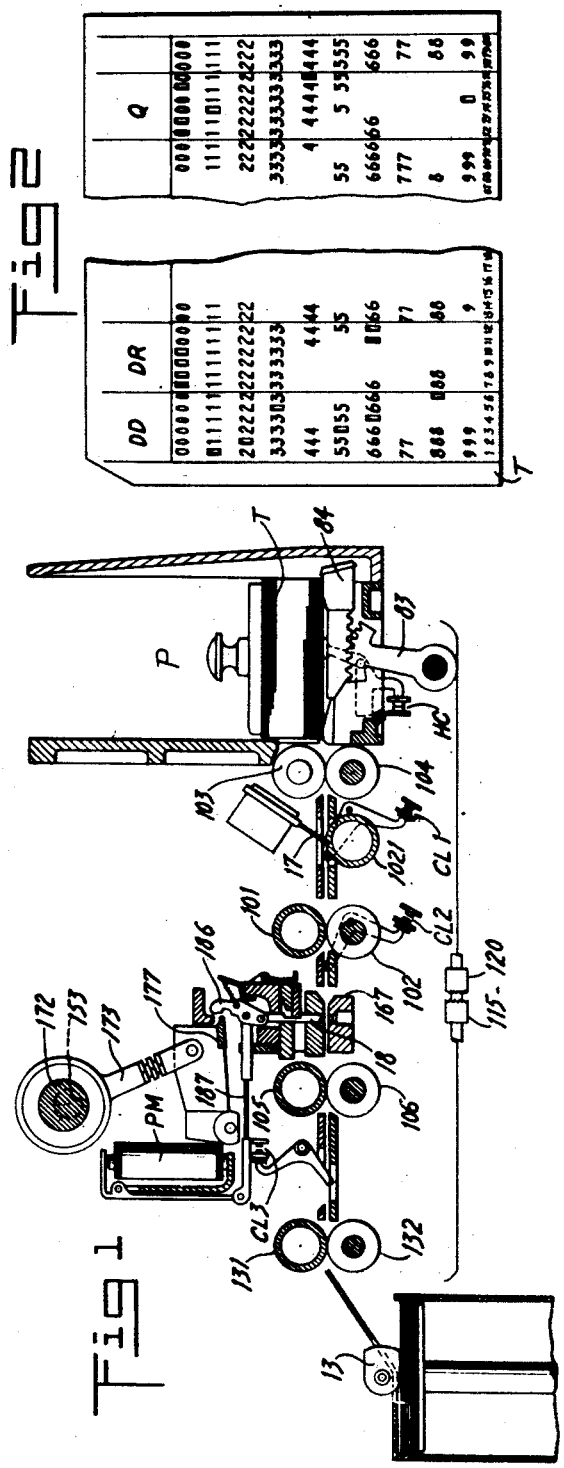
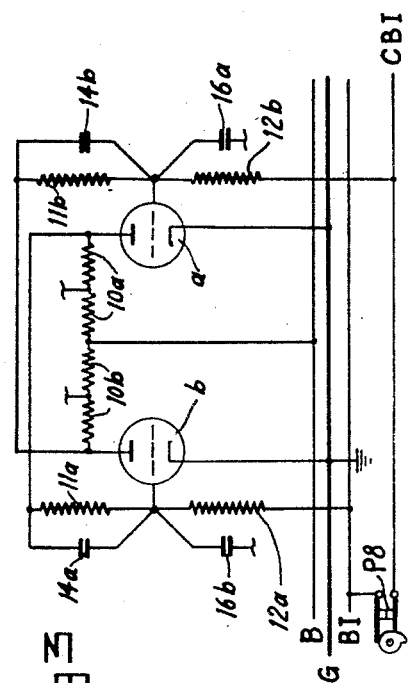
INVENTORS
A. H. DICKINSON
B. E. PHELPS
C. A. BERGFORS
BY
ATTORNEY Jan. 6, 1953  A. H. DICKINSON ET AL  2,624,508
ELECTRONIC DIVIDING AND MULTIPLYING APPARATUS
Filed Oct. 22, 1946  33 Sheets-Sheet 2

INVENTORS
A. H. DICKINSON
B. E. PHELPS
C. A. BERGFORS
BY
ATTORNEY

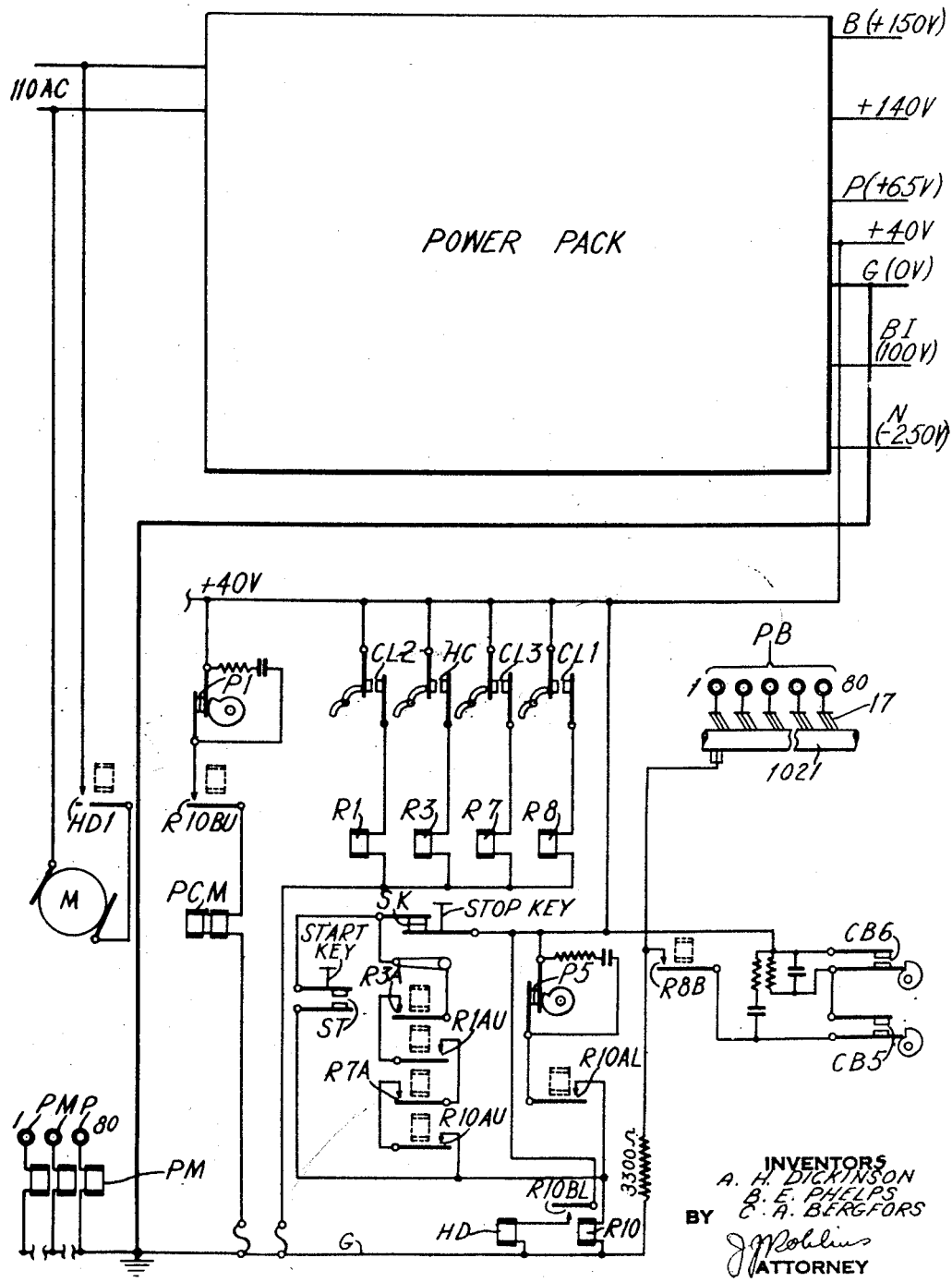

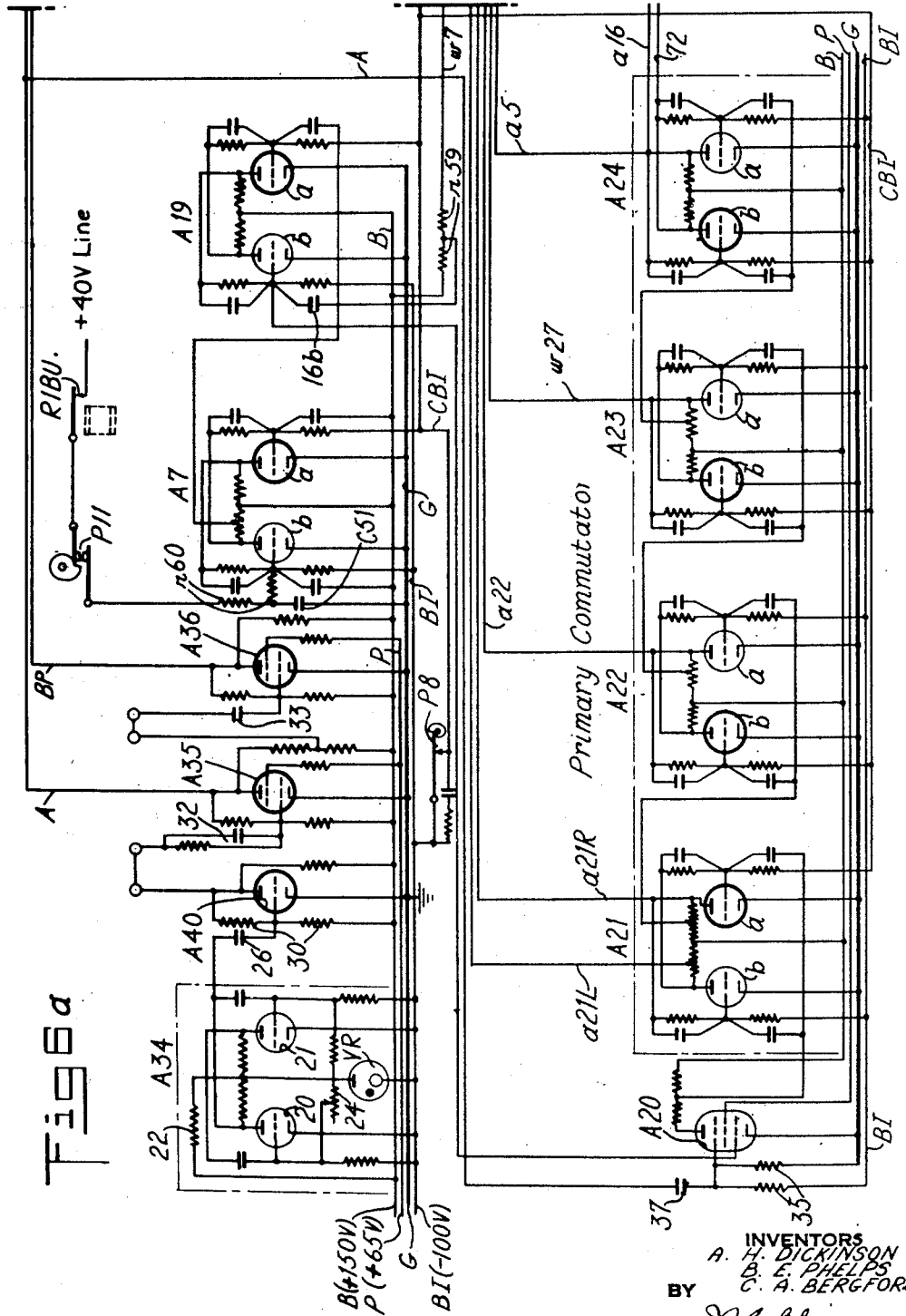

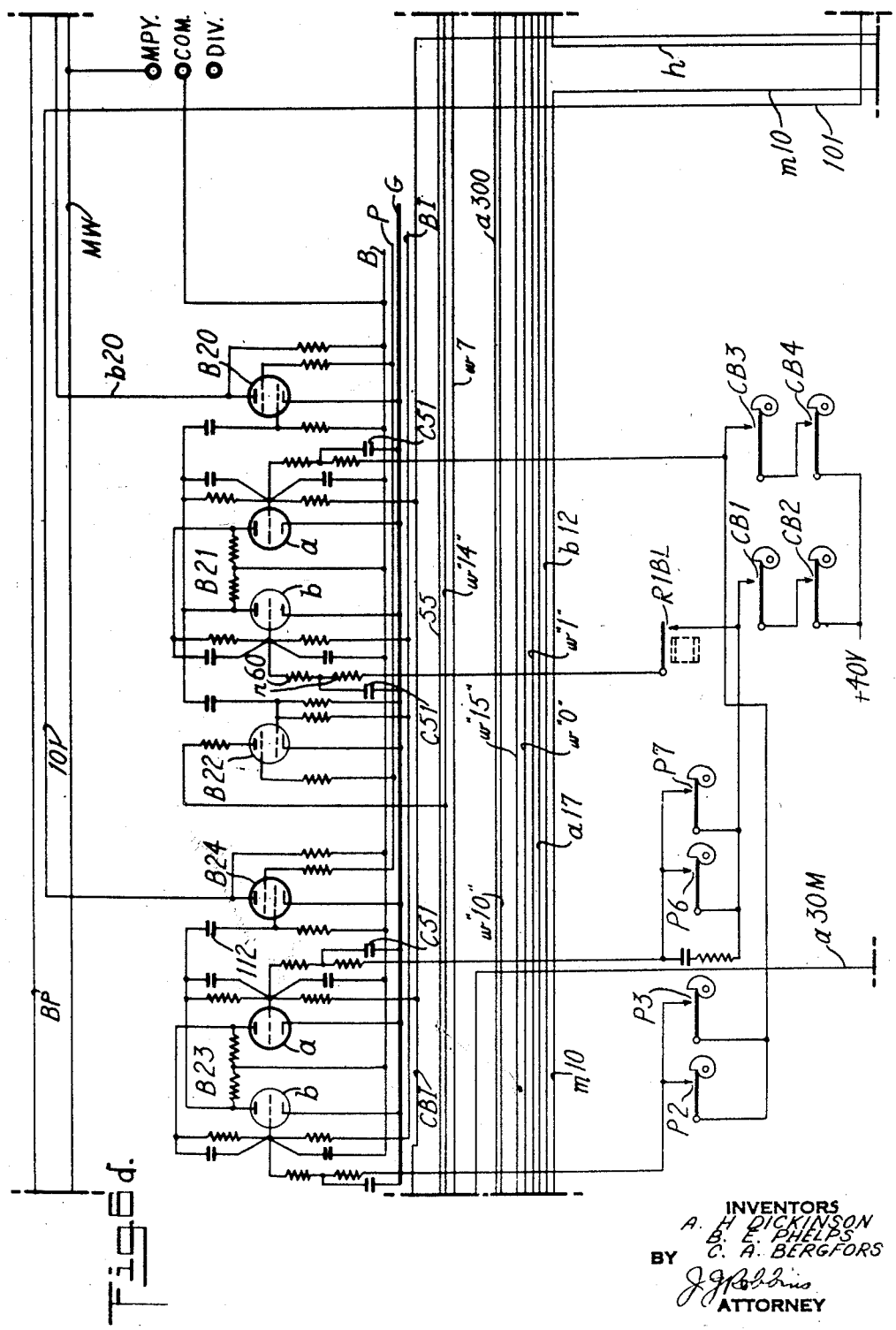

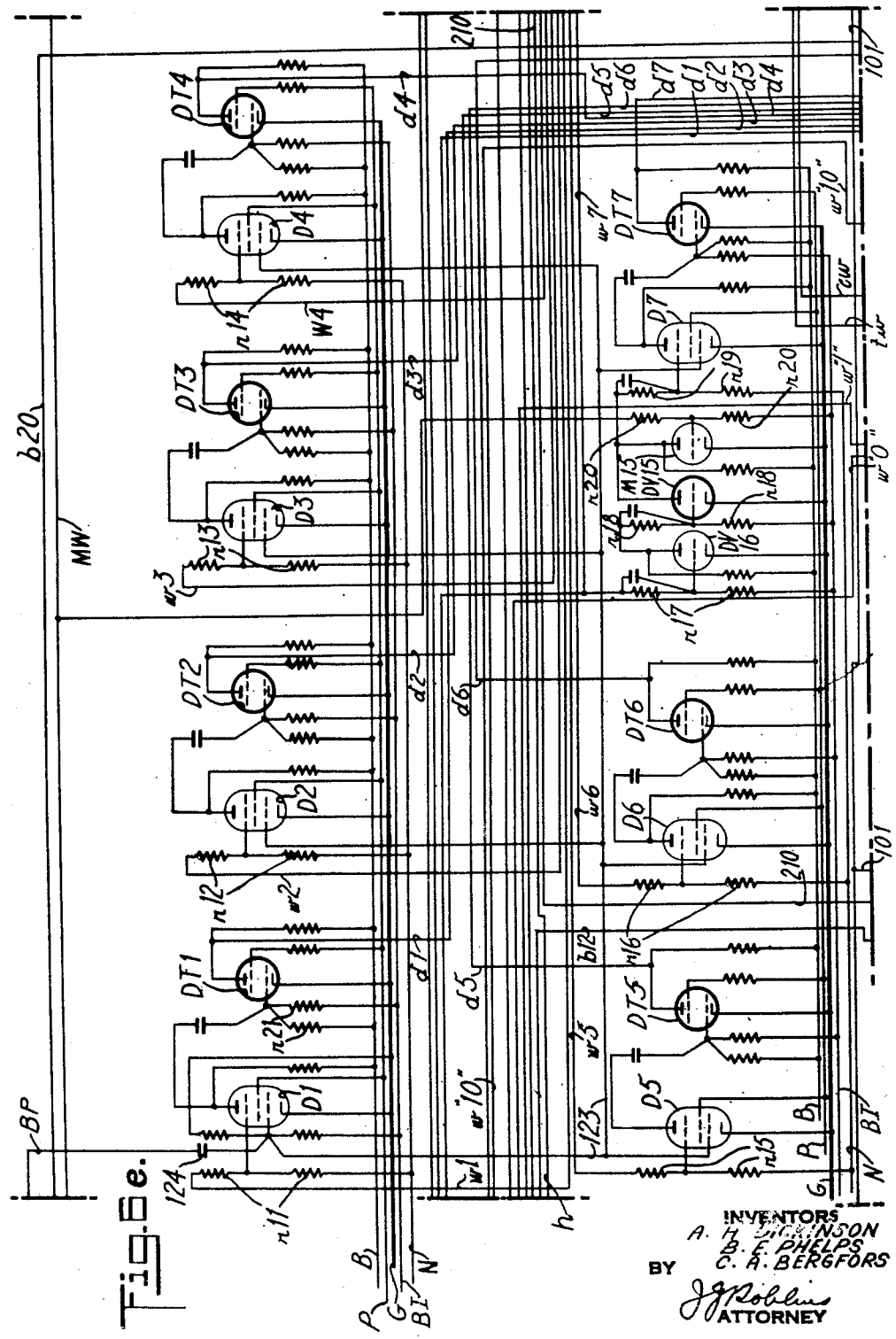

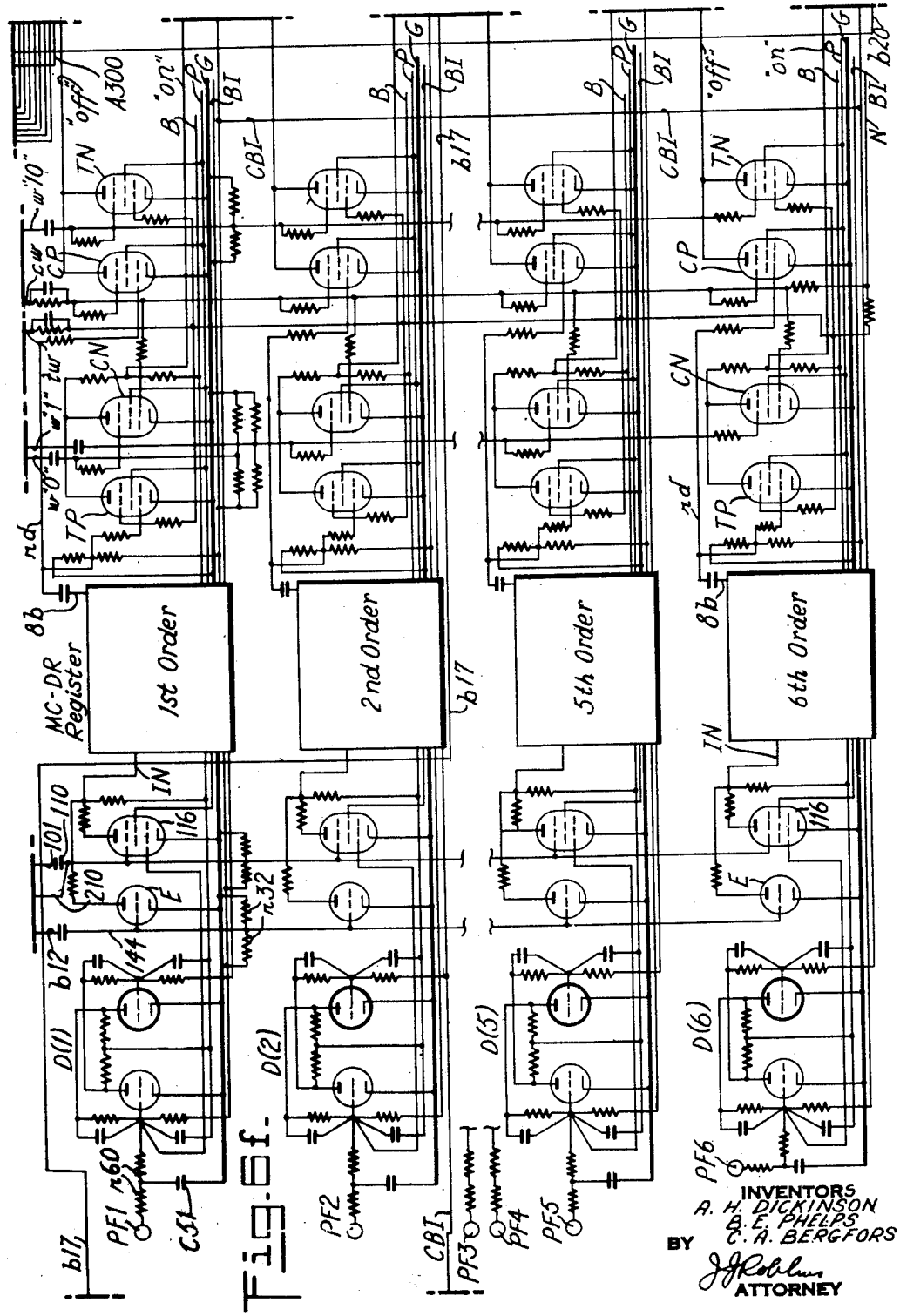

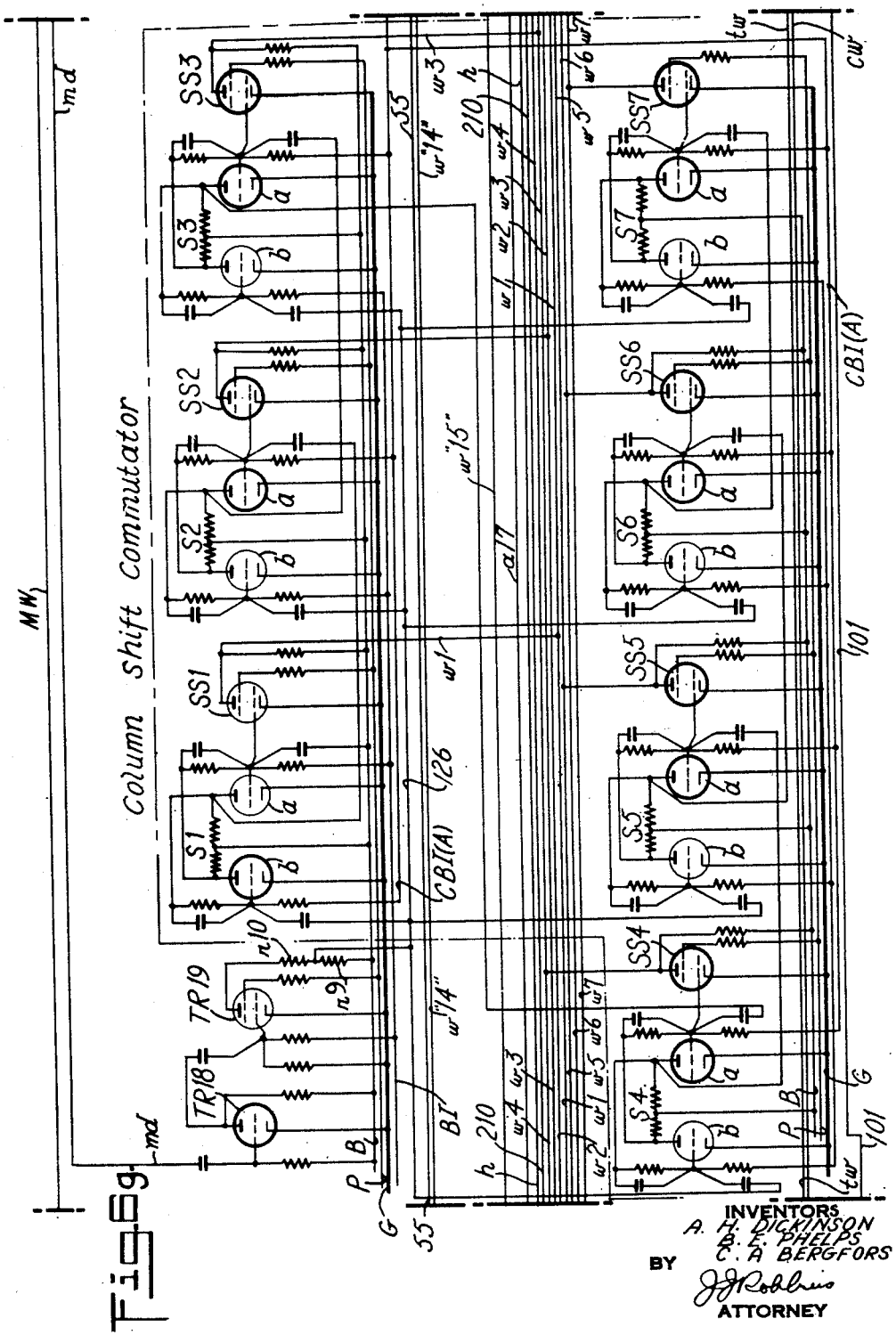

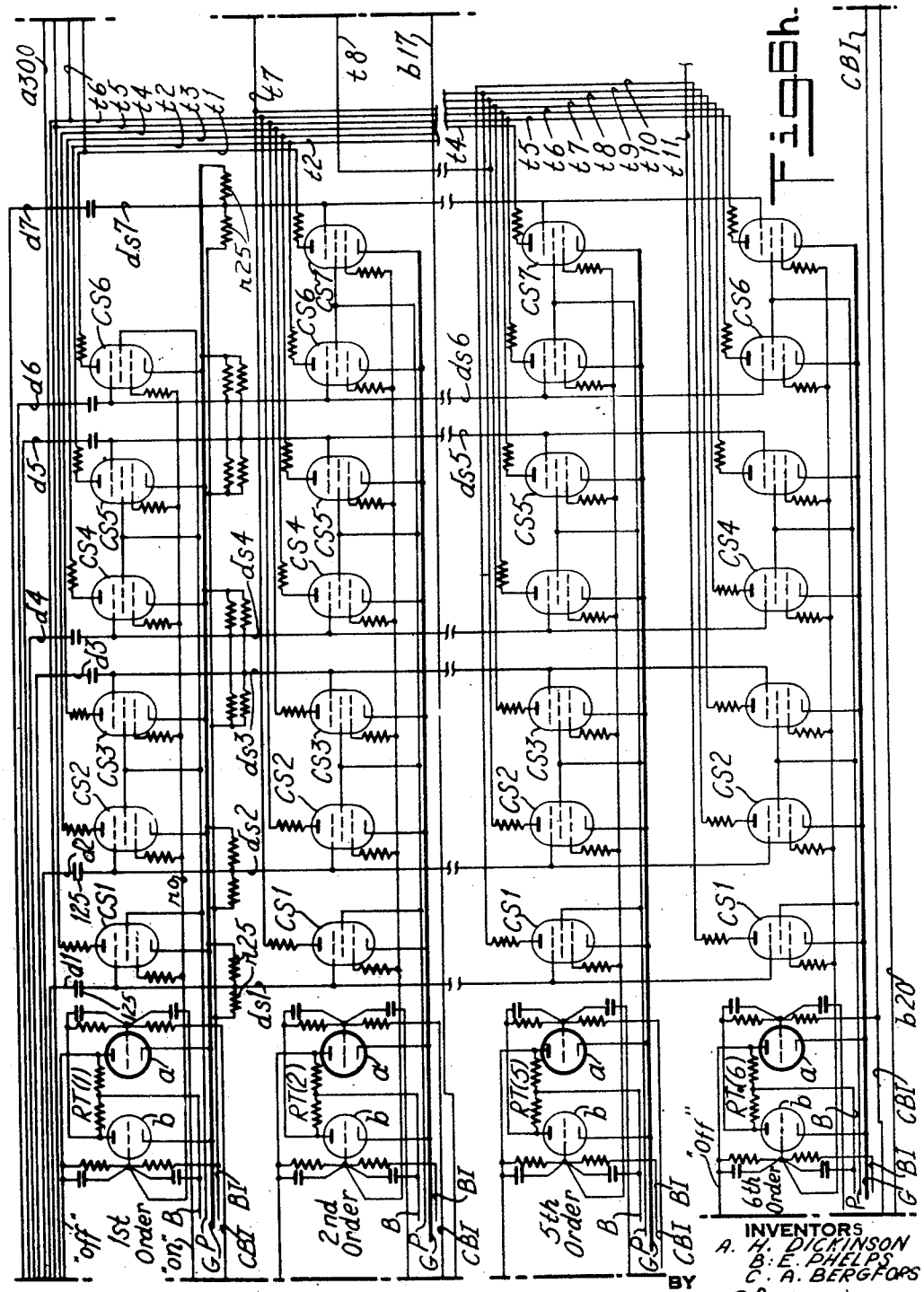

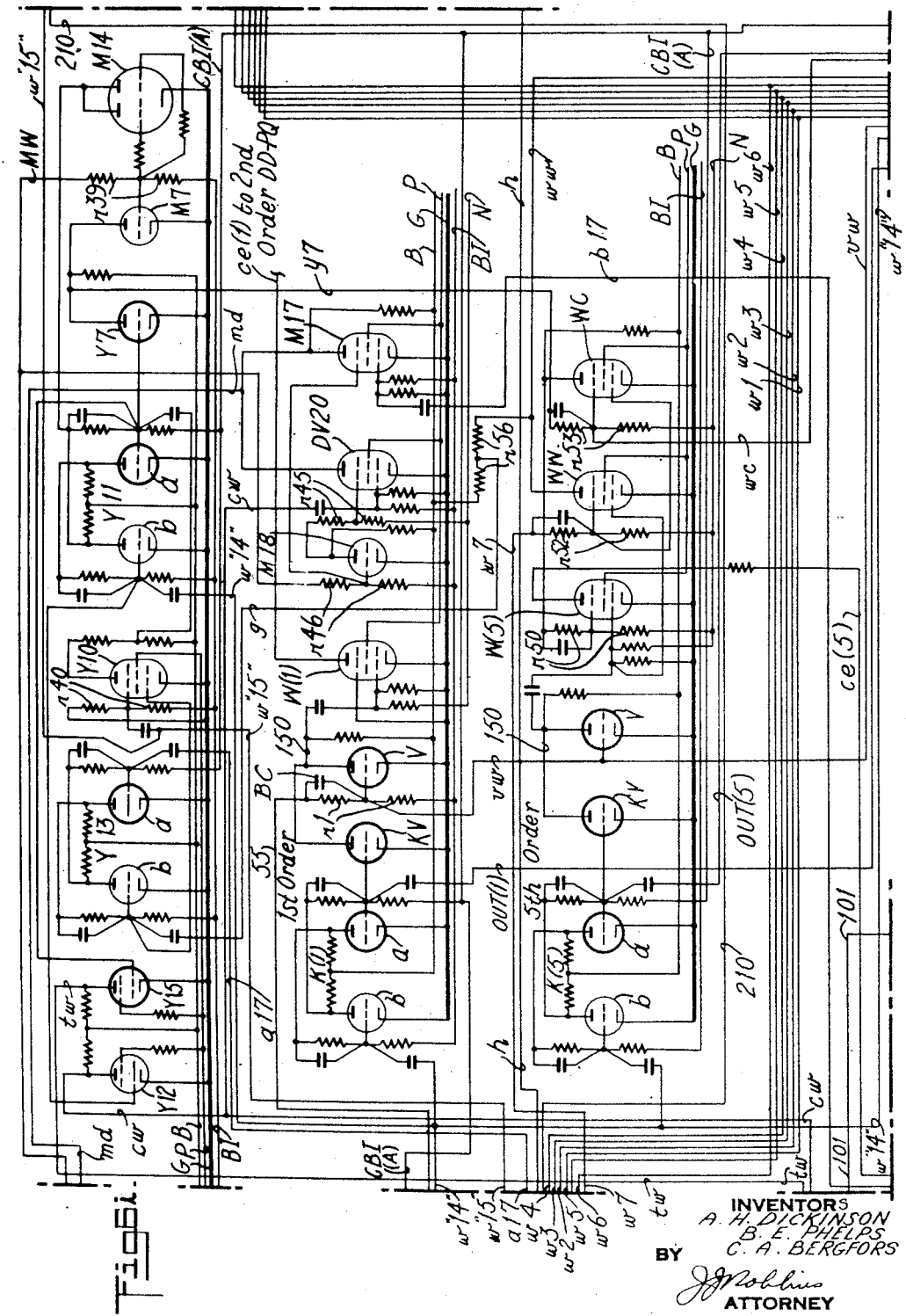

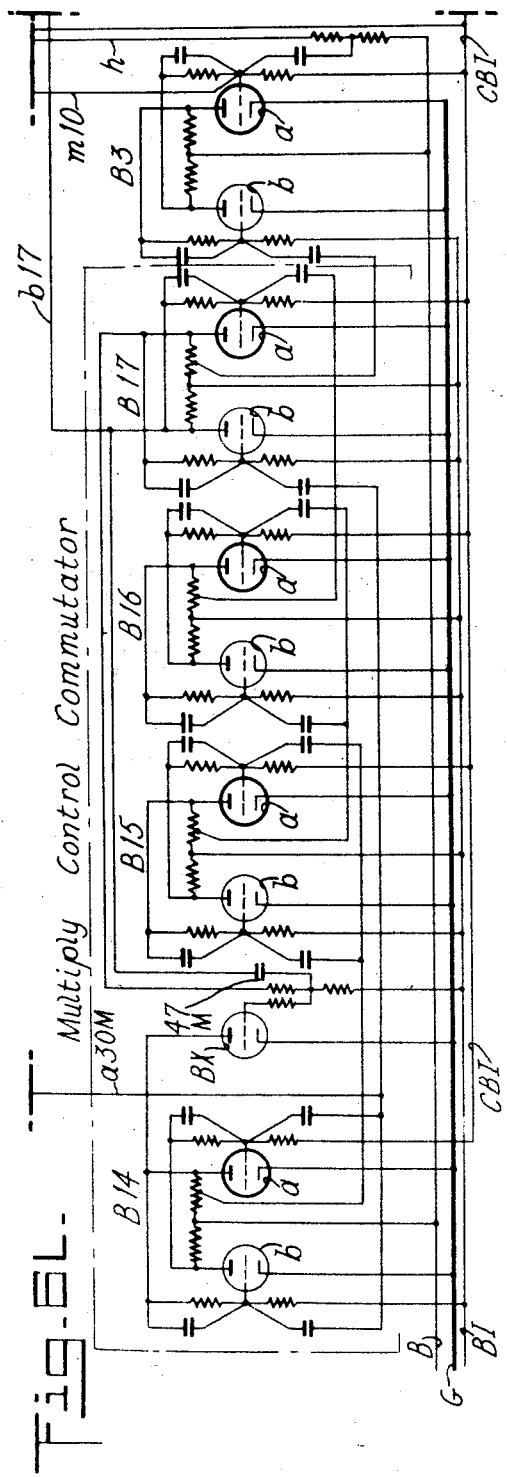

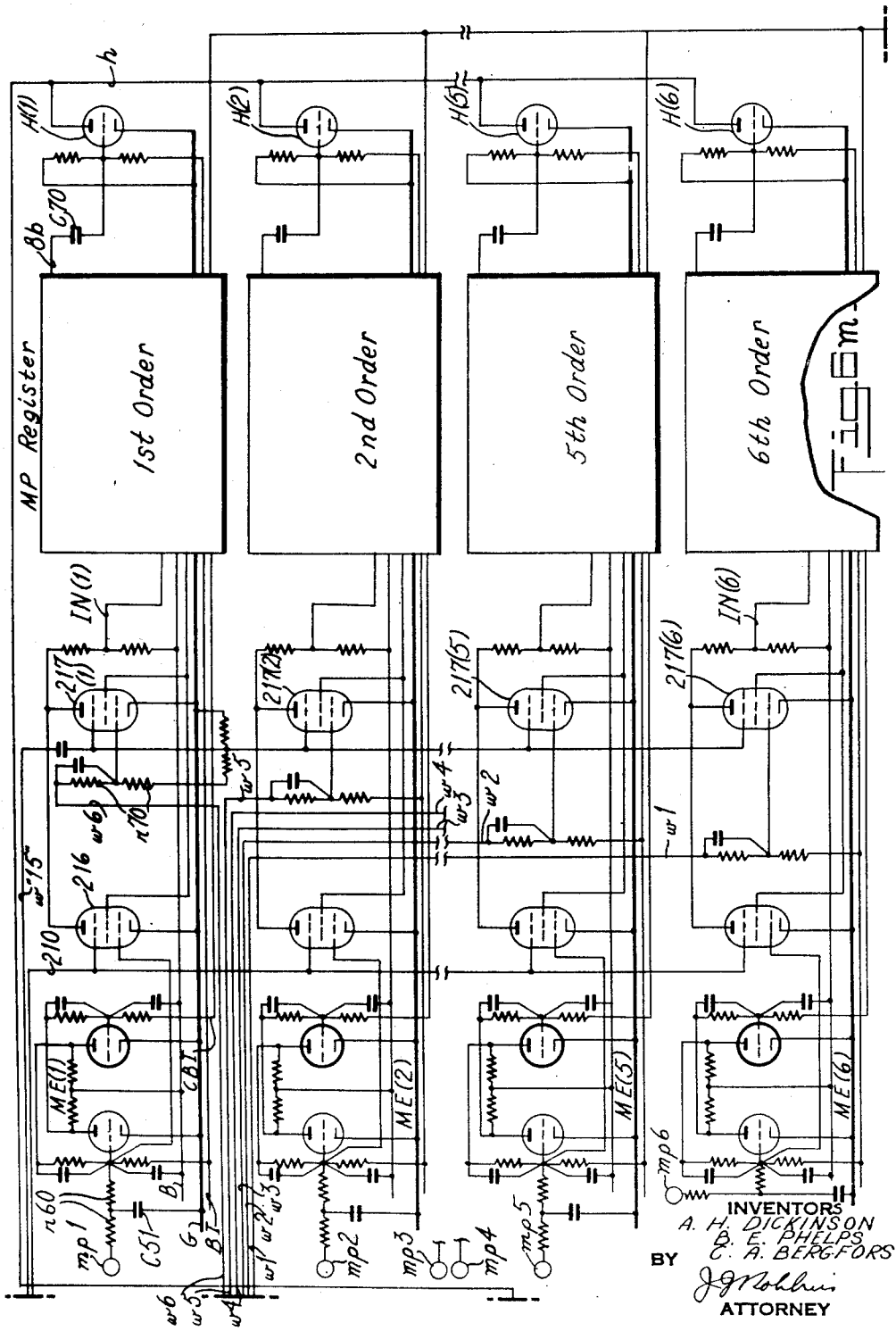

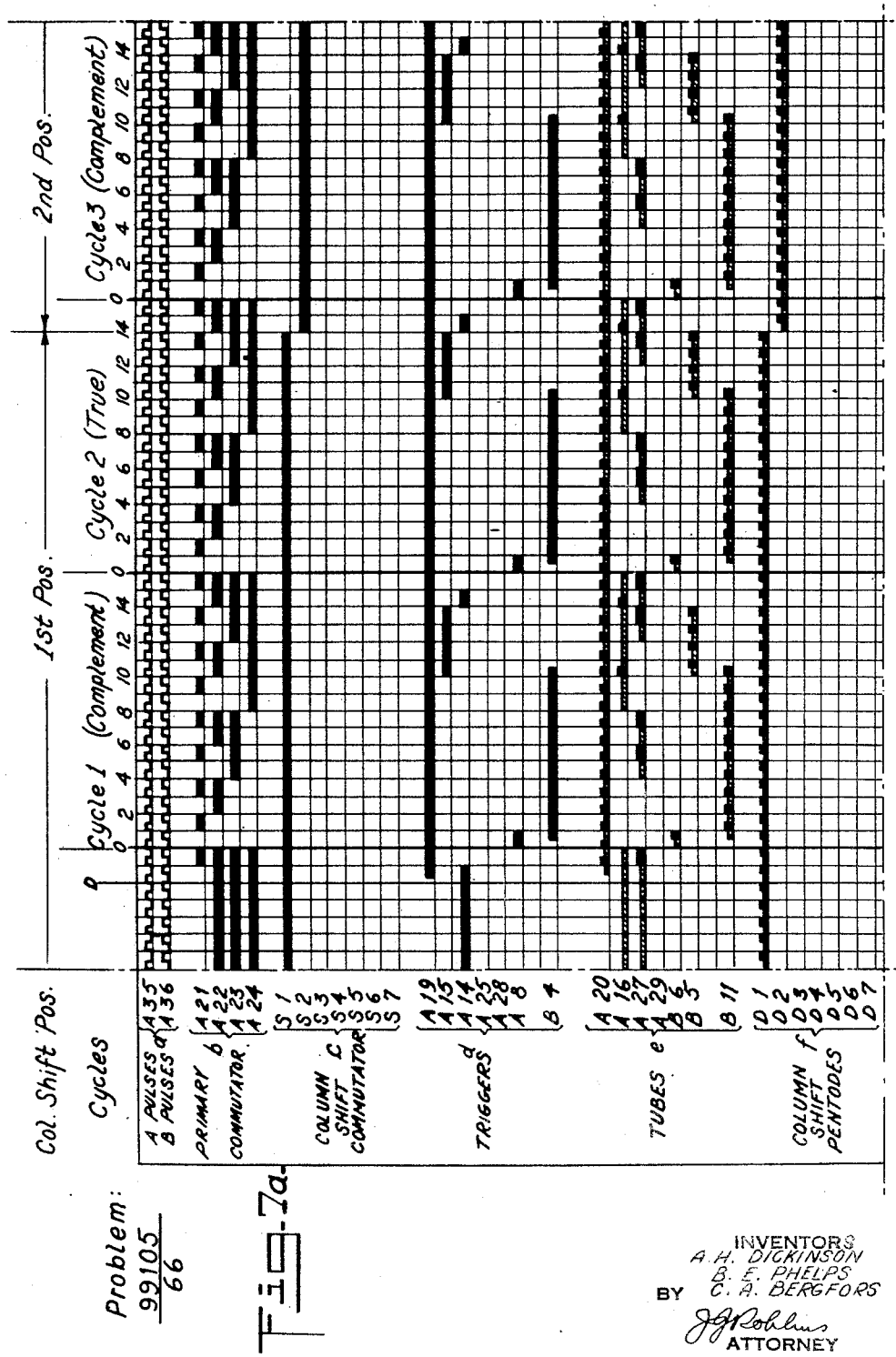

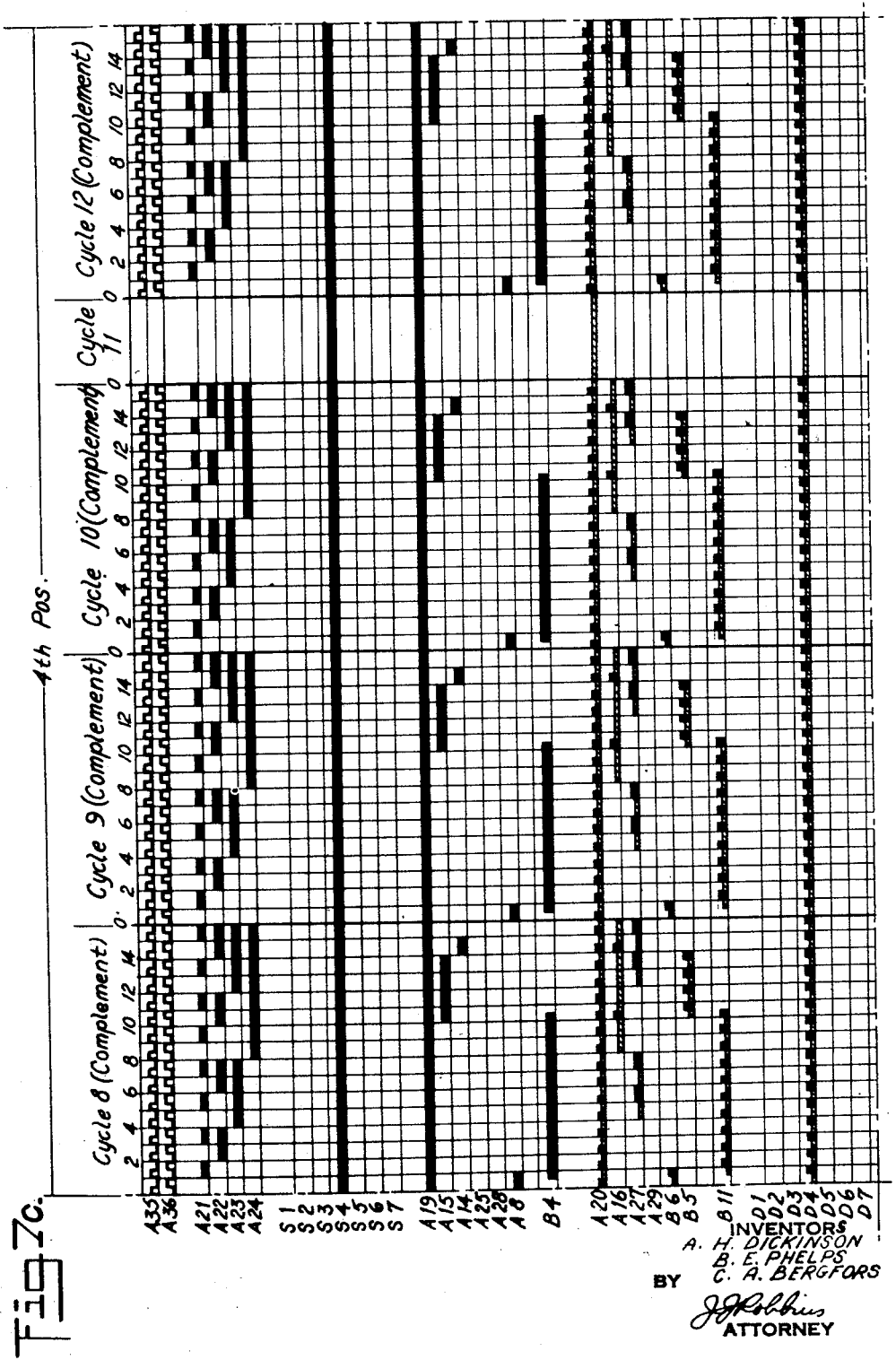

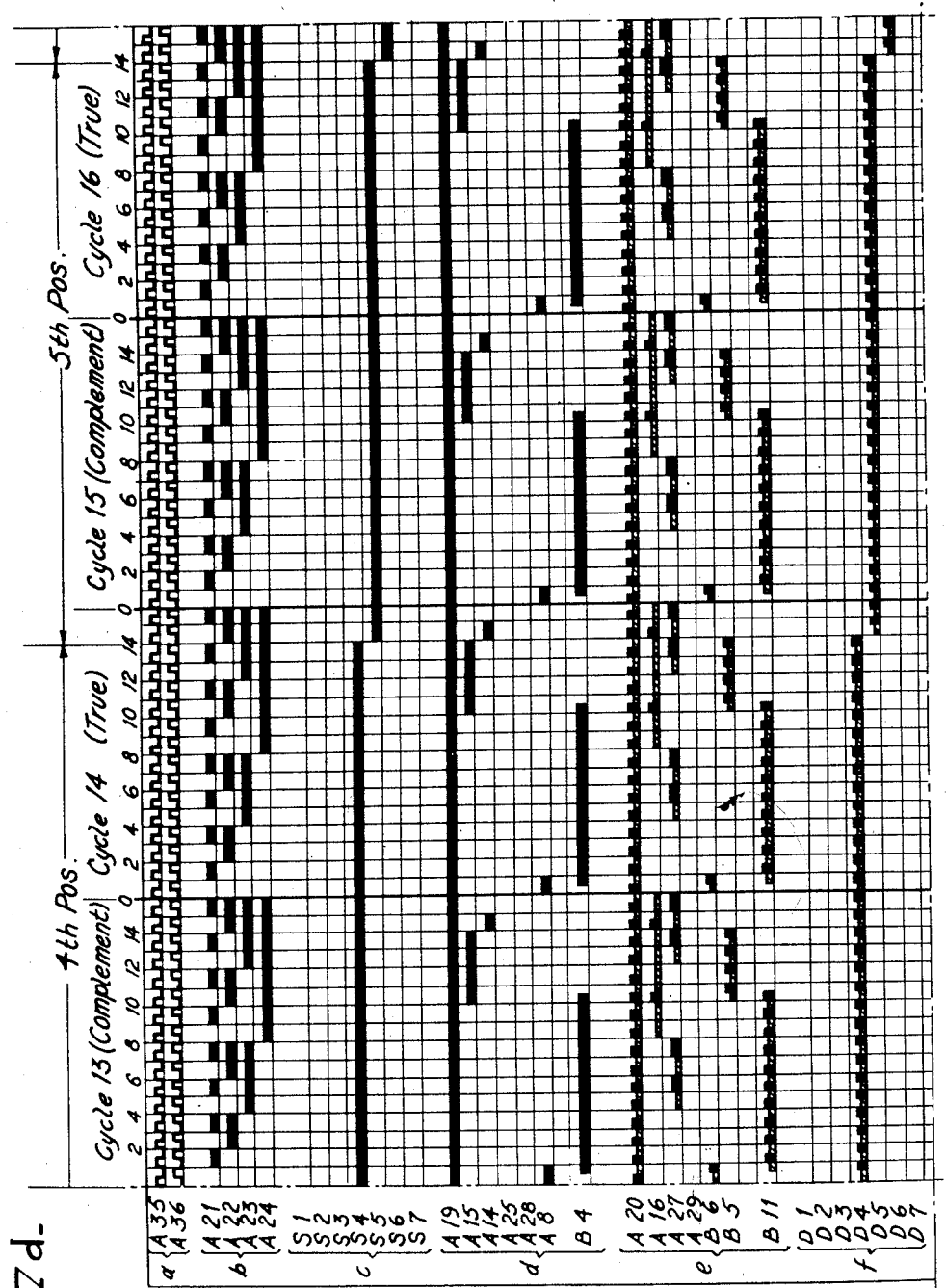

Jan. 6, 1953 A. H. DICKINSON ET AL 2,624,508
ELECTRONIC DIVIDING AND MULTIPLYING APPARATUS
Filed Oct. 22, 1946 33 Sheets-Sheet 22

Fig. 7e.

INVENTORS
A. H. DICKINSON
B. E. PHELPS
C. A. BERGFORS
BY
ATTORNEY

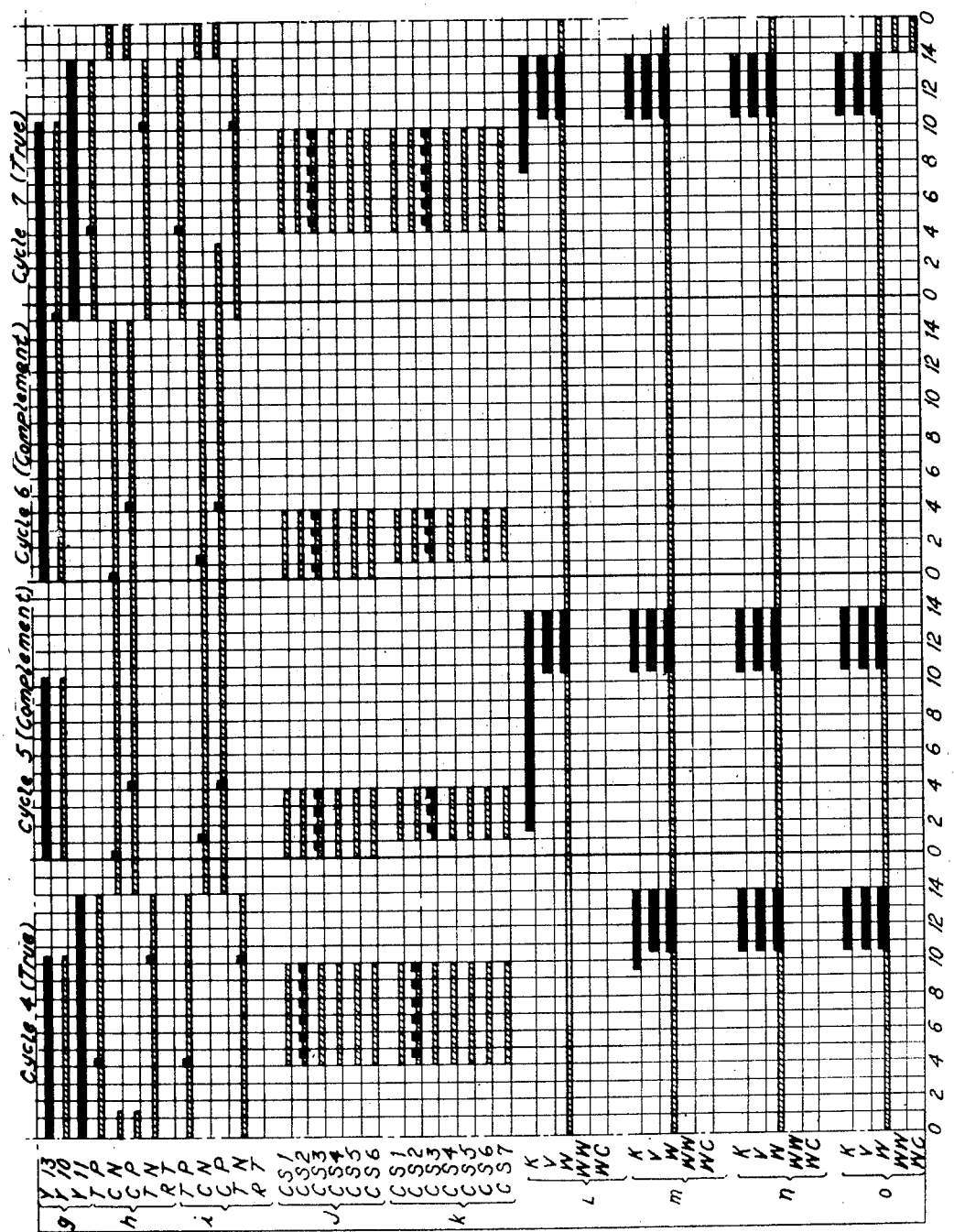

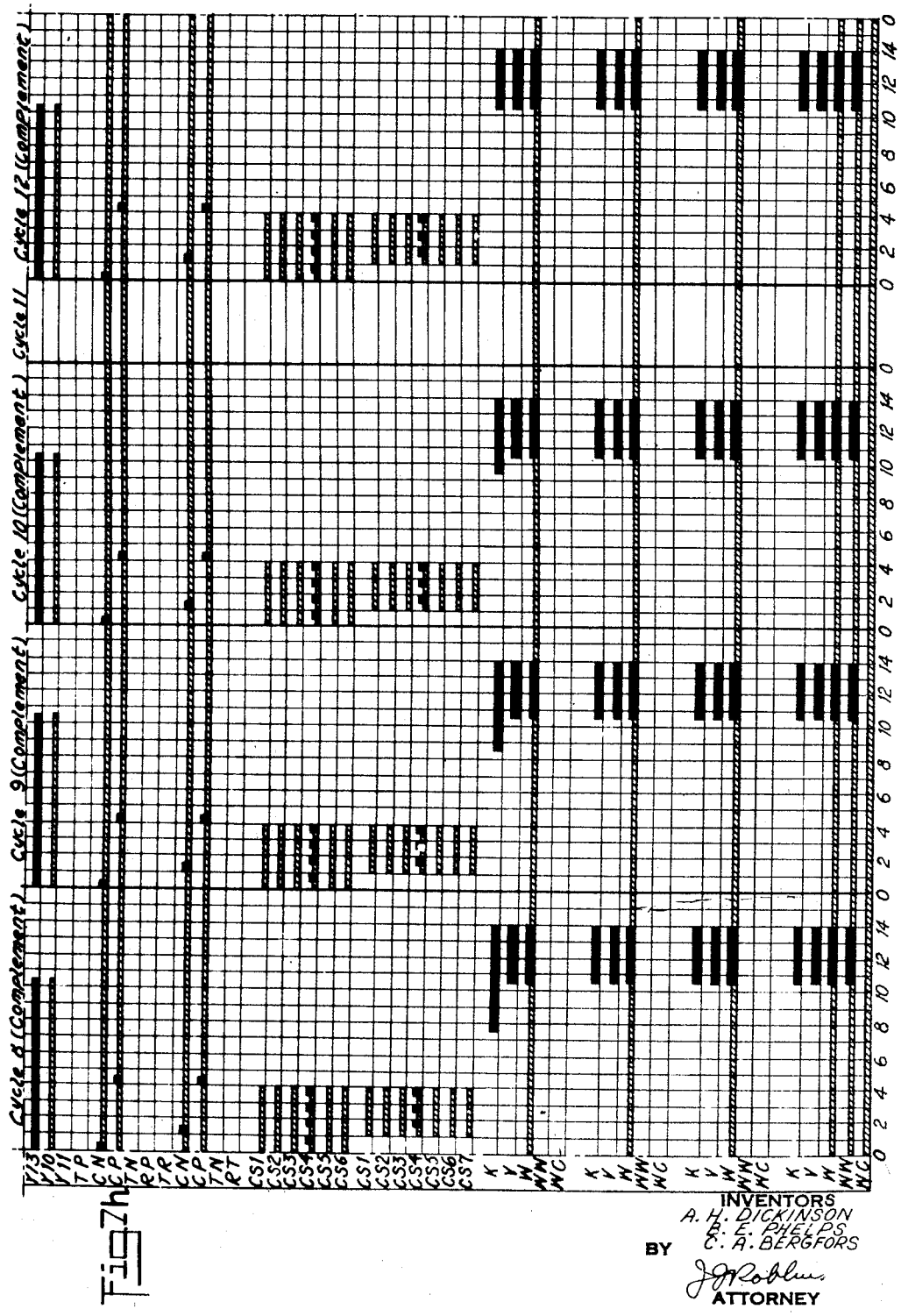

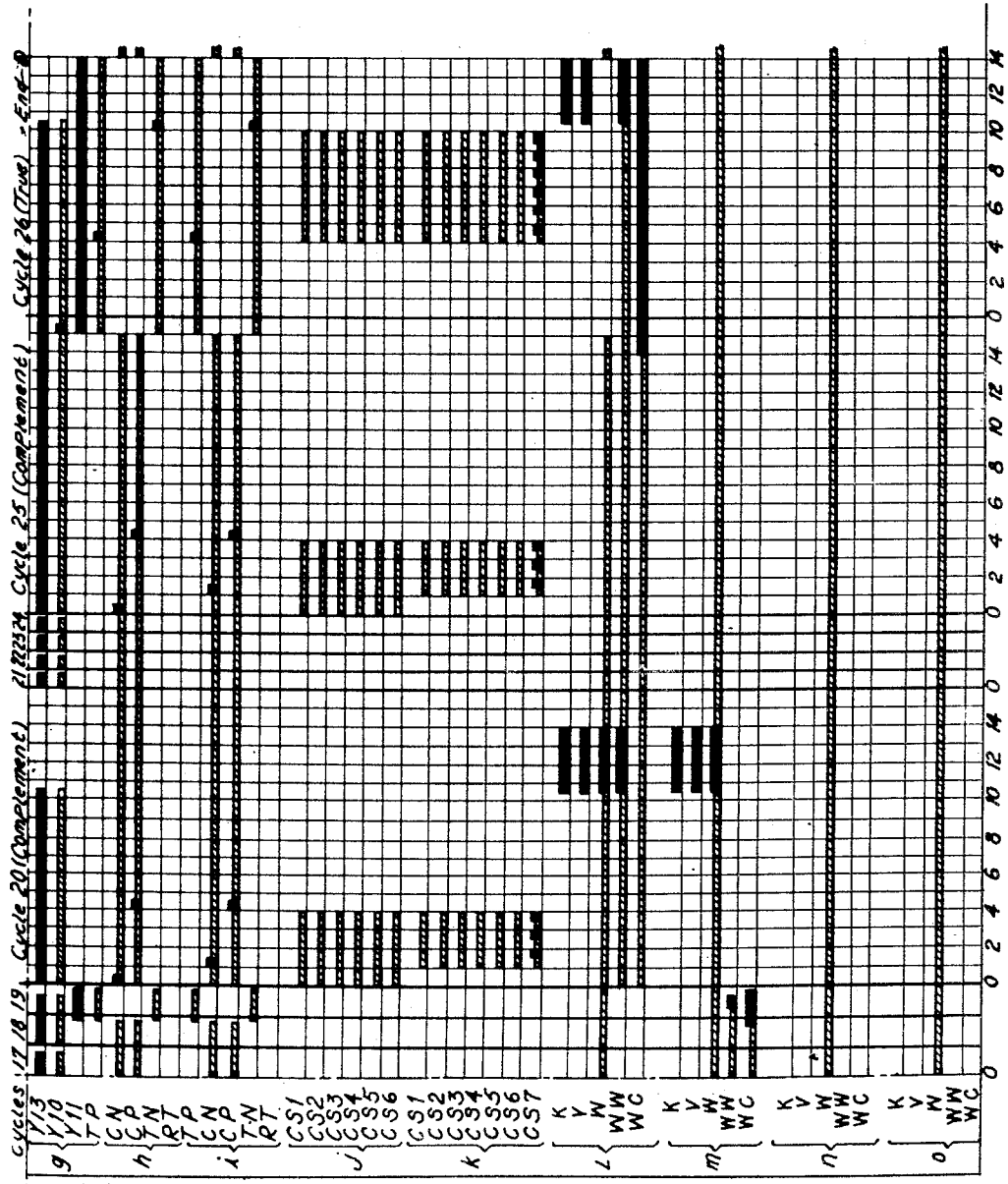

PROBLEM: 099105 ÷ 66 = 001501.5 = 001502−

| COLUMN SHIFT POSITION | COMPUTING CYCLE | DIVISOR (DR) ENTRIES ETC. | DD-PQ ORDERS 12 11 10 9 8 7 6 5 4 3 2 1 |
|---|---|---|---|
| 1st | 1 | Complement DR | 0 0 0 0 0 0 0 9 9 1 0 5 |
| | | No Go | 9 9 9 9 3 4 |
| | 2 | True DR | 6 6 |
| | | Carry Suppression–Column Shift | 0 0 0 0 0 0 0 9 9 1 0 5 |
| 2nd | 3 | Complement DR | 9 9 9 9 3 4 |
| | | No Go | 9 9 9 9 4 3 |
| | 4 | True DR | 6 6 |
| | | Carry Suppression–Column Shift | 0 0 0 0 0 0 0 9 9 1 0 5 |
| 3rd | 5 | Complement DR | 9 9 9 9 3 4 |
| | | Go | 1 0 0 0 0 3 3 |
| | 6 | Complement DR | 9 9 9 9 3 4 |
| | | No Go | 9 9 9 9 6 7 |
| | 7 | True DR | 6 6 |
| | | Carry Suppression–Column Shift | 0 0 1 0 0 0 3 3 1 0 3 |
| | 8 | Complement DR | 9 9 9 9 3 4 |
| | | Go | 1 0 0 0 2 6 5 |
| | 9 | Complement DR | 9 9 9 9 3 4 |
| | | Go | 2 0 0 0 1 9 9 |
| 4th | 10 | Complement DR | 9 9 9 9 3 4 |
| | | Go | 3 0 0 0 1 3 3 |
| | 11 | Complement DR | 9 9 9 9 3 4 |
| | | Go | 4 0 0 0 0 6 7 |
| | 12 | Complement DR | 9 9 9 9 3 4 |
| | | Go | 5 0 0 0 0 0 1 |
| | 13 | Complement DR | 9 9 9 9 3 4 |
| | | No Go | 9 9 9 9 3 5 |
| | 14 | True DR | 6 6 |
| | | Carry Suppression–Column Shift | 0 0 1 5 0 0 0 0 0 1 0 5 |
| 5th | 15 | Complement DR | 9 9 9 9 3 4 |
| | | No Go | 9 9 9 9 4 4 |
| | 16 | True DR | 6 6 |
| | | Carry Suppression–Column Shift | 0 0 1 5 0 0 0 0 0 1 0 3 |
| 6th | 17 | Complement DR | 9 9 9 9 3 4 |
| | | Go | 1 0 0 0 0 3 9 |
| | 18 | Complement DR | 9 9 9 9 3 4 |
| | | No Go | 9 9 9 9 7 3 |
| | 19 | True DR | 6 6 |
| | | Carry Suppression–Column Shift | 0 0 1 5 0 1 0 0 0 3 9 |
| | 20 1/2 Pick Up Entry & Complement DR | | 5 9 9 9 3 |
| | | Go | 6 0 0 0 3 |
| | 21 | Complement DR | 9 9 9 9 3 |
| | | Go | 7 0 0 0 2 |
| | 22 | Complement DR | 9 9 9 9 3 |
| | | Go | 8 0 0 1 8 |
| 7th | 23 | Complement DR | 9 9 9 9 3 |
| | | Go | 9 0 0 1 1 |
| | 24 | Complement DR | 9 9 9 9 3 |
| | | Go | 2 0 0 0 0 4 |
| | 25 | Complement DR | 9 9 9 9 3 |
| | | No Go | 9 9 9 9 7 |
| | 26 | True DR | 6 |
| | | Carry Suppression and Termination of Calculation | 0 0 1 5 0 2 0 0 0 0 0 3 |
| | | QUOTIENT | |

Fig. 8.

Problem: 6 × 376528

Jan. 6, 1953　　　A. H. DICKINSON ET AL　　　2,624,508
ELECTRONIC DIVIDING AND MULTIPLYING APPARATUS
Filed Oct. 22, 1946　　　33 Sheets-Sheet 30

INVENTORS
A. H. DICKINSON
B. E. PHELPS
C. A. BERGFORS
BY
ATTORNEY

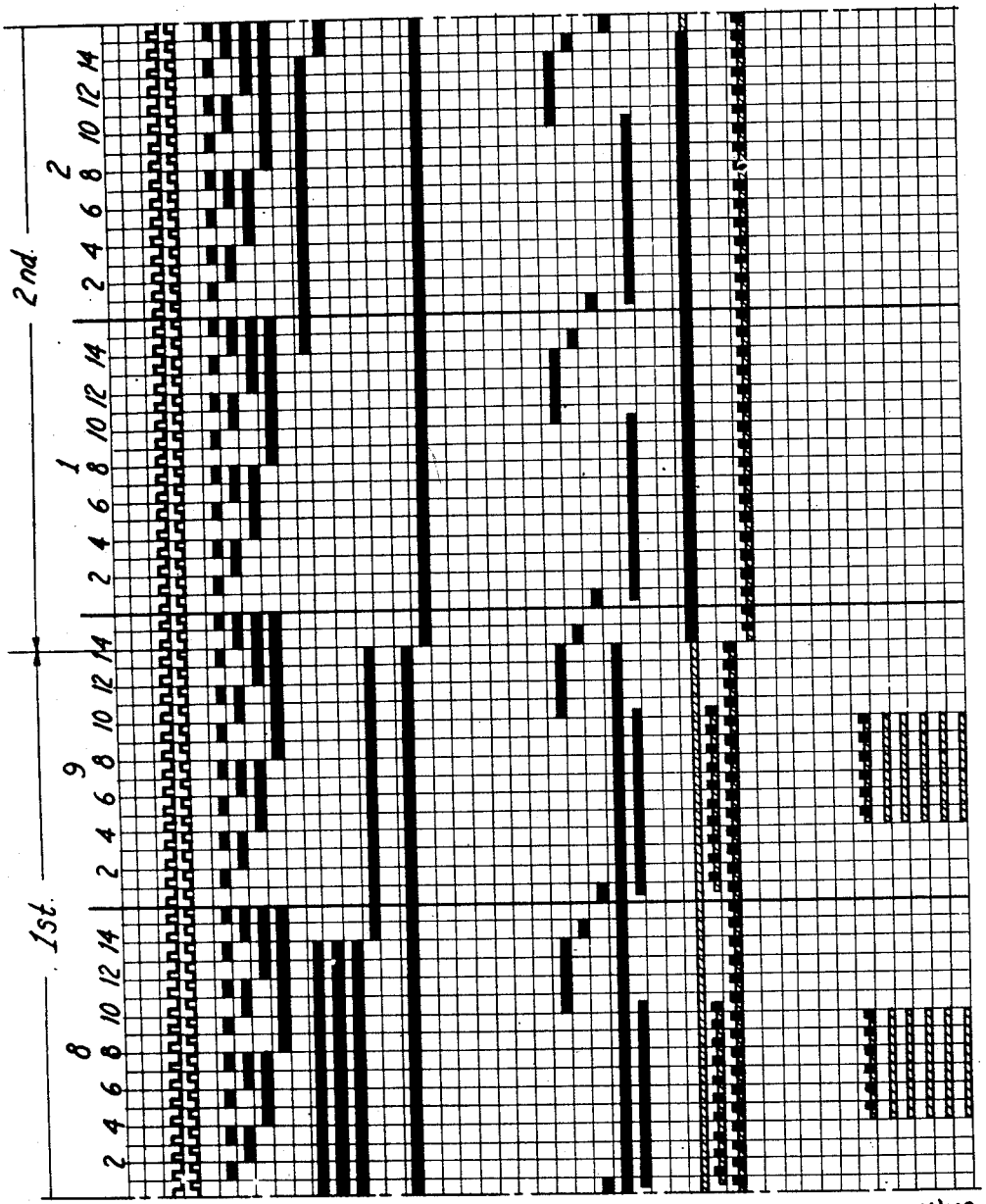

Patented Jan. 6, 1953

2,624,508

UNITED STATES PATENT OFFICE 2,624,508

ELECTRONIC DIVIDING AND MULTIPLYING APPARATUS

Arthur H. Dickinson, Greenwich, Conn., and Byron E. Phelps, Wappinger Falls, and Carl A. Bergfors, Yonkers, N. Y., assignors to International Business Machines Corporation, New York, N. Y., a corporation of New York Application October 22, 1946, Serial No. 704,914

47 Claims. (Cl. 235—61)

This invention is directed to electronic computing apparatus to perform dividing and multiplying computations.

The invention has as its objects the provision of:

Electronic apparatus to perform division or multiplication at extremely high speed;

Electronic computing apparatus including electronic tube circuits commonly used for the dividing and multiplying calculations;

Apparatus selectively conditionable to perform multiplication or division and including electronic tube circuits utilized for one of these computations and automatically disabled upon the conditioning of the apparatus for the other computation;

Apparatus to perform multiplication or division and including electronic tube circuits subject to different controls according to the computation being performed;

Apparatus to perform multiplication or division with the aid of electronic tube circuits subject to certain controls during one of these computations and to additional controls for the other computation;

Apparatus to perform division or multiplication and including electronic storage means for one term of either computation and from which this term is read out into a computing register by means subject to cyclic control during the dividing computation and subject to supplemental control, according to the other term, during a multiplying computation;

Apparatus to perform division or multiplication with the aid of electronic column shift means common to both computations;

Apparatus to perform division or multiplication with the aid of electronic column shift means operated in one manner for one of these computations and in a different manner for the other of the computations;

Apparatus to perform division or multiplication with the aid of electronic column shift means operable by either of two electronic circuit systems, one functioning during one computation and the other functioning during the other computation;

Apparatus to perform division or multiplication with the aid of electronic column shift means operated at regular intervals for the multiplying computation and at irregular intervals for the dividing computation;

Apparatus to perform multiplying or dividing computations with the aid of electronic column shift means including an electronic commutator stepped at regular intervals during the multiplying computation and at irregular intervals during the dividing computation;

A system of electronic tube circuits to perform a dividing computation;

A system of electronic tube circuits to receive the terms for a dividing computation from a record, to perform the dividing computation, and to control the recording of the result on the same record;

A system of electronic tube circuits for performing division and including electronic circuits selectively controlled according to "go" and "no go" conditions;

A system of electronic means to perform division including electronic circuits selectively effective to subtract or add the divisor to a dividend comparison portion;

A system of electronic means to perform division including electronic circuits effective to subtract the divisor from a dividend comparison portion until a "no go" condition arises and thereupon rendered effective to add the divisor to the dividend comparison portion.

A system of electronic means to perform division by over-and-over subtraction including electronic means for entering the divisor subtractively one or more times into a group of orders of a dividend register until "no go" condition arises and thereupon controlled to effect an additive entry of the divisor into said orders of the dividend register.

A system of electronic means for performing division including electronic circuits for entering the complement or the true figures of the divisor into a dividend register in accordance with the status of an electronic true or complement control;

A novel system of electronic circuits for reading out an amount subtractively from an electronic amount storage means;

A system of electronic means to perform division with the aid of electronic column shift means advanced in shift position in consequence of a "no go" condition;

A system of electronic devices to perform division with the aid of electronic column shift means;

Apparatus to perform division with the aid of electronic column shift means advanced in column shift position at the end of each dividing step;

Electronic dividing means including means alternatively conditionable to cause subtractive or additive entry of the divisor into dividend orders selected by column shift means operated upon a change in the subtract or add control from one of its conditions to the other;

Electronic dividing means including an electronic register for algebraically adding dividend and divisor amounts and forming the quotient by carry operations;

Dividing means including an electronic register for comparing the divisor with a dividend or dividend remainder portion with the aid of carry means of the register;

Dividing means including an electronic register for adding the complement of the divisor to a group of dividend comparison orders and forming the quotient by operation of the carry means of the highest order of the group;

Dividing means including an electronic register for adding the true figures or the complement of the divisor to a group of dividend comparison orders and forming a quotient entry by operation of the carry means of the highest order of the group upon the addition of the complement of a divisor no greater than the compared dividend or dividend remainder portion, wherein operation of this carry means is suppressed upon the addition of the true figures of the divisor following a "no go" condition;

Dividing means including an electronic register for adding the complement of a divisor to a group of dividend comparison orders and in which the carry means in the highest order of the group controls a "go" detecting means;

Dividing means including control means selectively conditionable for determining whether the complement or the true figures of the divisor shall be entered in a group of dividend comparison orders of a register, wherein the carry means of the highest order of the group governs the condition of the control means;

An electronic amount register and electronic means selectively conditionable to read out the amount additively or subtractively from the register;

A multi-order amount register having associated with each order an electronic device operable upon advance of the order from its highest to its lowest value status, combined with means coacting with the electronic devices to read out the amount additively or subtractively from the register;

Computing means including electronic result rounding-off means;

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a partially schematic sectional view of the record handling section of the machine.

Fig. 2 illustrates fragments of a record card handled by the apparatus shown in Fig. 1.

Fig. 3 shows the circuits of a trigger used extensively in the electronic computing means.

Figure 4A:
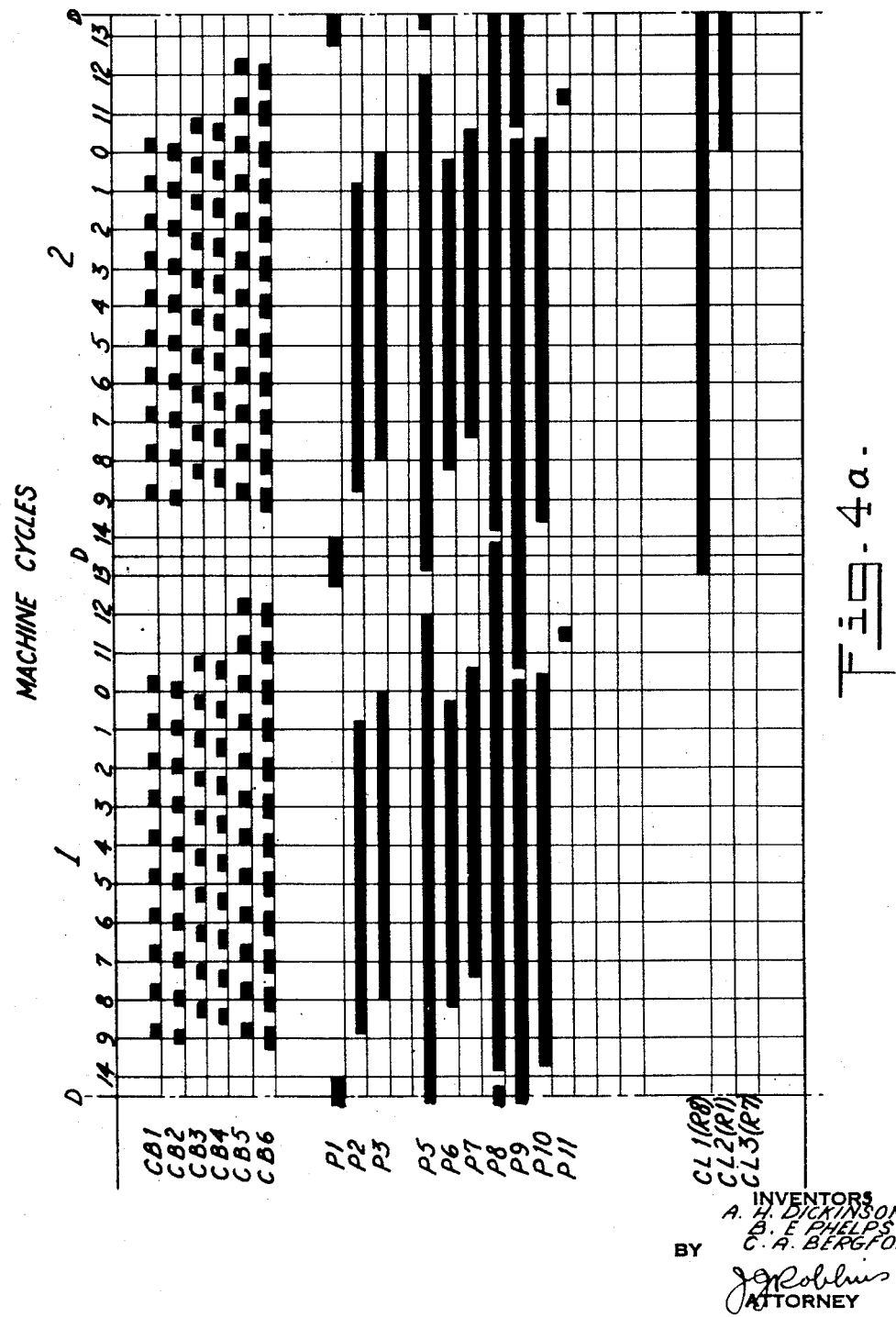
Figure 4B:
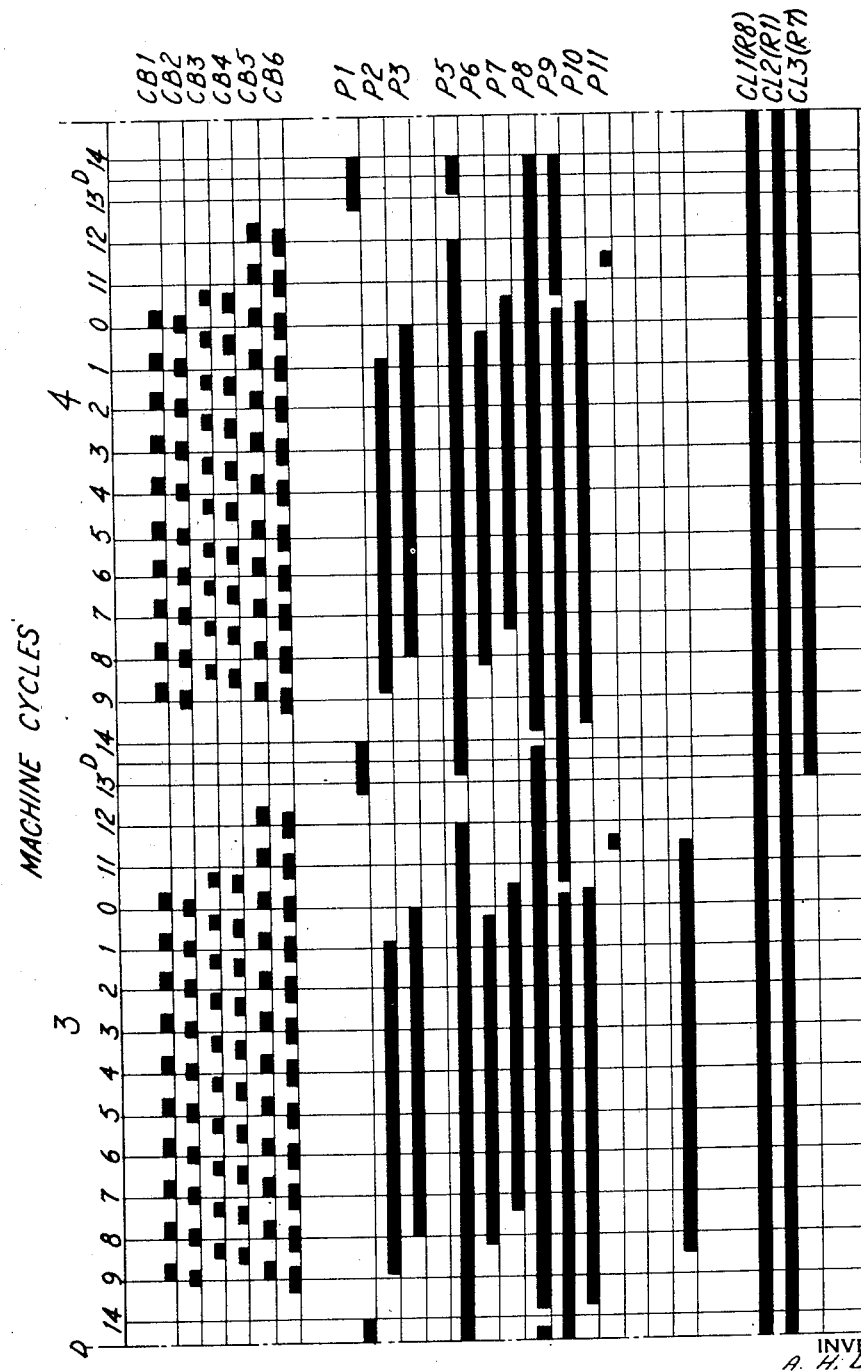

Figs. 4a and 4b, with Fig. 4b taken to the right of Fig. 4a, constitute a timing chart for the record handling section of the machine.

Fig. 5 illustrates the pertinent portions of the circuits of the record handling section of the machine and also diagrammatically shows the power pack and its different voltage output lines for the above circuits and for the computing circuits.

Figs. 6a to 6m illustrate the circuits of the computing section of the machine.

Figure 6B:
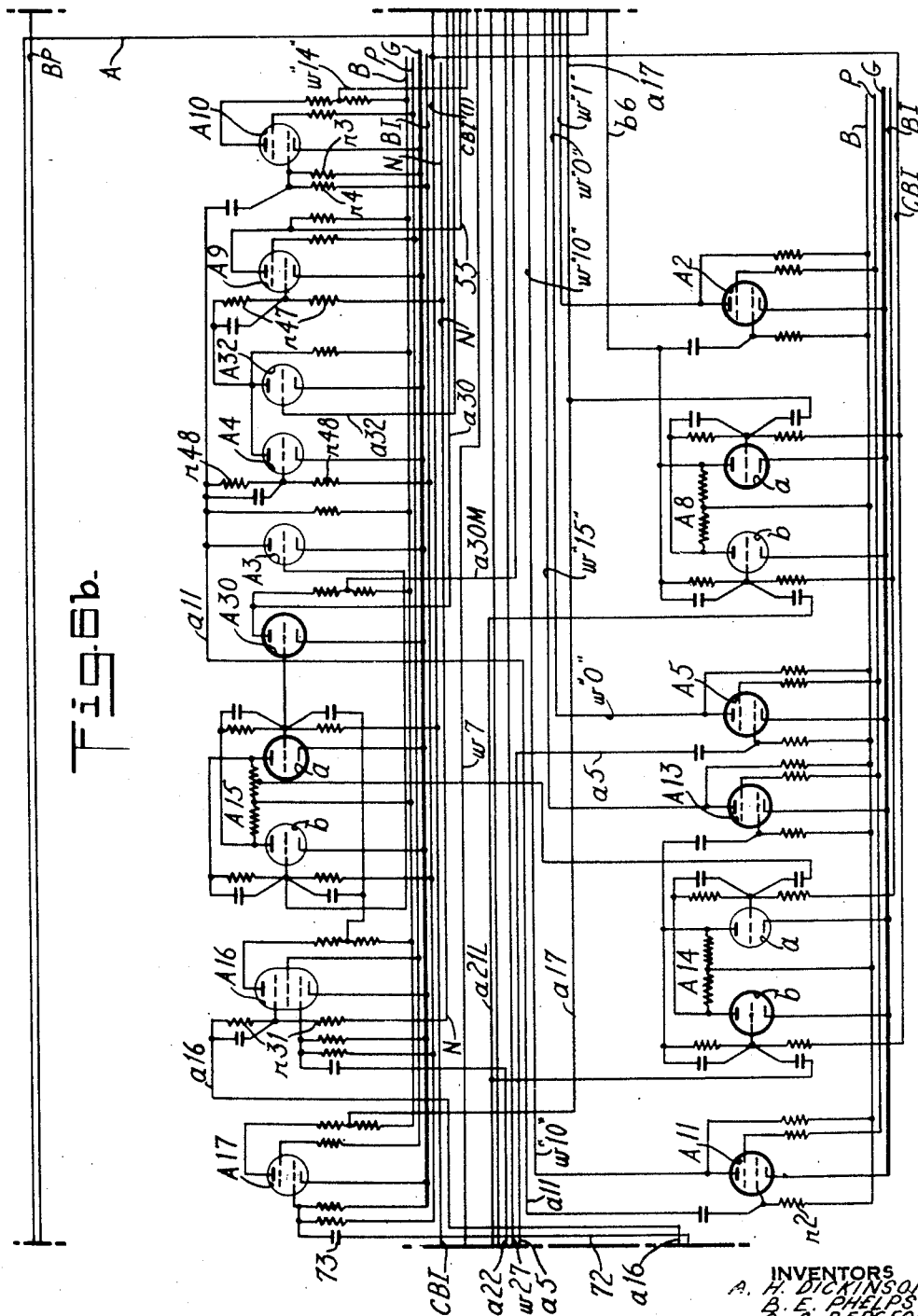

Fig. 6n shows the order in which Figs. 6a to 6m are arranged.

Figs. 7a to 7j, of which Figs. 7a to 7e are to be taken as vertically above Figs. 7f to 7j, respectively, constitute the timing chart for a dividing computation.

Fig. 8 indicates the mathematics of a specific dividing problem.

Figs. 9a to 9e constitute a timing chart for a multiplying computation.

Power for the voltage lines of the machine is derived from a suitable source. As shown in Fig. 5, a 110 A. C. supply is used. This supply acts through suitable means which may be represented in entirety as a conventional power pack to produce different levels of voltage on its output lines. These output lines include line B (+150 v.), line P (+65 v.), line BI (−100 v.), and line N (−250 v.). There is also a +140 v. output line, a ground line G which is shown throughout all the circuits as a heavy line and is to be considered as at 0 voltage, and suitable filament supply lines (not shown). In addition, the power pack supplies a +40 volt line which is used for the reading-recording section of the machine.

2. The reading-recording section

The disclosed machine has the capacity to multiply two six place terms by each other and to divide a six place dividend by a five place divisor. The answers will be recorded to six places. The terms and answers are recorded according to the Hollerith code of perforations in index positions 0 to 9 of record cards T (Figs. 1 and 2). All the cards for a single run have their terms prepunched in corresponding columns and their answers recorded in corresponding columns. For instance, cards to be run with the card shown in Fig. 2 have the dividend term (DD) in columns 1 to 6, the divisor term (DR) in columns 7 to 12 (column 7 always being punched with 0), and the quotient answer (Q) to be recorded in columns 72 to 77. The cards are handled by a reading-punching unit such as shown in Fig. 2b of Patent No. 2,372,909 and in Fig. 1 of the present case. Details of the construction may be obtained from said patent and from Reissue Patent No. 21,133.

Briefly, the stack of cards pre-punched with the terms for the selected computation are placed in hopper P, with the 9 index positions leading. As long as a single card remains in the hopper, the hopper card lever contacts HC stay closed. The cards are fed one after another from the bottom of the stack by picker means 84 operated by rocker means 83. As a card emerges from the hopper, it is seized by feed rolls 103 and 104 and fed into the reading station and into the grasp of feed rolls 101 and 102. At the reading station is a row of sensing brushes 17, one for each card column, and a coacting contact roll 1021. Feed rolls 101 and 102 advance the card from the reading station to a punching station and into the grasp of feed rolls 105 and 106. At the punch station is a row of punches 18, one for each card column, and a coacting punch die 167. Each of the punches pivotally carries an interponent 186 which is normally out of the path of a continuously oscillating punch-depressor plate 177. Plate 177 is operated through connecting rods 173 by eccentrics 172 on a rotating shaft 153. For each punch, there is a call magnet PM which upon energization acts through its armature lever 75 and a link 187 to hook the interponent 186 to the plate 177 during its down stroke. Accordingly, as the plate 177 effects its down stroke, it acts through the interponents hooked thereon to drive the selected punches through the card.

The feed rolls 105 and 106 feed the card from the punching station to a pair of feed rolls 131 and 132 which eject the card to a stacker 13.

The card picker means, feed rolls, and contact roll are driven by motor-operated mechanism through a clutch diagrammatically represented by 115—120 in Fig. 1. In a manner fully described in the aforesaid patents, the feed and contact rolls operate to feed the card intermittently when the clutch is engaged, to present index position rows 9 to 0 of a card at successive steps to the brushes 17 during one machine cycle (see Figs. 4a and 4b) and to punches 18 during the next machine cycle. After each feed step, there is a dwell interval during which the selected punches are depressed to perforate the card.

The cam contacts CB and P, indicated in the timing chart (Figs. 4a and 4b) and in the circuit diagram (Fig. 5) pertaining to the reading-recording apparatus, and some of which may also appear in figures relating to the computing section, are operated through the clutch-driven mechanism. The circuit diagram of the reading-recording section will be explained now.

Referring to Fig. 5, with cards present in supply hopper P (Fig. 1), the contacts HC are closed, so that relay R3 is energized by a circuit from the +40 v. line, through contacts HC and the relay R3, to ground G. To start operations, the start key is depressed to close a circuit from the +40 v. line, via stop key contacts SK, start key contacts ST, and through start relay R10, to ground. Relay R10 closes its contacts R10BL whereupon relay HD is energized. Relay HD closes its contacts HD1 completing a circuit from one side of the 110 A. C. line, through the motor M and contacts HD1 to the other side of this line. Motor M is the drive motor for the reading-recording section.

Relay R10 also closes its contacts R10BU, whereupon a circuit makes from the +40 v. line via cam contacts P1 and relay contacts R10BU through clutch magnet PCM, to ground. Magnet PCM effects engagement of clutch 115—120 (Fig. 1). With the motor now running and the clutch engaged, the first machine cycle (Fig. 4a) takes place. During this cycle, the first card is fed to the reading station and closes card lever contacts CL1 (also see Fig. 1) near the end of the cycle. Upon contacts CL1 closing, the relay R8 (Fig. 5) is energized. The relay R10 also has closed contacts R10AL to provide a stick circuit for the relay by way of cam contacts P5. If the operator has released the start key, the relay R10 will be deenergized upon the opening of cam contacts P5. Deenergization of relay R10 results in deenergization of relay HD, the motor M, and the clutch magnet PCM, so that the machine stops at the end of the machine cycle. To cause the machine to go through a second cycle, the operator maintains start key contacts ST closed. During this second cycle (see Fig. 4a), the card is fed through the reading station and the terms read out by analyzing circuits traced later in Sections 6, 7, and 18, into the computing section. Late in the second machine cycle, as the card approaches the punching station, it closes card lever contacts CL2 (also see Fig. 1), whereupon relay R1 (Fig. 5) is energized. Computing operation starts between 11 and 12 of the second machine cycle, and the computed answer is obtained long before the end of this cycle. The operator holds the start key contacts ST closed to cause a third machine cycle (Fig. 4b) to be performed. During this third machine cycle, the first card is fed through the punching station and is punched with the answer obtained by the computing section during a small fraction of the second machine cycle. Near the end of the third machine cycle, the card closes card lever contacts CL3 (Fig. 1) whereupon relay R7 (Fig. 5) is energized. Assuming that successive cards have been fed to follow the first card during the second and third cycle, the relays R1, R3, R7, and R8 are all in energized status by the end of the third machine cycle. Accordingly, the operator may now release the start key since a stick circuit for start relay R10 is now in closed condition. This stick circuit extends from line +40 v., via stop key contacts SK, through relay contacts R3A, R1AU, R7A, and R10AU, thence through relay R10, to ground. Feed of the cards will now continue automatically until the cards run out or until the operator depresses the stop key to open key contacts SK.

It will be noted from Figs. 4a and 4b that the machine cycle is divided into fourteen index times. During the second cycle of operation on each card, its index positions 9 to 1 come under the brushes 17 successively in the correspondingly numbered index times 9 to 1, inclusive, and the terms designated on the card are read into the computing section. The computing section effects the entire computation during a subsequent small fraction of the same machine cycle during which the terms were read out of the card. During the next cycle, the result is read out of the computing section and punched into the card as the index positions 9 to 0 successively are presented at the punch line at the index times 9 to 0, inclusive.

3. The trigger

The computing section uses a large number of double-stability electronic trigger circuit units which may be called simply triggers. The trigger comprises two symmetrical, electrically parallel impedance arms with retroactive coupling to provide for two, alternative stable states. It may be tripped in status by an unbalancing electrical effect impressed by an external agency. Fig. 3 shows a complete trigger. One of its impedance arms includes resistors 10a, 11a, and 12a in series between voltage line B (+150 v.) and line BI (—100 v.). Resistor 11a is shunted by capacitor 14a, and the anode of a vacuum tube a connects to the junction of resistors 10a and 11a. The cathode of this tube connects to ground line G (zero volts). The other impedance arm includes resistors 10b, 11b, and 12b in series between lines B and CBI (—100 v.), a capacitor 14b, and the anode-cathode circuit of a tube b. The retroactive coupling between the impedance arms is obtained by connecting the grid of tube b to the junction of resistors 11a and 12a and the grid of tube a to the junction of resistors 11b and 12b.

The tubes a and b may be the twin units of a duplex tube of the 12SN7 type. The correspondingly numbered resistors and capacitors of the two impedance arms have the same values. A suitable arrangement is one in which resistors numbered 11 and 12 are each about ten times the value of the resistors numbered 10. Typical values are 20,000 ohms for resistors 10 and 200,000 ohms for resistors 11 and 12. A suitable value for each of capacitors 14a and 14b is about 100 micromicrofarads.

In one stable status, here called the off status, of the trigger, its tube a is conductive while tube b is blocked. With tube a conductive, its anode is at low potential and the resistance-coupled grid of b is at still lower potential, considerably below ground or cathode potential, maintaining tube b blocked. With tube b blocked, its anode is at high potential, so that the resistance-coupled grid of tube a is above the cut-off potential, maintaining it conductive. To trip the circuit to its reverse status, here called the on status, positive potential may be impressed on the grid of b of such value as to raise it above the critical potential. Tube b becomes conductive, whereupon a negative pulse is transferred from its anode to the grid of tube a by capacitor 14b. This pulse negatively biases tube a, reducing its current flow. The resulting positive pulse on the anode of a is transferred by capacitor 14a to the grid of b accelerating its increase in current flow. The interactions between the tubes occur in this regenerative manner, with the result that tube b is now conductive and tube a is blocked; i. e., the trigger is now on. The return of the trigger to off state may be effected by impressing adequate positive potential on the grid of a.

Instead of tripping the trigger by application of positive potential to the grid of one of its tubes, tripping may be effected in response to a negative pulse received by the grid of the conductive tube. For instance, with the trigger off, tube a is conductive and a negative pulse received by the grid of a turns the trigger on. Such negative pulse decreases current flow in the tube a, and the attendant positive pulse on its anode is transferred by capacitor 14a to the grid of tube b, with the same result explained before. On the other hand, if the trigger is on, a negative pulse received by the grid of conductive tube b trips the trigger off, in a manner now clear. A negative tripping pulse is applied to the grid of tube a with the aid of a coupling capacitor 16a and to the grid of tube b with the aid of a similar capacitor 16b, each of which is of smaller capacity than each of capacitors 14a and 14b. A suitable value for each of the latter capacitors is in the order of 40 micromicrofarads. The constants of this trigger are such that it reverses from either status to the other when a negative tripping pulse is applied simultaneously to the grids of tubes a and b of the trigger. The theoretical explanation for such action of the trigger is not important but it may well be that the differences in potentials across the capacitors 14a and 14b favor the shift of the trigger to its reverse state when a negative pulse is impressed simultaneously on the grids of tubes a and b of this trigger.

The constants of this trigger are such that it is considerably more sensitive to negative tripping pulses than to positive tripping pulses. This makes it possible to connect the trigger to a tripping source which produces alternate positive and negative pulses of potential of the same amplitude. Only the negative pulses will trip the circuit while the positive pulses will be ineffective. Some of the triggers do not have negative tripping pulses applied to one or both of the impedance arms. The capacitor 16a or 16b, or both, of such triggers are connected to one of the power lines, as line B, to serve as stabilizing capacitors (see for example, trigger A7 in Fig. 6a).

As shown in Fig. 3, resistor 12b connects to line CBI and resistor 12a to line BI. Between line CBI and BI are cam contacts P8 (also see Figs. 4a and 4b), so that when contacts P8 are closed, line CBI receives —100 v. potential from line BI. Upon the opening of P8, potential is removed from line CBI and, thereby, negative bias potential is removed from the grid of tube a, whereupon the trigger goes off. Some of the triggers have resistor 12a instead of 12b connected to line CBI. Such triggers go on upon disconnection of line CBI from line BI. This arrangement provides for resetting of the triggers to proper stand-by states, and line CBI is called the cancel line. Some of the triggers in the computing circuits (Figs. 6a to m) connect to a second cancel line CBI(A), associated by cam contacts P9 with line BI (see Fig. 6j), for reasons explained in Section 15. On status of a trigger is denoted in the timing charts (Figs. 7a to j and 9a to e) by a line and off state by absence of the line.

It is clear that when the trigger is off, tube a is conductive and its anode and points of resistors 10a, 11a, and 12a are at their low potentials, while tube b is non-conductive and its anode and points of resistors 10b, 11b, and 12b are at their high potentials. Upon reversal of the trigger, potential pulses, of negative and positive characters, are produced at different points of the circuit. For instance, upon reversal of the trigger from on to off state, a drop in potential; i. e., a negative pulse of potential, is produced on the anode of tube a while a rise in potential; i. e., a positive pulse of potential is produced on the anode of tube b.

4. The computing section—In general

The circuits of this section (Figs. 6a to 6m) are normally arranged to carry out dividing computation. To set the machine for a multiplying computation, the operator will connect a socket COM (Fig. 6d) by a jumper jack to a socket MPY. There is a third, unwired socket DIV which merely serves as a convenient receptacle for one prong of the plug jack when the machine is to effect dividing computation, the other prong of the jack then being inserted in socket COM.

It is to be noted that the cathodes of all the tubes in the computing section connect to ground G. There are a number of pentodes and tetrodes in the circuits. The screen grids of these tubes are all suitably connected to the voltage line P (+65 v.) and may be ignored in the further description of the circuits. The control grids of the pentodes and tetrodes will be referred to simply as the grids, while the suppressor grids of the pentodes will simply be called suppressors.

In order to indicate which tubes are conductive and which are non-conductive in the stand-by or idle condition of the circuits when they are set for dividing computation, the envelopes of the tubes conductive in the stand-by status are shown heavy. The stand-by status of a trigger is incidentally denoted by which of its tubes a and b is shown conductive. For example, trigger A7 (Fig. 6a) is off in the stand-by condition as indicated by the showing of tube a as conductive.

The anodes of all the tubes are connected to line B (+150 v.) through resistors ranging from about 5000 ohms to 20,000 ohms. When a tube is non-conductive, its anode potential may be considered as about +150 v. When the tube is conductive, its anode potential drops to about +50 v.

All the triodes shown are units of duplex tubes of type 12SN7, all the tetrodes are of the 25L6 type, and the pentodes are of type 6SK7.

The tubes are controlled in a manner insuring positive operation and overcoming unavoidable, chance differences between tubes of the same type. For this purpose, a tube will be held non-conductive, if this is its required status, by a potential on one of its grids which is considerably below the critical potential. To drive the tube to conducting status, its grid potential will be given a tendency to rise considerably above critical value. The grid resistor will have a high value, so that grid current flow will bring the potential of the grid to substantially the cathode potential. If a tube is to be maintained in a conductive status, its grid will be connected to a high potential line through a high value resistor. The grid current will reduce the grid potential substantially to cathode potential but any tendency of the tube current to drop will be accompanied by a reduction in grid current, so that grid potential will rise and overcome the tendency of the tube current to drop. To drive the conductive tube to non-conducting status, its grid potential will be reduced considerably below the critical value. This principle is applied to triodes, tetrodes, and pentodes. Examples for the various types of tubes are given below.

The triodes V (Fig. 6i) have their grids connected to the midpoint of a resistor r1, in the order of 940,000 ohms. One end of this resistor connects to line BI (—100 v.) and the other end connects to a wire 55 which leads to the anode of tube A9 (Fig. 6b). When tube A9 is non-conductive, its anode potential is about +150 v. Under this condition, the grids of triodes V tend to rise to about +25 v. potential whereas the critical grid potential is about —9 v. Grid current flow reduces the potential of the grids of tubes V to about the cathode level. When tube A9 becomes conductive, its anode potential drops to about +50 v., under which condition, the grid potential of tubes V falls to about —25 v., considerably under the critical potential.

Tetrode A11 (Fig. 6b) has its grid connected by a resistor r2, in the order of 470,000 ohms, to line B (+150 v.), so that as soon as power is applied and the filament reaches operating temperature, the tube becomes conductive. Grid current flow reduces the grid potential to about the cathode level, which is considerably above the critical potential of about —25 v. Tetrode A10 (Fig. 6b) has its grid connected by a resistor r3 (in the order of 330,000 ohms) to the ground line and by a resistor r4 (in the order of 620,000 ohms) to line BI. Accordingly, grid potential is normally about —35 v., considerably below the critical potential, and the tube A10 is normally non-conductive.

Pentode A27 (Fig. 6c) has its control grid connected to the junction of resistors r5 and r6, respectively in the order of 330,000 and 620,000 ohms, interposed between lines G and BI. Accordingly, the control grid normally has a potential of about —35 v., whereas the critical control grid potential is about —17 v. The suppressor of A27 is connected by a resistor r7, in the order of 680,000 ohms to line N (—250 v.) and by a resistor r8, in the order of 330,000 ohms to a wire w27 which leads to the anode of tube a of the trigger A23 (Fig. 6a). Trigger A23 is initially on; so that the anode of its tube b is then at approximately +150 v. Under this condition, the A27 suppressor potential is about +17 v., which is considerably above the critical suppressor potential of —40 v. Pentode A27 will not become conductive, however, until its control grid potential also is raised above its critical point. When trigger A23 (Fig. 6a) is switched to off status, the anode potential of its tube a drops to about +50 v. Under this condition, the suppressor potential of pentode A27 is about —50 v., considerably under its critical potential. Pentode A27 will then be blocked even though its control grid potential be raised above its critical point.

With this explanation, the various conditions of grid potential of the different tubes will be recognized and, except when required by special circumstances, will not be described hereafter in any detail.

As will be clear from subsequent portions of the description, many of the elements of the computing circuits are driven by high frequency pulses. It is to be understood that, wherever necessary, suitable shielding is provided between lines carrying the high frequency pulses.

Several triggers in the computing section are to be tripped by relatively low frequency impulses resulting from closure of cam contacts in the reading-recording section. Upon the break of the cam contacts, high frequency interference pulses are produced which are to be rejected from influence on the triggers. For this purpose, low-pass filter circuits are provided, where necessary, to reject the high frequency interference pulses but to pass the relatively low frequency pulses produced by the make of the cam contacts. In Fig. 6a, such filter circuit is provided for the left side of trigger A7 and comprises the capacitor C51 and the portion of resistor r60 between the capacitor and the grid of tube b of this trigger. Similar filter circuits are associated with triggers B21 and B23 in Fig. 6d, with the entry control triggers N (Fig. 6j), entry control triggers D (Fig. 6f), and entry control triggers ME (Fig. 6m).

It will be noted in Fig. 6i that the portion of voltage divider r1 between the grids of triodes V and the pulse transmitting wire 55 is shunted by a capacitor BC. The purpose of this capacitor is to balance the interelectrode tube capacitances in order that the grids of tubes V shall follow the pulse on wire 55 without lag. There are other, numerous instances in the computing circuits of similar balancing capactiors which will be readily recognized without further explanation.

5. The electronic amount registers

Figure 6C:
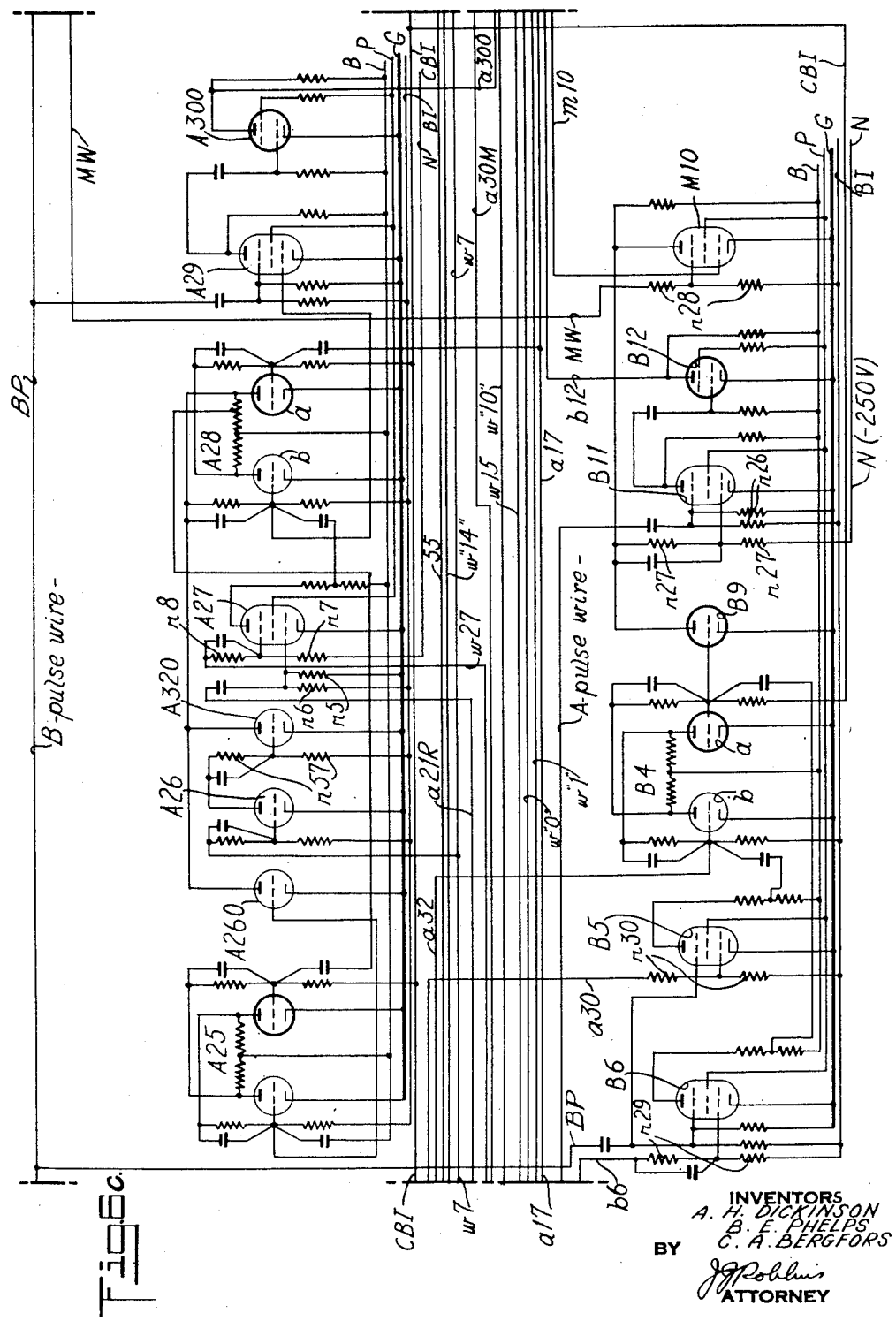
Figure 6J:
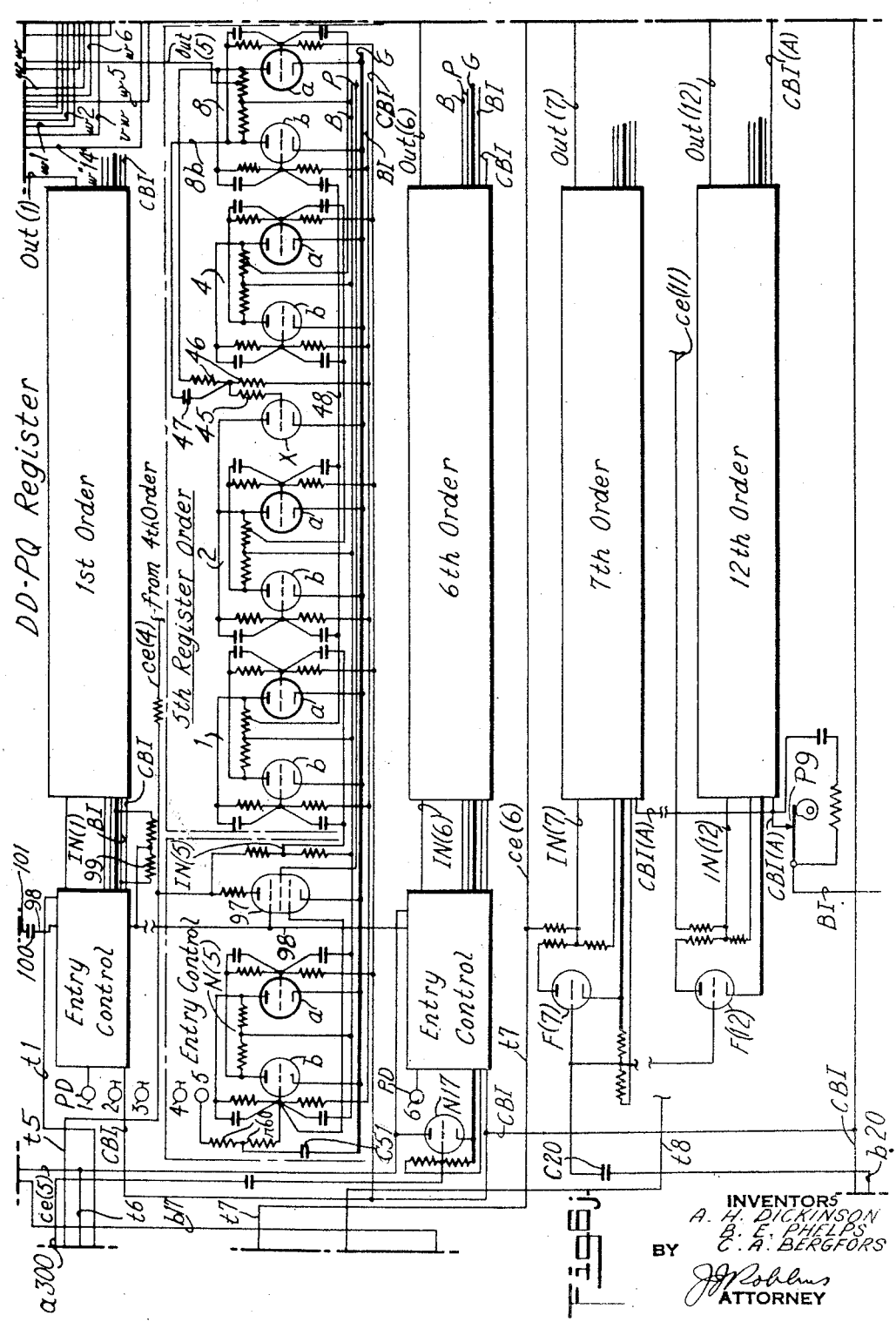
Figure 6K:
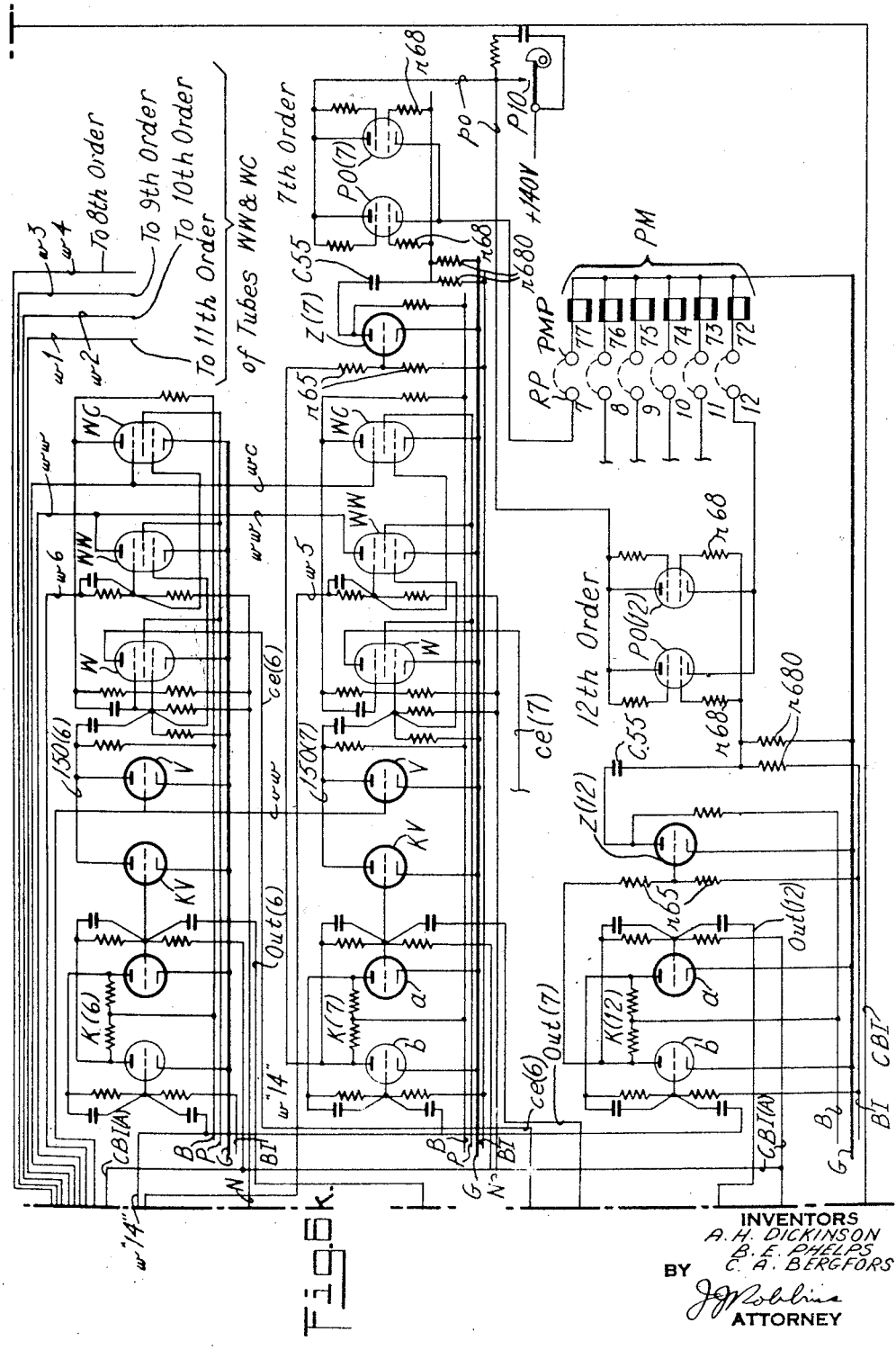
Figure 7F:
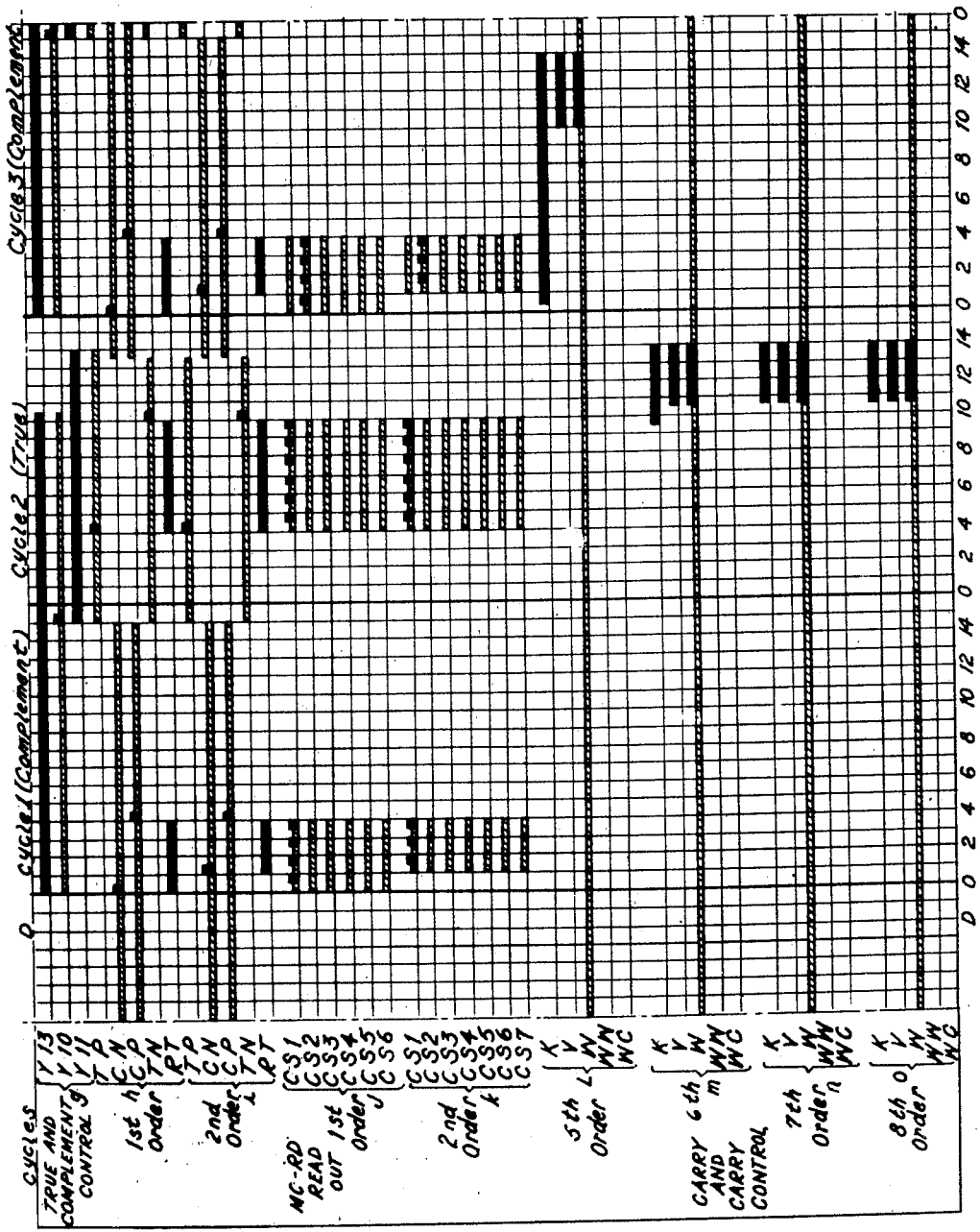
Figure 9A:
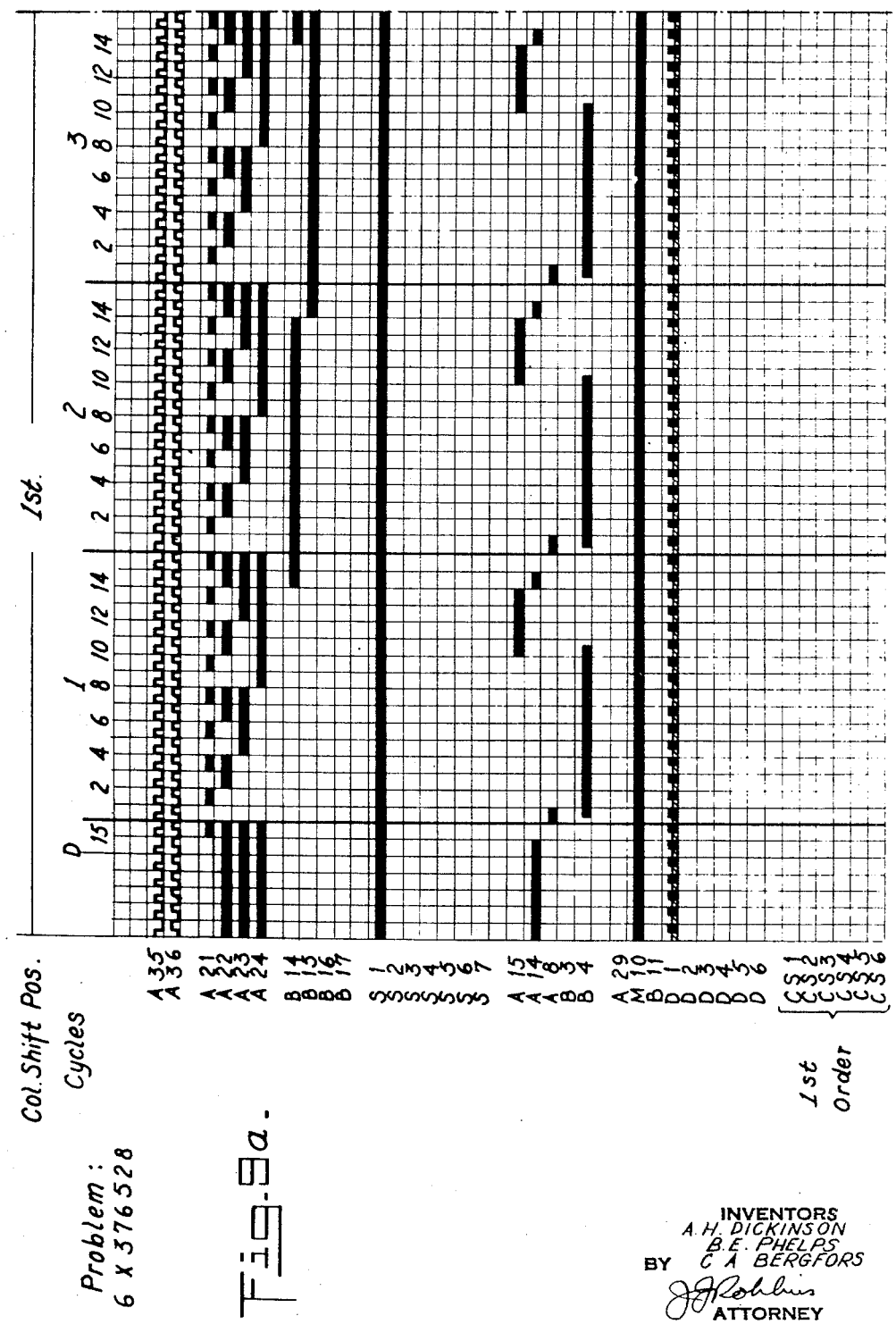
Figure 9B:
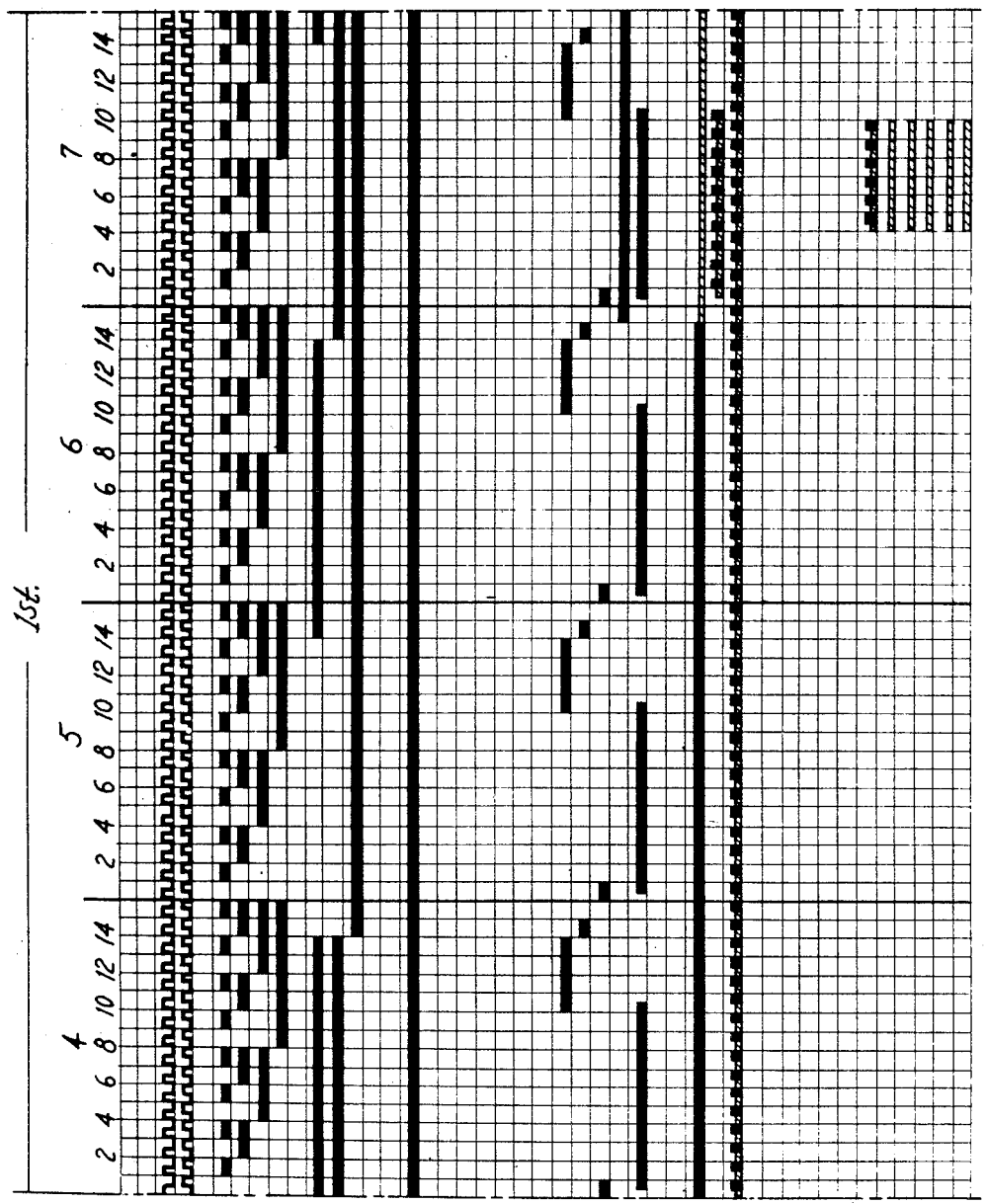
Figure 9D:
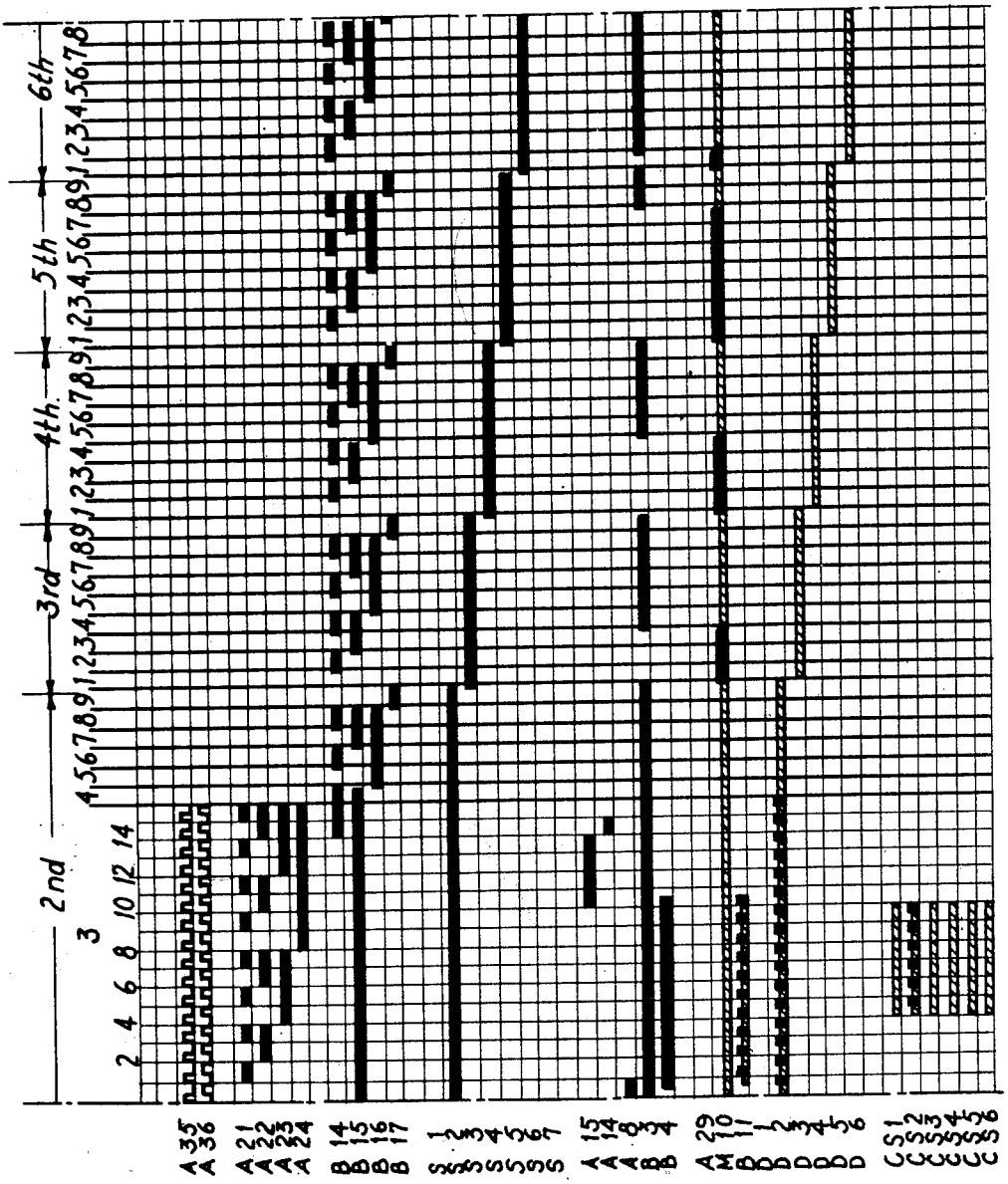
Figure 9E:
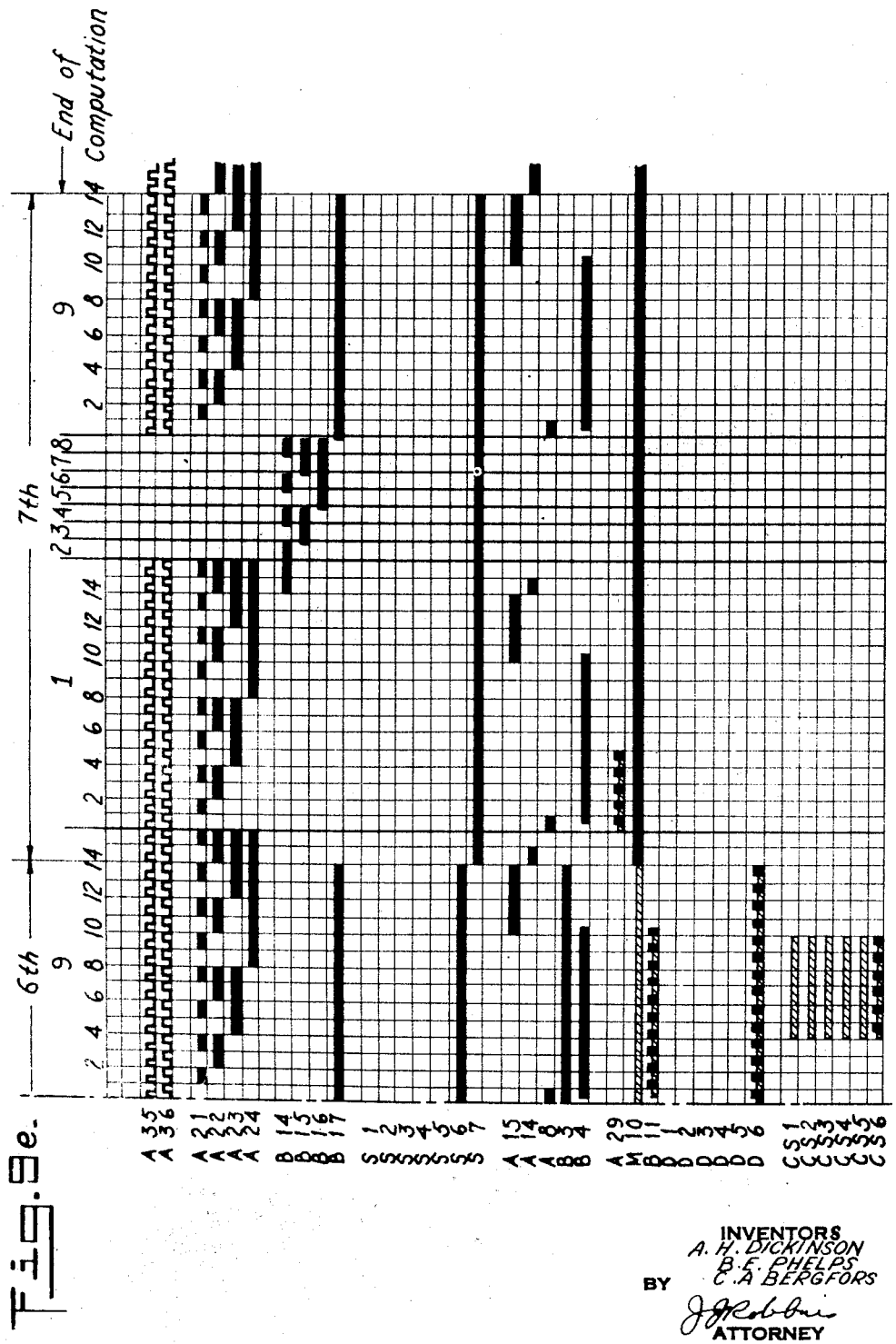

There are three electronic amount registers designated MC—DR (Fig. 6f), MP (Fig. 6m) and DD—PQ (Fig. 6j). The MC—DR and MP registers each have six orders, while the DD—PQ register has twelve orders. In division, the MC—DR register receives the divisor factor; in multiplication, it receives the multiplicand factor. The MP register functions only in multiplication, to receive the multiplier factor. Register DD—PQ functions during division to receive the dividend factor, to obtain the dividend remainders, and to build up the quotient; in multiplication, it serves as the product accumulator. The individual register orders are similar. Accordingly, for simplicity of showing, only the 5th order of the DD—PQ register is shown complete, while other orders of all three registers are represented by rectangles. Also, for the sake of simplicity in the showing, some of the orders are omitted from the drawings.

*The register order.*—Each register order is similar to the register order disclosed in Fig. 3 of application Serial No. 654,175, filed March 13, 1946, by B. E. Phelps. The register order operates to produce combinational patterns of electrical phenomena, each pattern corresponding to a different digit in the decimal notation. The structure and operation of such order will be explained with reference to the 5th order of the DD—PQ register (Fig. 6j). Each order has four trigger stages 1, 2, 4, and 8 and a triode X. Triode X has its anode tied to the anode of tube a of stage 2. The grid of X is connected via a resistor 45 and the lower portion (as shown) of a voltage divider 46 to the line B1, so that tube X is normally non-conductive. The grid of X also is connected via resistor 45 and the upper portion (as shown) of divider 46 to the anode of tube a of stage 8 and connected via resistor 45 and a capacitor 47, approximately of 10 micromicrofarads, to a wire 8b extending to the anode of tube b of stage 8. The entry pulses are negative and fed via wire IN to both impedance arms of stage 1 to reverse it from either status to the other. Each time stage 1 is tripped off, the negative pulse produced by its tube a is fed via a portion of its anode resistor and a wire 48 to both arms of stage 2 and also to the grid of only tube b of stage 8. Each time stage 2 is tripped off, it produces a negative pulse on the anode of its tube a which is fed via a portion of its anode resistor to the two arms of stage 4 to reverse it in either direction. When stage 4 is tripped off, it develops a negative pulse on the anode of its tube a which is fed via a portion of its anode resistor to the grid of only tube a of stage 8. When stage 8 is turned off, it produces a negative pulse on the anode of its tube a which is applied via a portion of its anode resistor to the output line OUT of the order. It is also to be noted that when stage 8 turns off, it produces a positive pulse, on the anode of its tube b and the output wire 8b which is utilized for controlling an external circuit, in the manner explained in Section 11. Before describing operation of the order in registering values, it is mentioned that the value standing in the order is equal to the sum of the designations of the on stages.

Assuming the order is at zero, all four stages are off and tube X is non-conductive. One entry pulse, coming from wire IN, turns on stage 1, and the order stands at 1. A second entry pulse trips stage 1 off which, in turn, trips stage 2 on. The order now stands at 2. A third entry pulse turns on stage 1, and the order now stands at 3 (stages 1 and 2 on). A fourth entry pulse switches off stage 1 which, in turn, trips stage 2 off. As stage 2 trips off, it reverses stage 4 to on state. The order now stands at 4. A fifth entry pulse turns on stage 1, and the order stands at 5 (stages 1 and 4 on). A sixth entry pulse turns off stage 1, causing stage 2 to go on. The order now stands at 6 (stages 2 and 4 on). A seventh entry pulse turns on stage 1, and the order stands at 7 (stages 1, 2, and 4 on). An eighth entry pulse turns off stage 1, causing stage 2 to go off and, as stage 2 goes off, it turns off stage 4. When stage 4 turns off, it produces a negative pulse which is impressed on the grid of only tube a of stage 8, with the effect of tripping stage 8 to on status. The order now stands at 8 since only stage 8 is on. When stage 8 is on, the anode of its tube a is at high potential. This potential is applied via the shown upper part of voltage divider 46 and via the resistor 45 to the grid of triode X, raising the grid above cut-off potential. Accordingly, tube X becomes conductive. A ninth entry pulse turns on stage 1, and the order stands at 9 (stages 1 and 8 on). A tenth entry pulse turns off stage 1 which thereupon applies a negative pulse to wire 48. This negative pulse is impressed on both arms of stage 2, which is now in off status, and tends to trip it on. Such action of stage 2 demands a rise in potential of the anode of its tube a and an attendant rise in grid potential of its tube b. But tube X is now conductive and overcomes the attempted rise in potential of the anode of tube a of stage 2 and of the grid of tube b. In short, tube X, being in conductive status, blocks stage 2 from triggering to on status. The negative pulse produced by stage 1 is also applied by wire 48 to the tube b of stage 8 to trip it off, in consequence of which the anode of its tube a drops abruptly to a low potential. This low potential, applied via the resistance coupling between the anode of a of stage 8 and the grid of triode X will render the triode non-conducting, thus releasing stage 2. If this occurred too soon, the tripping pulse produced by stage 1 might still be effective to turn on stage 2, an action which is to be avoided at this time. To insure against this, the blocking of triode X and its release of stage 2 is delayed until the tripping pulse now being applied to stages 2 and 8 has been spent. It is for this reason that the anode of b of stage 8 is coupled by capacitor 47 to the grid resistor 45 of triode X. During the reversal of stage 8 to off status, the potential on the anode of tube b of this stage is rising rapidly while that on the anode of tube a is dropping. The rising potential on the anode of tube b of stage 8 is transmitted via capacitor 47 to grid resistor 45 of triode X and counteracts the effect of the declining potential fed to this grid resistor from the anode of tube b of stage 8 until capacitor 47 becomes charged. Thus, the grid of triode X does not follow the anode of tube a of stage 8 immediately but is held above cut-off potential for a finite delay period; i. e., until capacitor 47 becomes charged. Thereafter, the low potential existing on the anode of tube a of stage 8, as long as this stage remains off, is effective to maintain triode X non-conductive.

It is clear, now, that the tenth entry pulse causes stages 1 and 8 to trip off while stage 2 is prevented from turning on. Since stage 4 also is off, the register order again stands at zero.

The value cycle of the register through ten steps, starting from 0 has been explained. Manifestly, upon interruption of entries, the register will remain in its last assumed value status, and upon resumption of entries, the register will continue its advance therefrom.

6. The dividend entry into DD—PQ

As previously stated, the machine is capable of dividing a six place dividend by a five place divisor and of recording six place answers. The cards of the same run have corresponding column fields assigned to the factors and answers, respectively. For example, all the cards run through with the card shown in Fig. 2 use columns 1 to 6 as a dividend field. The 6th place of the dividend is represented in column 1, the 5th place in column 2, and so on. The dividend is to be transferred to orders 1 to 6 of register DD—PQ (Fig. 6j) when dividing operations are to be performed. For this purpose, the operator preliminarily plugs brush sockets PB1 to 6 (Fig. 5) to dividend entry sockets PD6 to 1 (Fig. 6j) respectively. During the second machine cycle of operation on a card, its dividend representation is sensed between machine cycle index times 9 to 1 (Figs. 4a and 4b) by sensing circuits which, through the plug connections, apply positive tripping pulses via resistors r60 to entry triggers N (only the 5th order trigger N is shown) provided for orders 1 to 6 of DD—PQ. Tied to the grid of tube b of each trigger N so as to follow it in potential is the grid of an entry gate tube, the pentode 97. Trigger N initially is off, so that the grid of its tube b and the grid of related pentode 97 are initially at blocking potential. As soon as a trigger N goes on, it increases the control grid potential of the associated pentode 97 to condition the pentode for inverting positive pulses on its suppressor to negative entry pulses on line IN of the related order of DD—PQ.

The sensing circuit is established at a differential machine cycle time related to the value of the sensed digit. The trigger N turns on and conditions pentode 97 at this differential time. A number of positive pulses equal to the value of the digit are then inverted by the conditioned pentode to negative entry pulses. The trigger N and pentode 97 of each of orders 1 to 6 of DD—PQ constitute a dividend entry control device. Since these entry control devices are alike, only the one for the 5th order is shown complete.

The suppressors of pentodes 97 are connected to a common wire 98 which taps a voltage divider 99 interposed between lines G and BI. Hence, in the absence of a positive pulse on the wire 98, the suppressors of pentodes 97 are all below critical potential, blocking the pentodes regardless of their control grid bias. Wire 98 is coupled by a capacitor 100 to a wire 101 which leads to the anode of a tetrode B24 (Fig. 6d). The grid of B24 is connected by a high value resistor to line B; hence, B24 is normally conductive. The grid of B24 also connects via a coupling capacitor 112 to the anode of tube b of a trigger B23. Each time this trigger swings from off to on status, a negative pulse appears on the anode of tube b and is conducted by capacitor 112 to the grid of tube B24. In consequence, B24 becomes momentarily non-conductive and applies a positive pulse to wire 101 which is transferred by capacitor 100 (Fig. 6j) to the suppressors of entry control pentodes 97. The positive pulse on the suppressor of a pentode 97 is inverted to a negative entry pulse provided the related trigger N has been turned on by a dividend sensing circuit. The entry control pulses; i. e., those applied to the suppressors of pentodes 97 are produced at mid-index times of machine cycle index points 9 to 1 (Figs. 4a and b). This is accomplished by repeated double reversals of the trigger B23 (Fig. 6d) under control of cam contacts of the reading-recording section. For this purpose, the right side of trigger B23 is connected by parallel cam contacts P6 and P7 and successive cam contacts CB1 and CB2 of the reading-recording section to the +40 v. line, while the left side of B23 connects via cam contacts P2 and P3 and CB3 and CB4 to the same line. Trigger B23 initially is off. Midway between 9 and 8 of the machine cycle, a pulse of positive tripping potential is fed from the +40 v. line through cam contacts CB3, CB4, and P2 (also see Figs. 4a and b) to the left side of trigger B23, turning it on. In consequence, a negative pulse is applied by the trigger to tube B24 to render it non-conductive. Tube B24 thereupon produces a positive entry control pulse upon wire 101. At 8 of the machine cycle, a positive tripping pulse is fed from the +40 v. line via cam contacts CB1 and CB2 and P6 to the right side of B23, turning it off again. Midway between 8 and 7 of the machine cycle, cam contacts CB3 and CB4 and P2 and P3 pass another tripping pulse to the left side of trigger B23, turning it on again. Half a machine cycle point later, B23 is turned off by a positive pulse passed through CB1, CB2, P6 and P7. B23 is turned on for the ninth and last time during the machine cycle midway between "1" and "0" of the cycle. At "0," both P2 and P3 are both open and prevent passage of a pulse for tripping on B23. The ninth pulse for tripping B23 off is effective at "0." Trigger B23 remains off until it is tripped on again midway between 9 and 8 of the next machine cycle.

In the foregoing manner, B23 is tripped on repeatedly nine times during a machine cycle at mid-index times of its sensing period, "9" to "1," for significant digit representations on a card. In turn, the tube B24 produces nine positive entry control pulses which are fed by wire 101 and capacitor 100 (Fig. 6j) to wire 98, which applies the pulses to the suppressors of entry pentodes 97. The pentodes conditioned by increased control grid potential invert the pulses applied to the suppressors into negative entry pulses on wires IN of orders 1 to 6 of register DD—PQ. A differential number of entry pulses will be produced by a pentode 97, depending on the differential time at which the pentode is conditioned, in turn dependent on the value sensed in the related card column. As previously explained, index positions 9 to 1 of a card successively pass brushes 17 (Figs. 1 and 5) at the 9 to 1 times of a second machine cycle of operation on the card. When a brush 17 senses a perforation representing a digit in one of the dividend columns, a sensing circuit is established to condition the entry control means for the related order of DD—PQ. Assume, for example, that the card shown in Fig. 2 is passing the brushes 17. At the 2 time of the machine cycle, the 2 perforation in column 2 is sensed, establishing the following circuit:

*Dividend sensing circuit.*—From the +40 v. line (Fig. 5), thence via cam contacts CB6 and CB5, card lever relay contacts R8b, the common contact roll 1021, the brush 17 for column 2, the connected plug socket PB2, thence via a plugwire (not shown) to socket PD5 (Fig. 6j) and via resistor r60 to the left side of trigger N of the 5th order of DD—PQ.

The positive pulse applied by this circuit to trigger N turns it on at the exact "2" time of the machine cycle (note the timing of CB5 and CB6 in Figs. 4a and 4b). With N on, it conditions related tube 97 to respond to the positive entry control pulses on its suppressor. Midway between "2" and "1" of the machine cycle, one such pulse is applied to the suppressor and midway between "1" and "0," a second such pulse is applied. The pentode inverts these two pulses to negative entry pulses, causing entry of 2 into the 5th order of DD—PQ.

It is clear now that the number of entry pulses passed to an order is proportional to the value of the sensed digit representation. In this manner, when the machine is in dividing condition, the dividend is transferred from a card to the first six orders of DD—PQ during the second machine cycle of operation on the card, the entry being completed before "0" of the cycle.

7. *The entry into MC—DR*

An entry is made into register MC—DR (Fig. 6j) in a manner similar to that explained for the entry of the dividend into DD—PQ. The entry control means of MC—DR includes, for each order, a trigger D and a pentode 116 which have the same functions as trigger N and pentode 97 of the entry control means for DD—PQ. Prior to starting a run, the plug sockets PB wired to the brushes 17 (Fig. 5) which sense the chosen divisor or multiplicand field of the card are plugged to sockets PF (Fig. 6f). For instance, if the cards of a run have the divisor or multiplicand factor in columns 7 to 12, then the sockets PB7 to 12 are plugged to sockets PF6 to 1, respectively. When a digit in one of these columns is sensed, a circuit similar to the one traced before, applies positive tripping potential to the pertinent trigger D, turning it on. With D on, it conditions the related pentode 116 to invert positive entry control pulses on its suppressor to negative entry pulses for the related order of MC—DR. The entry control pulses are fed, via a capacitor 110, to the suppressor of pentodes 116 (Fig. 6f) from the same wire 101 which feeds these pulses via capacitor 100 to pentodes 97 of the entry means for DD—PQ (Fig. 6j).

A third register MP (Fig. 6m) is provided to receive the multiplier factor when the machine is to perform a multiplying computation. The MP register will be considered in Section 18.

After entry of the terms or factors into their receiving registers during a machine cycle, the operation of the computing section is initiated to perform the required calculation. The initiation of computing operations is timed by cam contacts P11 which close between "11" and "12" of the machine cycle (see Figs. 4a and 4b). Before explaining initiation of computing operation in detail, means producing operating pulses for the computing devices will be described.

8. *The multivibrator and pulse shapers*

A suitable oscillator is required as a parent source of operating pulses for various elements of the computing section. The oscillator provided here is a multivibrator A34 (Fig. 6a) which includes tubes 20 and 21 cross-coupled in the usual manner. The potential across lines B and B1 is applied via a resistor 22 and voltage regulator tube VR to the anode resistors of tubes 20 and 21. A common portion 24 of the grid leak paths is adjustable to provide for frequency regulation. As is well known, the multivibrator develops roughly square-topped waves of potential on the outputs of the two tubes, the waves on one output being 180 degrees displaced in phase from those on the other output. In the present case, the multivibrator is operated at a mean frequency of approximately 50,000 oscillator cycles per second. Fluctuations in the frequency of the multivibrator do not affect the accuracy of computing operations since the multivibrator itself is the master timer of the computing operations. In the present case, the output of only tube 20 is utilized.

The output of tube 20 of multivibrator A34 is fed via a condenser 26 to a clipping circuit including voltage divider 30 and tube A40. The grid of A40 is connected via a portion of the divider 30 to line B; hence, the tube is normally conductive, so that the positive halves of the applied waves are clipped and inverted to amplified negative, substantially square-topped wave portions. On the other hand, the negative halves of the applied waves are not clipped and are inverted by the tube to amplified positive, unshaped wave portions.

The output of tube A40 is fed via a coupling circuit 32 to a clipping circuit such as the one described above and including tube A35. Tube A35 clips the unshaped positive halves of the waves applied to its grid and inverts them to negative, substantially square-topped wave portions. The previously shaped negative halves of the applied waves are not clipped but inverted to positive, substantially square-topped wave portions. Thus, tube A35 produces, on its output line A, waves with practically square-topped negative and positive halves, as indicated in the first lines of Figs. 7a to 7e. These waves are called here the A waves and any pulses in the phase of these waves, regardless of the source, may be called A pulses.

The A waves developed by tube A35 are also fed at reduced amplitude to a capacitor 33 and thence to another clipping circuit which includes tetrode A36. This tube inverts the A waves and amplifies them, producing, on its output line BP, square-topped waves represented in lines 2 of Figs. 7a to 7e. The latter waves are called here the B waves and any pulse, regardless of its source, may be called a B pulse if in the phase of the B waves. It is to be noted that the A and B waves are 180 degrees out of phase with each other.

9. *The primary electronic commutator*

The primary electronic commutator produces different combinational patterns of electrical effects at differential times of each computing cycle. These electrical effects are distributed to various elements of the electronic circuits to control their operation, and such elements include means to interpolate, from the combinational patterns, differentially timed electrical effects required for operating other elements of the computing section. It is preferred here to use a primary commutator composed of four stages and stepped in binary fashion. Referring to Fig. 6a, the four stages are designated A21, A22, A23, and A24 and each comprises a trigger. The first stage is initially off and the other three are initially on. Operation of the commutator is effected by negative B pulses developed by a pentode A20 after computing is initiated under control of the reading-recording section. The pentode suppressor taps a voltage divider 35 between line B1 and ground at such a point that it is normally at blocking potential. The suppressor also is connected by a capacitor 37 to the A pulse line. The grid of pentode A20 connects to the grid of tube b of a trigger A19 and follows it in potential. This trigger is initially off, so that the grid of its tube b is at blocking potential, as is the connected grid of A20, preventing response of A20 to the positive A pulses applied to its suppressor. The grid of tube a of trigger A19 is coupled to the anode resistor of tube b of a trigger A7. This trigger also if off initially; hence, the anode of its tube b is at high potential. Start of computing operation is effected upon closure of cam contacts P11 of the reading-recording section after card lever relay contacts R1BU have closed. As previously explained in Section 2, card lever relay R1 (Fig. 5) is energized late in the second machine cycle of operations on a run of cards. Specifically, relay R1 is energized within the second machine cycle (Fig. 4a) at "0," which is after index position rows 9 to 1 of the first card have been analyzed. After the start of the "11" machine cycle time, cam contacts P11 close. With contacts P11 and R1BU (Fig. 6a) closed, the +40 v. line of the reading-recording section is connected via these contacts and a resistor 41 to the grid of tube b of trigger A7, impressing a positive potential on this grid sufficient to trip A7 to its on status. As A7 turns on, a negative pulse is developed on the anode of its tube b and transmitted via a portion of its anode resistor to the coupled grid of tube a of trigger A19. The negative pulse is of sufficient amplitude to reverse trigger A19 from off to on state. With A19 now on, the grid of its tube b is above cut-off potential, as is the connected control grid of pentode A20. With the control grid of the pentode above critical potential, the tube will still be blocked by negative pulses on the suppressor but will pass current upon the positive pulsing of the suppressor. In short, pentode A20 now is responsive to the A pulses being applied to its suppressor. Pentode A20 inverts these A pulses to B output pulses which are fed to the grids of tubes a and b of the first stage trigger A21 of the primary commutator. As previously explained in Section 3, the positive pulses applied to the trigger are of insufficient amplitude to affect its status while the negative pulses effect reversals, one for each such pulse. Reference to Fig. 7a shows that prior to commencement of the computing cycles, A21 is off and A22, A23 and A24 are on. The D point may be taken to represent the time of closure of cam contacts P11 of the reading-recording section. Shortly after the D point, trigger A7 is turned on, tripping A19 on at the time indicated in line 14. This conditions tube A20 to respond to the applied A pulses, such conditioning being indicated by the sectioned portion of the A20 line of the timing chart. It may be mentioned that the conductive status of a tube is indicated by solid heavy portions of the related timing line, while a conditioning of the tube for enabling it to become conductive is indicated in all cases by the sectioned portion of the timing line. With tube A20 now conditioned, it acts, in response to the applied positive A pulses to produce negative B pulses. It produces the first negative pulse one cycle point prior to the 1st computing cycle. This negative pulse is applied to the first stage A21 of the primary commutator and trips it on, as indicated in line 3 of Fig. 7a. The next negative pulse developed by tube A20 returns stage A21 to its off state. As A21 turns off, its tube a develops a negative pulse which is fed to the second stage A22, tripping off the second stage. As A22 turns off, its tube a develops a negative pulse which is applied to the third stage A23. Stage A23 turns off and its tube a develops a negative pulse which is applied to the fourth stage A24 to turn it off. The result is that all the stages A21, A22, A23, and A24 now are off and the time of this occurrence is taken as the start or 0 point of a computing cycle.

The next negative pulse applied to A21 trips it on at the 1 time of a computing cycle. As A21 turns on, its tube a develops a positive pulse which has no effect on the next stage A22. A second negative pulse is applied at the 2 time to stage A21, returning it to off state. Thereupon, it applies a negative pulse to A22 to turn it on. Thus, each applied negative pulse reverses A21 but the next stage A22 is reversed only once for every two pulses applied to A21. Similarly, A23 is reversed once for every two tripping pulses applied to A22, while A24 is reversed once for every two tripping pulses received by A23. The combinational patterns of on and off states of the stages of the primary commutator are indicated in lines 3 to 6 of the timing charts (Figs. 7a to 7e). It is seen that there is a different pattern at each of the cycle points 0 to 15 of the sixteen-point computing cycle.

The primary commutator will continue to function as long as trigger A19 remains on. Trigger A19 is turned off, in a manner explained later, by the computing section itself when it completes the computation involving a pair of terms. On the other hand, the trigger A7 is turned off upon removal of negative potential from line CB1 which occurs upon the opening of cam contacts P8 (see Figs. 3 and 6a) of the reading-recording section, as previously described. Were A7 to control tube A20 directly instead of through trigger A19, then termination of commutator operation would be timed by the restoration of A7 which is under control of a cam in the reading-recording section. It is preferred, however, to terminate commutator operation under control of the computing section itself and, for this reason, the trigger A19 is introduced between A7 and A20 and means are provided in the computing section to turn off A19 at a predetermined point of a computing cycle, after termination of computing operation.

10. *The column shift means*

The column shift means is utilized for both multiplying and dividing computations. It will be explained in this section in relation to the dividing computation. In later Section 18, its control during the multiplying computation will be described.

Division is performed here by over and over subtraction of the divisor from the dividend and its successive remainders. As already described, the dividend is transferred from the record card into orders 1 to 6 of DD—PQ (Fig. 6j) while the divisor is transferred from the card into the orders of MC—DR (Fig. 6f). Computing cycles are then initiated in the manner previously explained. The first step of dividing during the computing cycles is to transfer the divisor subtractively from MC—DR to orders 6 to 11 of DD—PQ, to determine whether the divisor goes into the highest order digit of the dividend. If a "go" condition occurs, then a second subtractive entry of the divisor into orders 6 to 11 of DD—PQ, is effected. This process is repeated until a "no go" condition occurs. As a result of such condition, the true value of the divisor is transferred to orders 6 to 11 of DD—PQ after which means are brought into operation for routing the subtractive entry of the divisor into orders 5 to 10 of DD—PQ. In similar fashion, further shifts of the divisor entry to the right with respect to the DD—PQ orders take place in consequence of no-go conditions. Routing of the divisor entries into DD—PQ is controlled by the column shift means. Six column shift networks are required for a six place dividend, but a seventh network is used here for rounding off purposes. The condition of the column shift means in which it routes entries into a group of columns of DD—PQ may be called a column shift position. All operations occurring in a column shift position may be grouped as a calculating step which, for the dividing computation, may be referred to as a dividing step.

The column shift means includes an electronic column shift control commutator (Fig. 6g) composed of a chain of triggers S1 to S7 and respectively associated tubes SS1 to SS7. The anode of tube a of each trigger is coupled to the right side of the next trigger, so that when a trigger turns off, the full amplitude of the negative pulse (about —100 v.) produced on the anode of its tube $a$ is applied to the right side of the next trigger and is effective to turn it on. Initially, S1 is on while S2 to S7 are off. All the triggers have their left sides connected to a common wire 126. Wire 126 taps the junction of resistors $r9$ and $r10$ together forming the anode resistor of a tube TR19. Resistor $r9$ has a value in the order of 1500 ohms while $r10$ has a resistance in the order of 3500 ohms. Tube TR19 normally is biased off; i. e., to non-conductive status. When the tube is turned on; i. e., rendered conductive, its anode potential drops from about 150 volts to 50 volts. Owing to the relation of the resistors $r10$ and $r9$, a negative pulse of approximately —35 v. amplitude is produced on the wire 126 and transmitted thereby to the left sides of all of the triggers S1 to S7. A negative pulse applied to the left side of a trigger tends to trip it from on to off status. Hence, the first such negative pulse produced on wire 126 during the course of a computation turns off trigger S1, the only one which is initially on. As S1 turns off, its tube $a$ develops the negative pulse of about —100 v. which is applied to the right side of trigger S2 and turns it on. The left side of S2 also is receiving the negative pulse of about —35 v. from the wire 126 but, for several reasons, does not prevent S2 from turning on under the influence of the negative pulse being impressed on its right side by trigger S1. In the first place, as explained in Section 3, even if negative pulses of the same amplitude were applied to opposite sides of a trigger, only the one negative pulse for reversing the state of the trigger would take effect. In the second place, the negative pulse applied to the right side of trigger S2 is stronger than the negative pulse applied to its left side.

It is clear now that the first negative pulse on wire 126 will turn off S1 to cause S2 to go on. The second pulse on wire 126 will turn off S2, causing S3 to go on. Similarly, successive pulses on wire 126 will turn off successive ones of the triggers in on state to cause their following triggers to turn on. The seventh pulse on wire 126 will turn off S7. All the triggers will then be off until the cancel bias line CBI (A) is disconnected from line BI, whereupon S1 will go on and S2 to S7 will stay off, the commutator thus being restored to its original first column shift position. The manner in which tube TR19 is turned off to produce a negative pulse on wire 126 will be explained in Section 13. It may be mentioned now that, in the dividing computation, a negative pulse is produced on wire 126 at the end of each dividing step.

When a trigger S1 to S7 is on, the grid of its tube $a$ and the connected grid of the related tetrode SS1 to SS7 are below critical potential. But when the trigger is off, the grid of its tube $a$ and the control grid of the related tetrode are above critical potential. Since S1 is initially on, the tetrode SS1 is initially non-conductive, and since the other triggers S2 to S7 are initially off, the tetrodes SS2 to SS7 are initially conductive. In successive dividing steps, the on state is advanced to successive triggers, so that in each dividing step a different trigger is on and its related tetrode non-conductive.

The anodes of tetrodes SS1 to SS7 are connected by wires $w1$ to $w7$ to voltage dividers $r11$ to $r17$ (Fig. 6e), respectively. Dividers $r11$ to $r16$ terminate at line N and are tapped by the suppressors of pentodes D1 to D6, respectively. Divider $r17$ terminates at line BI and is tapped by the grid of a triode DV16. The above arrangement provides for each of the tubes D1 to D6 and DV16 to be biased off; i. e., to non-conductive status when the related tetrode SS1 to SS7 is conductive and, hence, at low anode potential. When one of the tetrodes is non-conductive, its resulting high anode potential drives the suppressor of the related tube D1 to D6 or the grid of DV16 above critical potential. Initially, SS1 is non-conductive and SS2 to SS7 are conductive, as stated before. Hence, at the start, the suppressor of only tube D1 is above critical potential and thereby conditioning D1 to respond to pulsing of its control grid. At the end of the first dividing step, SS2 alone is non-conductive, so that only D2 is conditioned to respond to pulsing of its grid. Similarly, in the third, fourth, fifth, and sixth dividing steps, the pentodes D3, 4, 5, and 6 respectively are conditioned. During the seventh dividing step, a pentode D7 is to be conditioned as a result of trigger S7 being in on state and related tetrode SS7 being non-conductive. As mentioned before, the seventh calculating step is performed for rounding off or half pick-up purposes. In dividing, the half pick-up involves entry of 5 into the sub-units quotient order and also involves entries of the divisor into orders of DD—PQ selected by the 7th column shift position to determine if the sub-units order quotient is 5 or more. For controlling entries of the divisor into DD—PQ during the 7th dividing step, pentode D7 must be operative. In multiplication, the half pick-up involves merely the entry of 5 into the sub-units product order. Hence, if the machine is set for multiplication, the pentode D7 is to remain unconditioned in the seventh column shift position. For this reason, tetrode SS7 (Fig. 6g) controls D7 indirectly through triodes DV16, DV15 and M15. The anodes of DV15 and M15 are tied together, so that their anode potential is high only when both tubes are nonconductive. The anodes of DV15 and M15 connect to a voltage divider $r19$, terminating at line N, and tapped by the suppressor of D7. Depending on whether the common anode potential of DV15 and M15 is low or high, the suppressor of D7 is below or above critical potential, respectively to prevent or permit D7 to respond to the pulsing of its control grid. The grid of DV15 taps the midpoint of a voltage divider $r18$ between line BI and the anode of DV16. Except in the seventh column shift position, DV16 is non-conductive and renders DV15 conductive. In the seventh column shift position tetrode SS7 (Fig. 6g) is non-conductive, rendering DV16 conductive which, in turn, renders DV15 non-conductive. There will be a rise in anode potential of DV15 provided M15 is non-conductive. During the dividing calculation M15 is maintained non-conductive, allowing the anode potential of DV15, when non-conductive, to rise. During the multiplying calculation, M15 is maintained conductive, preventing a rise in anode potential of DV15 even when non-conductive. To control the status of M15, its grid taps the midpoint of a voltage divider $r20$ interposed between line BI and a wire MW. Wire MW connects to socket MPY (Fig. 6d). When the machine is in dividing condition, socket MPY is not plugged to socket COM but when the machine is set to multiply, sockets MPY and COM are plugged to each other. Socket COM connects to line B. Hence, with the machine in dividing condition, there is no potential on socket MPY and connected wire MW, so that tube M15 (Fig. 6e) is biased off. With M15 off, it allows the anode potential of DV15 to rise in the seventh column shift position so as to condition D7. When the machine is set for multiplication, the potential of line B is applied to wire MW, forcing the grid of M15 above critical potential. Under this condition, M15 is constantly conductive, preventing DV15, in the 7th multiplying step from conditioning the pentode D7.

It is stated now that there are several elements such as M15, all identified by prefixing letter M to their reference designations, which are operative only during multiplication to prevent effective functioning of elements, such as DV15, which are to be utilized only in dividing calculations.

The control grids of pentodes D1 to D7 are tied to a common wire 123 which is coupled by a capacitor 124 to the B pulse wire BP connected to the anode of tube A36 (Fig. 6a). Thus, B pulses are continually applied to the control grids of pentodes D1 to D7 (Fig. 6e), causing each conditioned pentode to produce A pulses. The outputs of D1 to D7 are capacitatively coupled to the grids of tetrodes DT1 to DT7, respectively. The grids of DT1 to DT7 tap similar voltage dividers r21 interposed between lines B and BI. Hence, the grids DT1 to DT7 are normally above critical potential, maintaining these tubes conductive. When a conditioned pentode D receives a positive B pulse on its control grid, it applies a negative A pulse to the grid of the related tetrode DT. The tetrode DT becomes momentarily non-conductive and develops a positive B pulse. Such pulses, selectively developed by tetrodes DT1 to DT7, according to the column shift position, are applied via wires d1 to d7 and similar capacitors 125 (Fig. 6h) to wires ds1 to ds7 which connect to the suppressors of pentodes CS1 to CS7. There is a set of pentodes CS1 to CS6 for order 1 of MC—DR and a set of pentodes CS1 to CS7 for orders 2 to 6 of MC—DR. The pentodes CS1 to CS7 serve to transfer a number or its complement from MC—DR to DD—PQ in the first to seventh column shift conditions, respectively. The units place digit of the divisor is discarded in the seventh column shift condition and for this reason, it is unnecessary to provide a pentode CS7 for the first order of MC—DR. Each of wires ds1 to ds7 connects to the midpoint of a similar voltage divider r25 interposed between lines G and BI. Accordingly, the suppressors of CS1 to CS7 are normally biased below cut-off potential. The pentodes CS are conditioned by increased grid potential which occurs, as described in the next section of the description, under control of the orders of MC—DR. Any pentodes thus conditioned will emit negative A pulses if their suppressors are receiving positive B pulses. The outputs of CS1 of orders 1 to 6 of MC—DR flow into wires t6 to t11 (also see Fig. 6j) which are resistance-coupled to the input wires IN of orders 6 to 11 of DD—PQ, respectively. The outputs of CS2 of orders 1 to 6 of MC—DR similarly connect by wires t5 to t10 to the input wires of orders 5 to 10 of DD—PQ, respectively. The outputs of CS3 of the MC—DR orders lead via wires t4 to t9 to orders 4 to 9 of DD—PQ, and so on.

It is clear, now, that in the first column shift position, trigger S1 of the column shift commutator (Fig. 6g) is on and holding tetrode SS1 non-conductive. With SS1 non-conductive, it applies high potential via wire w1 and divider r11 (Fig. 6e) to the suppressor of D1, conditioning it to emit negative A pulses in response to the positive B pulses applied to its control grid. These negative A pulses are applied to tetrode DT1, causing it to apply positive B pulses via wire d1 and capacitor 125 to wire ds1 which impresses them on the suppressors of pentodes CS1 of orders 1 to 6 of MC—DR (Fig. 6h). The pentodes CS1, when conditioned by increased grid potential under control of the related orders of MC—DR, invert the positive B pulses applied to their suppressors to negative A entry pulses which are fed by wires t6 to t11 to orders 6 to 11 of DD—PQ (Fig. 6j).

In the second column shift position, only trigger S2 (Fig. 6g) is on and holding tetrode SS2 non-conductive. Hence, D2 (Fig. 6e) will alone be effective to produce A pulses which will be inverted by DT2 to B pulses and applied to pentodes CS2 of orders 1 to 6 of MC—DR. These pentodes will be effective then, within the intervals in which they are selectively conditioned by the related orders of MC—DR, to produce negative A entry pulses routed into orders 5 to 10 of DD—PQ.

In similar manner, CS3 to CS7 will be rendered sequentially effective for the third to seventh dividing steps.

11. *Reading out amounts from MC—DR to DD—PQ*

The dividend was entered in DD—PQ (Fig. 6j) and the divisor in MC—DR (Fig. 6f) during the entry period 9 to 1 of the second machine cycle of operation upon a card (see Fig. 4a), as explained in Sections 6 and 7. In the same machine cycle, the closure of P11 (also see Fig. 6a) initiated computing cycles (Figs. 7a to 7j), as explained in Section 9. If the machine is in multiplying condition, then only the true amount in MC—DR will be transferred, within a computing cycle, to orders of DD—PQ dependent on the column shift position. When the machine is in dividing condition, either the tens complement or the true figures of the amount standing in MC—DR are transferred within a computing cycle into orders of DD—PQ selected by the column shift means (see Section 10). The general procedure for reading an amount out of MC—DR is to apply a train of ten entry pulses within a computing cycle to each order of MC—DR, the first such pulse at the "1" time and the last at the "10" time. The number of entry pulses required to advance an order to zero is the tens complement of the number standing in the order. If the true number is to be transferred to a receiving order, then application of entry pulses to the receiving order starts one-half a cycle point after the order being read out (which may be called the exit order, for convenience) arrives at zero status and terminates at "9½" of the computing cycle. For instance, if the exit order stands at 2, the eighth entry pulse applied thereto, at "8" of the computing cycle, advances it to zero. This enables two entry pulses to be applied to the receiving order, one pulse at "8.5" and another pulse at "9.5" of the cycle. If the tens complement of the number in the exit order is to be read out into the receiving order, then the application of entry pulses to the receiving order starts at "0.5" of the cycle and is terminated by arrival of the exit order at zero status. For example, with 6 standing in the exit order, the fourth pulse applied thereto at "4" brings it to zero. Meanwhile, four entry pulses have been applied to the receiving order, at "0.5," "1.5," "2.5" and "3.5." The arrival of the exit order at zero status at the "4" time prevents application of further entry pulses to the receiving order. Thus, the tens complement 4 of the number 6 in the exit order has been transferred to the receiving order. If the nines complement is to be transferred from the exit order to the receiving order, then the first entry pulse is applied to the receiving order at "1.5" of the cycle and the arrival of the exit order at 0 prevents further application of entry pulses to the receiving order. As an example, if the exit order stands at 6, the fourth entry pulse at "4" advances it to zero. Meanwhile, entry pulses are applied to the receiving order at "1.5," "2.5," and "3.5." Thus, the nines complement 3 of the number 6 in the exit order will be entered in the receiving order. A detailed explanation follows.

Referring to Fig. 6c, the suppressor of a pentode B11 taps the midpoint of a voltage divider r26 between lines G and BI, so that it is normally biased below critical potential. The suppressor of B11 also is capacitatively coupled to the A pulse line. Each positive A pulse applied to the suppressor of B11 raises its potential above the critical point. However, B11 will not produce pulses in response to the continual pulsing of its suppressor unless it is conditioned by increased grid potential. The grid of B11 taps a voltage divider r27 between line N and the anode of a triode B9. When B9 is conductive, its low anode potential forces the grid of B11 to remain below critical potential. When B9 is non-conductive, its anode potential rises (provided a pentode M10 is non-conductive) and forces the grid of B11 above critical potential. Pentode B11 then is conditioned to respond to the pulsing of its suppressor. The output of B11 is applied, via a suitable capacitor, to the grid of a tube B12. The grid of B12 is resistance-coupled to line P so that it is normally above blocking potential. Assuming, then, that B11 is conditioned by high grid potential, it inverts the positive A pulses applied to its suppressor to negative B pulses. The negative B pulses are received by the grid of B12 which consequently produces positive A pulses upon the output wire b12. In a manner explained later in this section, the positive A pulses on wire b12 control reading out of register MC—DR (Fig. 6f).

The foregoing has explained the manner in which tube B12 (Fig. 6c) produces A pulses under control of means effective when the anode potential of B9 is allowed to rise. The grid of B9 is tied to the grid of tube a of a trigger B4. Hence, when B4 is off, the grid of B9 is above critical potential but when B4 is on, the grid of B9 is below critical potential. Hence, B9 is conductive and at low anode potential when B4 is off. With B9 at low anode potential, the tube B12 will not produce pulses. During the on period of B4, the tube B9 will be non-conductive. If the anode potential of B9, upon its becoming non-conductive, is allowed to rise, then B12 will function to produce pulses. When the machine is in dividing condition, B9 rises in anode potential whenever it is rendered non-conductive by the switching of trigger B4 to on status. When the machine is set for multiplication, the effective functioning of B9, by which is meant its production of increased anode potential when rendered non-conductive, is timed by a pentode M10.

For this purpose, the anode of B9 is tied to the anode of pentode M10. As is now understood, when either B9 or M10 is conductive, their common anode potential remains low. Both B9 and M10 must be blocked in order to permit their anode potential to rise. The grid of M10 is connected by a wire m10 to the grid of tube a of a trigger B3 (Fig. 6L) and is at high or low potential, depending on the status of trigger B3. However, as long as the suppressor of M10 is held below critical potential, M10 will remain non-conductive. The suppressor of M10 connects to the midpoint of a voltage divider r28 between line BI and the wire MW which leads to socket MPY (Fig. 6d). As previously explained, when the machine is in the dividing condition, there is no potential on socket MPY and wire MW, but if the machine is set for multiplication, then the potential of line B is applied via a plugwire between sockets COM and MPY to wire MW. Hence, when the machine is in dividing condition, the suppressor of M10 (Fig. 6c) is biased below critical potential, whereby M10 remains non-conductive. The potential on the anode of triode B9 will then be determined solely by the status of this triode during dividing calculations. When the machine is set for multiplication, the suppressor of M10 continuously stays above critical potential, and M10 will then be conductive or non-conductive depending on its grid potential being above or below the blocking value. When M10 is conductive, it suppresses effective functioning of B9 but when M10 is non-conductive, it allows B9 to function effectively. During a multiplying calculation, M10 will serve to time the effective operation of B9. During a dividing calculation, M10 is maintained in a status (non-conductive) which does not interfere with the effective functioning of B9 under control of the trigger B4. It may be stated, then, that during the dividing calculation, the production of pulses by B12 for controlling reading out of register MC—DR is timed by the operations of B4, B9, and B11, but during a multiplying calculation, there is additional control of the timing by the pentode M10.

It will be assumed for the remaining portion of this section that the machine is in dividing condition. As previously stated, the grid of B9 (Fig. 6c) is tied to the grid of tube a of trigger B4. Initially, B4 is off, so that the grid of tube a and the connected grid of B9 are above critical potential. Under this condition, B9 is conductive and maintains the grid of B11 below critical potential. Trigger B4 is turned on at "0.5" of each computing cycle (Figs. 7a to 7j) under control of a pentode B6 and turned off at "10.5" under control of a pentode B5. Both these pentodes have their suppressors capacitatively coupled to the B pulse wire BP. As now understood, it requires conditioning of the pentodes B5 and B6 by increase of their grid potentials in order for the pentodes to respond to positive pulses applied to their suppressors. The grid of B6 taps a voltage divider r29 interposed between line BI and a wire b6 which leads to the anode of tube a of a trigger A8 (Fig. 6b). Initially, A8 is off and its tube a is at low anode potential, so that the grid of pentode B6 (Fig. 6c) is then below critical potential. At the beginning of a computing cycle, stage A24 of the primary commutator (Fig. 6a) is switched off, as described in Section 9. Thereupon, its tube b develops a positive pulse which is transferred by a wire 72 and capacitor 73 (also see Fig. 6b) to the grid of a tube A17. Tube A17 thereupon becomes conductive and produces a negative output pulse which is fed via a portion of the anode resistor and thence via a wire a17 to the right side of trigger A8, turning it on. This action occurs at "0" (see part d of Figs. 7a to 7e). With A8 on, the high anode potential of its tube a is transmitted by wire b8 to the grid of pentode B6 (Fig. 6c), conditioning the pentode (see part e of Figs. 7a to 7e). The next positive B pulse is applied to the suppressor of B6 at "0.5" is inverted by B6 to a negative A pulse which is applied to the right side of trigger B4, turning it on.

It has been explained that A8 (Fig. 6b) was turned on at "0" in order to enable B6 (Fig. 6c) to turn on B4 at "0.5." After A8 has accomplished its function, it is turned off at "1" under control of stage A21 of the primary commutator (Fig. 6a). When A21 switches on at "1," it develops a negative pulse upon the output of wire a21L of its tube b. This negative pulse is transmitted by wire a21L to the left side of A8, turning it off at "1" of the computing cycle.

Trigger B4 (Fig. 6c) was turned on at "0.5." In the on status of B4, the grid of its tube a is depressed below critical potential, and the connected grid of triode B9 follows in potential. Hence, B9 is rendered non-conductive, whereupon its anode rises in potential, conditioning the pentode B11 at "0.5" (see part e of Figs. 7a to 7e). Pentode B11 then produces negative B pulses in response to the positive A pulses continually applied to its suppressor. Tube B12 receives the negative B pulses from B11 and inverts them to positive A pulses on wire b12. Ten of the A pulses from wire A are applied to the suppressor of B11 between "1" and "10," inclusive, of the cycle before the conditioning of B11 is terminated at "10.5." Such termination is brought about under control of pentode B5. The control grid of B5 connects to the midpoint of a voltage divider r30 which is interposed between line BI and a wire a30 leading to the anode of a tube section A30 (Fig. 6b). The grid of A30 connects to the grid of tube a of a trigger A15. Initially, trigger A15 is off, so its tube a is at comparatively high grid potential as is the tube A30. Accordingly, A30 is conductive and its low anode potential holds the connected grid of B5 (Fig. 6c) below critical potential. Trigger A15 (Fig. 6b) is turned on under control of a pentode A16 which is one of the devices for interpreting the combinational patterns of voltage conditions produced by the primary commutator (see Section 9). The suppressor of A16 taps a voltage divider r31 extending between line N and wire a16 which leads to the anode of tube a of stage A24 of the primary commutator (Fig. 6a). In the off periods of A24, the anode of its tube a is at low potential, so that the suppressor of A16 (Fig. 6b) is then below critical potential. In the on intervals of A24, its tube a is at high anode potential such that the suppressor of A16 is above critical potential. A16 is thereby conditioned to respond to positive pulsing of its grid. The grid of A16 is normally below cut-off potential, as will now be recognized, and is capacitatively coupled to a wire a22 leading to the anode of tube a of stage A22 (Fig. 6a) of the primary commutator. Whenever stage A22 switches on, its tube a develops a positive pulse which is transferred by wire a22 to the capacitatively connected control grid of A16. It is clear that conditioning of A16 by increased suppressor potential and positive pulsing of its grid are both required to render A16 conductive. The requirement is met only when A22 is switched on during an on period of A24. Reference to section b of Figs. 7a to 7e shows that this occurs only at "10" and "14" of a cycle. The tube A16 (Fig. 6b), therefore, is rendered momentarily conductive at "10" and "14" (see section e of Figs. 7a to 7e). Each time A16 is rendered conductive, it develops a negative output pulse. Thus, A16 produces differentially timed negative pulses, at "10" and "14," under control of the primary commutator. Each negative output pulse of A16 is applied to both sides of trigger A15 to reverse it from either status to the other. The first of these negative output pulses, at "10," turns on A15 and the second of these pulses turns it off again at "14" (see section d of Figs. 7a to 7e).

When A15 turns on at "10," its tube a and the follower tube A30 become non-conductive. The consequent increase in anode potential of A30 is transmitted by wire a30 and voltage divider r30 to the grid of pentode B5 (Fig. 6c), whereupon B5 is conditioned for response to the positive B pulses being continually applied to its suppressor by the B pulse wire. Thus, B5 is conditioned at "10" to invert the positive B pulse received at "10.5" to a negative output pulse which is applied to the left side of trigger B4, returning it to off status (see part d of Figs. 7a to 7e). As B4 goes off at "10.5," its tube a and the follower tube B9 become conductive. With B9 conductive, its comparatively low anode potential depresses the grid of pentode B11 below critical potential, thereby terminating the conditioning of B11 at "10.5."

In the foregoing manner, B11 is conditioned at "0.5" and its conditioning is terminated at "10.5" (see part e of Figs. 7a to 7e). During its conditioned period, B11 receives ten positive A pulses from the A pulse wire and inverts them to negative B pulses which, in turn, are inverted by tube B12 to positive A pulses on wire b12. Positive A pulses are thus produced by B12 at "1," "2," "3," "4," "5," "6," "7," "8," "9" and "10" of each computing cycle. The A pulses produced on wire b12 are fed via a suitable capacitor to a wire 144 (Fig. 6f) and thence to the grids of six entry control triodes E, one for each order of register MC—DR. Triodes E normally are biased off by connection of wire 144 to a suitable point of a voltage divider r32 interposed between lines G and BI. Each positive A pulse applied by wire 144 to the grids of triodes E drives the triodes momentarily conductive to produce negative B pulses fed to the IN lines of the MC—DR orders to effect a step of value advance of each order. Since ten positive pulses are applied to triodes E during the computing cycle, the triodes produce ten entry pulses, so that the orders of MC—DR are all operated through a value cycle of ten steps, from their initial value positions back to the same value positions. The entry pulses thus produced by triodes E may be referred to as the pulses for rolling out the amount in MC—DR. At differential times of the computing cycle in accordance with the value in the different orders, they step during their value cycles from 9 to 0. Considering each order, the number of pulses for producing the 9 to 0 value step is the tens complement of the value initially in the order. When a register order steps from 9 to 0, it generates a positive pulse on its output wire 8b (see Fig. 6f), in the manner explained in Section 5 in connection with Fig. 6j. This pulse, by reason of its differential timing, serves as a manifestation of the value initially in the order and may be called the digit readout pulse. The readout pulse on wire 8b of an MC—DR order is transmitted via a suitable capacitor to a wire rd which is resistance-coupled to the grids of a pair of pentodes TP and CP, so that the positive readout pulse raises the grid potential of both pentodes above critical value. Only one of the pentodes will be conditioned, by increased suppressor potential, to respond to the readout pulse. The pentodes TP of all the orders are conditioned when the true number is to be read out, while the pentodes CP are conditioned when the complement of the number is to be read out. Associated with each pentode TP in reading out a true number is a pentode TN. When a true number is to be read out in a cycle, a positive conditioning potential is applied beforehand to a wire $tw$ which is suitably coupled to the suppressor grids of all the pentodes TP and to the control grids of all the pentodes TN. These suppressor and control grids normally are biased below critical potentials and are driven above their critical potentials upon application of the positive conditioning potential to wire $tw$. Similarly, there is associated with each of the pentodes CP in reading out a complement, a pentode CN. When a complement is to be read out in a cycle, positive conditioning potential is applied prior to start of the cycle upon a wire $cw$ which is suitably coupled to the control grids of all the pentodes CN and to the suppressor grids of all the pentodes CP to raise the potentials of these grids above their critical points. The means by which conditioning potential is applied selectively upon wire $tw$ and $cw$ will be explained in Section 13 of the description.

There is a set of tubes CP, CN, TP and TN associated with each order of MC—DR. Also associated with each order is a trigger RT (Fig. 6h). The anode of tube $a$ of RT is tied to the anodes of CP and TN (Fig. 6f) by a wire "off" while the grid of tube $a$ of RT is suitably coupled by means including a wire "on" to the anodes of TP and CN. Trigger RT is initially off. Upon either TP or CN being rendered conductive, it produces a negative pulse which is transmitted to the grid of tube $a$ of RT to turn on RT. With RT on, it will be turned off upon either CP or TN being rendered conductive since the drop in anode potential of CP or TN will be applied to the anode of tube $a$ of RT. Moreover, if either CP or TN is conductive, its low anode potential blocks a rise in anode potential of tube $a$ of RT, so that RT would not be turned on even if a negative pulse be transmitted to the grid of tube $a$ from either TP or CN. Accordingly, when reading out a true number from an order of MC—DR, should the tubes TP and TN of the same order be concurrently rendered conductive, the tube TN will prevent RT from being turned on by the negative pulse received from TP. The concurrence of action of TP and TN of an order may take place when this order stands at 0 and a true number is being read out, as will be made clear later by an example. Similar concurrence of action of CP and CN of an order from which a nines complement is being read out may take place if such order stands at 9. A nines complement may be read out of orders 2 to 6 of MC—DR and if any of these orders stands at 9, then CP and CN of the order will be rendered conductive at the same time, and CP will block RT from being tripped on.

Thus, either when the true number is being read out of any order standing at 0 or when the nines complement is being read out of any of orders 2 to 6 standing at 9, the related trigger RT will not be turned on. With regard to the units order of MC—DR, its tens complement is always read out during complement transfer to DD—PQ and if the units order stands at 0, the units order trigger RT will be turned on at "0" by CN and turned off at "10" by CP of the same order. As will be described below, the on period of trigger RT determines the number of entry pulses applied to a selected order of DD—PQ. Hence, if RT is not on during a cycle, then there will be no entry into the selected order of DD—PQ whereas if RT is on between "0" and "10," ten pulses will be applied to the selected order of DD—PQ to advance it through a complete value cycle. Thus, in reading out a true number, if any order of MC—DR stands at 0, there will be no entry into an associated order of DD—PQ. In reading out a complement, if any of orders 2 to 6 of MC—DR stands at 9, no entry will be effected into the associated order of DD—PQ, but if the units order of MC—DR stands at 0, then ten entry pulses will be applied to the associated order of DD—PQ. The control by trigger RT of the number of entry pulses applied to an order of DD—PQ will now be explained.

The grid of tube $b$ of RT (Fig. 6h) of each order is connected to a wire $ro$ which is resistance-coupled to the control grids of all the column shift pentodes CS relating to the same order. When RT is off, the grid of its tube $b$ is at low potential as are the control grids of the related pentodes CS. The pentodes CS are then not in condition to respond to the positive pulses selectively applied to their suppressors in different column shift positions, as described in Section 10. On the other hand, when RT is on, the grid of its $b$ and, therefore, the control grids of the related CS tubes are above critical potential. The tubes CS are thereby conditioned to produce negative pulses in response to the selective pulsing of their suppressors. The negative pulses produced by tubes CS are selectively routed via the wires $t$ to orders of DD—PQ (Fig. 6g) to serve as entry or read-in pulses. It is clear that the number of read-in pulses produced in a cycle by a tube CS depends on the differential period in which its conditioning trigger RT is in on status.

If a true number is to be read out, pentodes TP and TN (Fig. 6f) are conditioned, as previously stated. The positive readout pulse upon wire $tb$ of the order is applied, at a differential point of the cycle which is the tens complement of the value initially in the order, to the control grid of TP. Since TP is conditioned, it responds to the readout pulse and produces a negative pulse which is impressed via wire "on" upon the right side of RT (Fig. 6h), turning it on. At the "10" point of the cycle, a positive pulse is applied to a wire $w$"10" (Fig. 6f) capacitatively coupled to a wire which is tapped by the suppressors of all the tubes TN. Since tubes TN have been conditioned, they are driven momentarily conductive by the positive "10" pulse applied to their suppressors. Their consequent reduced anode potentials are transferred via wires "off" to the anodes of tube $a$ of triggers RT (Fig. 6h), turning them off. Thus, each trigger RT is on for a differential number of cycle points which is the tens complement of the cycle point at which the readout pulse from the related order of MC—DR was produced. Since the cycle point at which the readout pulse occurs is the tens complement of the value initially in the order of MC—DR, it is clear that RT is on for a differential number of cycle points equal to the number initially present in the order, when a true number is being read out. With RT on, it conditions the related CS tubes, and the one receiving pulses on its suppressor produces a number of entry pulses equal to the true number in the MC—DR order. These entry pulses are routed to an order of DD—PQ, thus entering therein the true number read out of an order of MC—DR.

On the other hand, if a complement is to be read out of the order of MC—DR, tubes CN and CP are conditioned, as stated before. The tens complement is always read out of the units order of MC—DR and the nines complements are read out of the remaining orders of MC—DR. This is done regardless of whether the units order and orders to the left of the units order contain zeros. Under such circumstances, conversion to a true tens complement automatically occurs in the receiving register DD—PQ, by reason of the carries effected therein, as will be made clear in the next section. To provide for reading out a tens complement from the units order of MC—DR, a "0" positive pulse is applied to a wire $w"0"$ which is capacitatively and resistively coupled to the suppressor of conditioned tube CN of the units order. In response to the "0" positive pulse applied to its suppressor, tube CN of the units order produces a negative pulse which is fed to the right side of RT (Fig. 6h), of the units order. RT turns on and conditions tubes CS1 to CS6 in the units order, enabling the one receiving pulses on its suppressor to produce entry pulses for a selected order of DD—PQ. The readout pulse on wire $8b$ (Fig. 6f) from the units order of MC—DR acts through conditioned tube CP to turn off RT (Fig. 6h) and stop production of entry pulses by the active CS tube in the units order. Since the units order trigger RT was on from the "0" time until the cycle time corresponding to the tens complement of the digit in the units order of MC—DR, the active CS tube has produced a number of entry pulses equal to this tens complement. Thus, the tens complement of the digit in the units order of MC—DR is read into a selected order of DD—PQ. With regard to orders 2 to 6 of MC—DR, their conditioned tubes CN (Fig. 6f) receive a "1" positive pulse from a wire $w"1"$ capacitatively and resistively coupled to a wire tapped by the suppressors of these CN tubes. Accordingly, the triggers RT (Fig. 6h) of orders 2 to 6 are turned on at "1." The readout pulses from these orders of MC—DR act through their respective tubes CP (Fig. 6f) to turn off the RT triggers (Fig. 6h) at the cycle times which are in tens complement relation to the digits standing in the orders, respectively. Since the RT triggers of orders 2 to 6 of MC—DR were on from the "1" time until the tens complementary index times of the digits in these orders, the related active CS tubes will produce, in each order, a number of entry pulses which is one less than the tens complement of the digit initially present in the order. In other words, the nines complement of the number standing in orders 2 to 6 of MC—DR is transferred to selected orders of DD—PQ.

The production of the "10," "0," and "1" positive pulses upon wires $w"10,"$ $w"0,"$ and $w"1"$ (Fig. 6f) will now be explained. It was mentioned in the explanation of the entry of a true number, that the "10" pulse from wire $w"10"$ is applied to the suppressors of all the TN tubes. Wire $w"10"$ connects to the anode of a tetrode A11 (Fig. 6b). The grid of A11 is resistance-coupled to voltage line B, so that A11 normally is conductive. The grid of A11 also is capacitatively coupled to a wire $a11$ leading to the anode of a triode A3. The grid of A3 is connected to the grid of tube $b$ of the trigger A15 and follows it in potential. It has already been explained in this section, in connection with the production of pulses for rolling out the amount in MC—DR (Fig. 6f), that A15 is turned on at "10" and turned off at "14." When A15 turns on at "10," the grid of its tube $b$ and the connected grid of triode A3 rise above critical potential. Thereupon, A3 develops a negative pulse which is applied by the wire $a11$ to the capacitatively connected grid of tube A11, rendering the tube non-conductive. Accordingly, A11 produces a positive pulse upon the output wire $w"10"$ which feeds this pulse to the suppressors of tubes TN (Fig. 6f) of orders 1 to 6 of MC—DR. Thereupon, tubes TN, if conditioned, bring about cessation of entry pulses which are entering the true amount derived from MC—DR into selected orders of DD—PQ (Fig. 6j), as previously described.

It has been stated, in connection with the reading out of a tens complement from the units order of MC—DR that a "0" positive pulse is produced on wire $w"0"$ (Fig. 6f) and fed thereby to the suppressor of the units order tube CN to bring about initiation of the application of entry pulses to the selected order of DD—PQ. Wire $w"0"$ connects to the anode of a tetrode A5 (Fig. 6b) which is normally conductive. The grid of A5 is capacitatively coupled to a wire $a5$ which leads to the anode of tube $a$ of stage A24 of the primary commutator (Fig. 6a). When A24 turns off at "0" (see part b of Figs. 7a to 7e), the anode of its tube $a$ develops a negative pulse which is fed to the control grid of tetrode A5 (Fig. 6b), momentarily rendering it non-conductive. Accordingly, A5 develops a positive pulse which is transmitted by wire $w"0"$ to the suppressor of the units order tube CN (Fig. 6f).

Finally, it has been explained that a nines complement transfer of the number standing in orders 2 to 6 of MC—DR to selected orders of DD—PQ is initiated by transmission of a positive "1" pulse from wire $w"1"$ (Fig. 6f) to the suppressors of pentodes CN of orders 2 to 6. Wire $w"1"$ connects to the anode of a normally conductive tetrode A2 (Fig. 6b). The grid of A2 is capacitatively coupled to the anode of tube $a$ of trigger A8. As described before in this section, A8 is turned on at "0" and returned to off status at "1." Upon A8 going off, its tube $a$ develops a negative pulse which is applied to the control grid of A2, rendering A2 momentarily non-conductive. Accordingly, A2 produces a positive pulse on the wire $w"1"$.

To take a specific example, consider that the number standing in register MC—DR is 000066 and that the column shift means is in its initial or first position. In this column shift position, as described in Section 10, the suppressors of pentodes CS1 (Fig. 6h) are receiving a continual stream of +B pulses and when conditioned by increased control grid potential will produce negative A entry pulses which will be routed by wires $t6$ to $t11$ to orders 6 to 11 of DD—PQ (Fig. 6j).

Assume that the complement of the number 000066 in MC—DR is to be transferred to orders 6 to 11 of DD—PQ. Accordingly, tubes CN and CP (Fig. 6f) are conditioned for action. At the "0" time of the cycle, a positive pulse is received by the suppressor of units order tube CN from wire $w"0"$. Tube CN, in response, produces a negative pulse which is applied via wire "on" to the right side of the units order trigger RT (Fig. 6h), turning it on. Thereupon, this trigger RT conditions pentodes CS1 to CS6 of the units order. Since the column shift means is in its first position, the pentode CS1 alone is receiving positive B pulses. The first such pulse after conditioning of CS1 at "0" is received at "0.5" and inverted to a negative A pulse. This negative A pulse, at "0.5," is routed by wire t6 to the line IN of the 6th order of DD—PQ (Fig. 6j) and effects a step of value advance of the order. A second such entry pulse is produced at "1.5," a third at "2.5," and a fourth at "3.5." At "4," the units order of MC—DR (Fig. 6f), initially standing at 6, produces a positive readout pulse, upon wire 6b, which is applied by wire rd to conditioned pentode CP of the same order. In response, units order tube CP becomes conductive and its anode potential falls. Since the anode of this tube CP is tied by wire "off" to the anode of tube a of the units order trigger RT (Fig. 6h) this trigger turns off upon CP becoming conductive. With the units order trigger RT off, it removes conditioning potential from CS1 to CS6 of the same order. In this manner, four entry pulses were applied to the 6th order of DD—PQ to enter therein the number 4 which is the tens complement of the digit 6 registered in the units order of MC—DR. In short, the tens complement of the number standing in the units order of MC—DR has been transferred to the 6th order of DD—PQ.

With respect to the 2nd order of MC—DR, the nines complement of its digit 6 is read into the 7th order of DD—PQ. This results from the application of a "1" pulse from the wire w"1" to tube CN (Fig. 6f) of the 2nd order, in consequence of which RT (Fig. 6h) of the 2nd order turns on and conditions CS1 of the same order to respond to the applied positive B pulses. At "4," the pentode CP (Fig. 6f) of the 2nd order is rendered conductive by a readout pulse and turns off the related trigger RT (Fig. 6h) to remove conditioning potential from CS1 of the 2nd order. In the interval "1" to "4" in which this CS1 tube was conditioned, it produced three entry pulses at "1.5," "2.5," and "3.5" which were routed by wire t7 to the 7th order of DD—PQ.

In similar fashion, nine entry pulses are produced by each of the tubes CS1 of orders 3 to 6 of MC—DR and routed to orders 8 to 11 of DD—PQ to transfer the nines complements of 0000 in the four higher orders of MC—DR to the selected orders of DD—PQ.

If the true number 000066 standing in MC—DR is to be transferred to DD—PQ, then the pentodes TP and TN (Fig. 6f) are preliminarily conditioned. The pentode TP of the units order is rendered conductive at "4" by a readout pulse and turns on the related trigger RT (Fig. 6h). Trigger RT thereupon conditions CS1 to CS6 of the units order. Since CS1, in the first column shift position, is receiving +B pulses, it starts producing negative A entry pulses at "4.5." At "10," the tubes TN (Fig. 6f) receive a positive pulse from wire w"10" and, in response, turn off the triggers RT. The triggers thereupon remove conditioning potential from the CS tubes. Thus, in the units order, CS1 has produced in its conditioned period "4" to "10," six entry pulses at "4.5," "5.5," "6.5," "7.5," "8.5," and "9.5." These entry pulses are routed by wire t6 to the 6th order of DD—PQ. In short, the digit 6 in the units order of MC—DR has been transferred to the 6th order of DD—PQ.

In similar manner, the true number 6 in the 2nd order of MC—DR is transferred to the 7th order of DD—PQ, when the column shift means is in first position. With regard to the remaining orders of MC—DR which stand at 0000, they have not produced readout pulses until "10," so that tubes TP of these orders do not apply on-turning pulses to related triggers RT until then. At the same point, however, tubes TN receive the "10" pulse and block the triggers RT of orders 3 to 6 from turning on and conditioning the related tubes CS, so that no entry pulses will be produced by these tubes.

12. *The dividing plan*

The dividing plan is to effect over-and-over subtraction of the divisor from a dividend portion or dividend remainder portion selected by the column shift means. The selection of the dividend or remainder portion also selects the quotient place to receive a quotient entry of 1 each time the divisor is found to go into the dividend or remainder portion. When a "no go" condition occurs, the last divisor subtraction from the dividend or remainder portion is cancelled by adding the divisor, after which the column shift means is advanced to its next position. In this next column shift position, the divisor is shifted one column to the right with respect to the dividend or dividend remainder and over-and-over subtraction again performed until a "no go" condition is detected.

Subtraction of the divisor from the dividend or remainder portion is, in effect, a comparison to determine whether the divisor is or is not greater than the dividend or remainder portion. Accordingly, for convenience, the dividend portion or dividend remainder portion may be called the comparison portion. The present machine has the capacity to divide a six-place dividend by a five-place divisor and to obtain a six-place quotient. It requires six dividing steps to obtain a six-place quotient, but a seventh dividing step is to be performed in order to round off the units place of the quotient if the divisor is equal to or more than one-half the remainder left by the sixth dividing step.

The subtraction of the divisor from the comparison portion is done here by adding the tens complement of the divisor to the orders of DD—PQ selected by the column shift means. As brought out in preceding Section 11, if there is a 0 in the units order of the divisor, then ten entry pulses will be applied under control of the units order of MC—DR to the right hand order of a group of DD—PQ orders selected by the column shift means. The carry means between the right hand order of the group and the next higher order will function upon application of ten entry pulses to said right hand order to produce a carry entry into the next higher order. If the latter order is at 9, carry will be effected to its next order, and so on. In this manner, a nines complement entry of a divisor including 0 in its units order will be converted to a tens complement in DD—PQ.

If a divisor is equal to the compared dividend or dividend remainder, then addition of the tens complement of the divisor to the comparison portion (dividend portion or dividend remainder portion) produces zeros in the group of compared orders and a carry out of the highest order of the group. For example:

| Comparison portion | 000543 |
| 10's complement of 543 | 999457 |
| Result | 1,000000 |

If a divisor is smaller than the comparison portion, addition of the tens complement of such divisor to the comparison portion also produces a carry out of the highest order of the compared group; e. g.:

| Comparison portion | 000543 |
| 10's complement of 542 | 999458 |
| Result | 1,000001 |

In either of the above cases, there is a "go" condition. It may be stated, then, that if a carry out of the highest order of the group of compared orders results from addition of the tens complement of a divisor to a comparison portion, then there is a "go" condition and 1 must be entered in the proper place of the quotient receiving means.

When a divisor is greater than the comparison portion, then addition of its tens complement to the comparison portion does not produce a carry out of the highest of the compared group of orders, e. g.:

| Comparison portion | 000543 |
| 10's complement of 544 | 999456 |
| | 999999 |

It may be stated, then, that if the divisor is greater than the comparison portion, there will be no carry out of the highest of the compared group of orders and "no carry" signifies "no go."

As explained in Sections 6 and 7, the dividend is entered in orders 1 to 6 of DD—PQ and the divisor is entered in the orders of MC—DR. The first dividing step will take place with the column shift means (see Section 10) in first position in which tubes CS1 (Fig. 6h) are receiving the +B pulses to be inverted to entry pulses for orders 6 to 11 of DD—PQ. Hence, in the manner explained in Section 11, transfer of the tens complement of the divisor will be effected to orders 6 to 11 of DD—PQ. In other words, the divisor will be subtracted from the dividend portion in orders 6 to 11. Stated differently, comparison of the divisor with the dividend portion in orders 6 to 11 of DD—PQ will occur. The divisor, with the capacity of the disclosed machine, always has zero in its 6th order and the dividend portion always has zeros in orders 7 to 11 and a possible significant digit in order 6. If a "go" condition is present, then there will be a carry from the 11th to the 12th order, entering quotient digit 1 in the 12th order. A second comparison will be made in the next computing cycle between the remainder portion now in orders 6 to 11 and the divisor. If a "go" condition is again present, then a second carry from the 11th to the 12th order will result and the 12th order will then total 2 as the quotient. This procedure will be repeated until the remainder comparison portion is smaller than the divisor or, in other words, until "no go" is detected.

It should be noted that since the dividend will not exceed six places and is entered in orders 1 to 6 of DD—PQ, there can be no significant digit present prior to dividing operation in orders 7 to 12 of DD—PQ. Further, the dividend remainders cannot exceed six places, so that a significant digit of a remainder portion cannot be present in orders 7 to 12 of DD—PQ. This leaves orders 7 to 12 of DD—PQ free to serve as a quotient register during the dividing calculation.

When a "no go" condition occurs in a dividing step, then the true figures of the divisor are entered in the comparison group of orders of DD—PQ to bring back the previous remainder to these orders. As may be understood from the first example given above, when a true number and its tens complement are added, the result is zero in all places and a carry of 1 from the left hand place. The carry of 1 from the left hand place must be suppressed when the previous remainder is being brought back into orders of DD—PQ by addition of the true figures of the divisor. Thus, in the first column position, when a "no go" condition occurs, the true figures of the divisor are entered in orders 6 to 11 of DD—PQ. Since the tens complement of the divisor has been entered previously in these orders, the addition of the true figures would result in a carry from the 11th order to the 12th order unless such carry were suppressed. For this reason, means are provided to suppress carry out of the highest order of the comparison group of orders when the true figures are entered in these orders after a "no go" condition has arisen. After the previous remainder has been brought back by addition of the true figures of the divisor, the column shift means is advanced to its next position to start a new dividing step. In this next position of the column shift means, it routes the divisor entries into a group of orders of DD—PQ which is shifted one column to the right with respect to the previous comparison group of orders. Thus, in the second column shift position, the divisor is routed into orders 5 to 10 of DD—PQ and quotient entries attendant upon "go" conditions automatically enter order 11 by operation of the carry means between orders 10 and 11. In a similar way, third, fourth, fifth, sixth and seventh dividing steps will occur. The sixth dividing step will produce a quotient entry, if any, into order 7 of DD—PQ. The seventh dividing step will produce a quotient in order 6. During the same step, 5 will be entered in order 6. If a quotient entry of 5 or more is produced in order 6, the addition of 5 thereto will produce a carry into order 7 to round off the quotient entry previously made therein.

The above plan requires means to select the tens complement or the true figures of the divisor to be read out of MC—DR (Fig. 6f) into DD—PQ (Fig. 6j). The plan further requires carry detecting means and carry suppressing means for orders 5 to 11 of DD—PQ. The column shift means will select the comparison group of orders and also enable only the carry detecting and carry suppressing means of the highest order of the comparison group to function.

The means to select the tens complement or the true figures of the divisor to be read out of MC—DR may be called, for short, the true or complement control, and is described in the following section.

13. The true or complement control

Referring to Fig. 6i, the true or complement control includes a trigger Y11 which has an off stand-by status when the machine is set for dividing calculations. The trigger Y11 remains in off status as long as "go" conditions are present during a dividing step. Tied to the grid of tube $a$ of Y11, to follow it in potential, is the control grid of a tetrode Y15. Similarly following the grid of tube $b$ of Y11 is the control grid of a tetrode Y12. When Y11 is off, its tube $a$ and its follower tube Y15 are conductive, while tube $b$ and its follower tube Y12 are non-conductive. With Y12 non-conductive, its high anode potential is applied to the wire $cw$ which is coupled to grids of tubes CP and CN (Fig. 6f). The high potential applied via wire $cw$ to these tubes conditions them for enabling a complement to be read out of MC—DR, in the manner described in Section 11. Thus, when Y11 of the true or complement control network (Fig. 6i) is off, it enables a complement to be read out of MC—DR into DD—PQ. When Y11 is on, then its tube $a$ and its follower tube Y15 are non-conductive, while tube $b$ and its follower tube Y12 are conductive. The tube Y15 then has high anode potential which acts through wire $tw$ (also see Fig. 6f) to condition tubes TP and TN for causing the true number to be read out of MC—DR, in the manner explained in Section 11.

As just explained, trigger Y11 must be in off status to enable a complement to be read out of MC—DR. The reading out of a complement is necessary in the course of a dividing calculation but not necessary in the course of a multiplication calculation. Accordingly, means are provided to maintain Y11 constantly in on status, in which it enables a true number to be read out of MC—DR, if the machine is set to multiplying condition. This means includes a double triode M14 both anodes of which are tied to the anode of tube $b$ of Y11. When M14 is non-conductive, it allows the tube $b$ of Y11 to become non-conductive or, in other words, allows Y11 to assume off status. But if M14 is conductive, its low anode potential blocks a rise in anode potential of tube $b$ of Y11, so that Y11 is prevented from turning off and is maintained in on status. It is clear, now, that M14 must be non-conductive if the machine is in dividing condition and conductive if the machine is in multiplying condition. For this purpose, the grids of the double triode M14 are resistance-coupled, in parallel, to a suitable point of a voltage divider $r39$ interposed between line BI and wire MW which terminates at socket MPY (Fig. 6d). As previously described, if the machine is in dividing condition, there is no potential on wire MW. Under this condition, M14 is biased off and does not prevent trigger Y11 from assuming either on or off state. If the machine is set for multiplication, then the potential of line B is applied via the plug-connected sockets COM and MPY and thence via wire MW to the voltage divider $r39$. In consequence, M14 becomes conductive and maintains Y11 in its on status.

Let it be assumed the machine is in dividing condition, so that trigger Y11 has an initial off state. Controlling the trigger Y11 is another trigger Y13 which has an off stand-by status. At the "0" time of each computing cycle, Y13, if off, is turned on by a negative pulse applied to its right side by the wire $a17$. As explained in Section 11, a negative pulse is developed on wire $a17$ at "0" by tube A17 (Fig. 6b) in order to turn on trigger A8. This same negative "0" pulse is fed to the right side of trigger Y13 (Fig. 6i) and turns it on at the beginning of a computing cycle. Connected to the grid of tube $b$ of Y13 is the control grid of a pentode Y10. When Y13 is on, the potential of the grid of its tube $b$ and of the control grid of Y10 is above critical value, so that Y10 is conditioned to respond to a positive pulse on its suppressor. The suppressor is connected to the midpoint of a voltage divider $r40$ between ground G and line BI so the suppressor normally is below critical potential. Also, the suppressor is capacitatively coupled to a wire $w"15$." Wire $w"15$" leads to the anode of a tetrode A13 (Fig. 6b) of which the control grid is resistance-coupled to line B. Accordingly, A13 is normally conductive and at low anode potential. The control grid of A13 also is coupled, capacitatively, to the anode of tube $a$ of a trigger A14 which has an on stand-by status. The left side of A14 is capacitatively coupled to the wire $a21L$ which taps the anode resistor of tube $b$ of primary commutator stage A21 (Fig. 6a). Stage A21 is turned on at each odd index point (see part $b$ of Figs. 7a to 7e). Each time A21 switches to on state, its tube $b$ develops a negative pulse which is fed to the left side of A14. This negative pulse has no effect unless A14 is on, in which case, the pulse will turn it off. It is clear, then, that when A21 turns on at "15" after "D" (see Fig. 7a), it causes A14 to turn off (see part $d$, Fig. 7a). The right side of A14 is suitably coupled to the anode of tube $a$ of the trigger A15 (Fig. 6b). As described in Section 11, A15 is turned on each cycle at "10" and turned off each cycle at "14" (see part $d$ of Figs. 7a to 7e). When A15 turns on, its tube $a$ develops a positive pulse which is applied to the right side of A14. This positive pulse has no effect on the status of A14, for the reason given in Section 3. But at "14," when A15 turns off again, its tube $a$ produces a negative pulse which is fed to the right side of A14 and trips it to on status. When A14 trips on, its tube $a$ applies a positive pulse to the control grid of A13 which has no appreciable effect on its normally conductive state. At "15" of each cycle, primary commutator stage A21 (Fig. 6a) switches on and via wire $a21L$ applies a negative pulse to the left side of A14, returning it to off status. As A14 turns off, its tube $a$ develops a negative pulse which is fed to the control grid of A13 and renders it momentarily non-conductive. Hence, at "15," A13 develops a positive pulse which is transmitted by wire $w"15$" to the capacitatively coupled suppressor of pentode Y10 (Fig. 6i). If Y10 is still conditioned at "15" by high control grid potential, then Y10 will respond to the positive pulse on its suppressor and produce a negative pulse. This negative pulse will be applied to the right side of trigger Y11 to turn it on. With Y11 on, its tube $a$ and the follower tube Y15 are non-conductive. The high anode potential on Y15 will be applied by wire $tw$ to grids of tubes TN and TP (Fig. 6f) to condition them for enabling the true number to be read out of MC—DR.

The turning on of Y11, at "15" of a cycle, during dividing calculations, is effected if Y13 is still on at "15" and applying conditioning potential to the control grid of Y10. As described before in this section, Y13 is turned on at "0" of a computing cycle. If there is a "go" condition during this cycle, then, in a manner described in the next section, a negative pulse is applied, prior to "15," to a wire $g$ which feeds the pulse to the left side of Y13 and turns it off. When Y13 is thus turned off, prior to "15," it removes conditioning potential from tube Y10, preventing it from producing a tripping pulse for Y11. Hence, Y11 will remain off, in consequence of which the complement of the divisor will again be read out in the next cycle. If, during a computing cycle, there is a "no go" condition, then a negative pulse will not appear on wire g to turn off Y13 prior to "15." Accordingly, Y11 will be tripped on at "15" of the cycle and will stay on until "14" of the next cycle, so that the true figures of the divisor will be read out during the period "0" to "10" of this next cycle. With Y11 on, its tube a is non-conductive, as is a follower tube Y7. The high anode potential of Y7 will be transmitted by a wire y7 to carry suppressing means, described in the next section, for suppressing carry from the highest order of the comparison group to the next higher order. As explained in Section 12, when the true divisor amount is added to the comparison group of orders of DD—PQ to cancel the previous complementary entry of the divisor, a carry out condition is produced in the highest order of the comparison group. The next higher order is now a quotient receiving order and if carry entry were allowed to occur into this next higher order, the quotient value therein would be increased by one just as though a "go" condition had existed. Since the entry of the true divisor amount into the comparison group of orders is made as a result of a "no go" condition having been detected and merely to cancel the previous complementary entry of the divisor, the quotient value in the next higher order should not be increased by one. Accordingly, carry entry from the highest order of the comparison group into the next higher order must be suppressed during the cycle in which the true divisor amount has been entered in DD—PQ. This carry suppression is brought about under control of Y7 when it is rendered non-conductive, as explained above. The carry suppressing means in entirety will be explained in the next section.

It has been explained before that if the machine is set for multiplication, trigger Y11 is kept constantly in on state. Hence, the grid of Y7 also is then constantly below critical potential and if its anode potential were allowed to rise, carry suppression would take place. But carry suppression is never to be effected if the machine is performing a multiplying calculation. For this reason, the anode of Y7 is tied to the anode of a triode M7. The grid of M7 taps the voltage divider r39 between line BI and wire MW. If the machine is set for multiplication, then wire MW carries the potential of line B, under which condition, tube M7 is biased to conductivity. The anode potential of M7 is then constantly low and prevents a rise in potential on the connected anode of Y7. Accordingly, carry suppression during multiplying calculations will not be effected. If the machine is in dividing condition, then M7 is biased off and does not prevent effective functioning of tube Y7 to bring about carry suppression.

At "14" of a cycle, trigger Y11 if it is on, is turned off by a negative pulse applied by a wire w"14" to the left side of Y11. Wire w"14" taps the anode resistor of the tube A10 (Fig. 6b) which is normally blocked by high negative control grid bias (see Section 4). The grid of A10 is capacitatively coupled to the anode of tube A3. As described in Section 11, tube A3 is under control of the trigger A15 which turns on at "10" and off at "14." When A15 turns on at "10," it renders A3 conductive to produce a negative pulse which does not change the normally blocked condition of A10. At "14," A3 is rendered non-conductive by the switching of A15 to off status, and thereupon produces a positive pulse which acts upon the control grid of A10 to render the latter conductive. The resulting negative pulse produced by A10 is applied by wire w"14" to the left side of trigger Y11 (Fig. 6i) and turns it off. As Y11 turns off, its tube b becomes non-conductive as does the follower tube Y12. Hence, wire cw is now receiving high potential to condition tubes CP and CN (Fig. 6f) for the reading out of a complement from MC—DR. The trigger Y11 cannot be turned on again until "15" of the next cycle following the one in which it was turned off, so that during such next cycle, the complement of MC—DR will be read out.

*Advancing the column shift position.*—The advance of the column shift position during the dividing calculation will be explained in this section. During the cycle after detection of a "no go" condition, the true value of the divisor is entered in the selected orders of DD—PQ. In the cycle following entry of the true value, the complement of the divisor must be transferred to a comparison group of orders of DD—PQ displaced one column to the right of the group which received the divisor entry during the preceding dividing step. In other words, a new dividing step must take place starting with the return of Y11 to off status at "14" of a cycle. For the new dividing step, the column shift means must be advanced to its next position which, as may be understood from Section 10, is effected by stepping ahead the on condition in the chain of triggers S1 to S7 (Fig. 6g) of the column shift commutator. As explained in Section 10, the advance of the on condition in the chain of triggers S1 to S7 is brought about by a negative pulse transmitted from wire 126 concurrently to the left sides of triggers S1 to S7. This negative pulse is produced as a result of Y11 (Fig. 6i) being returned from on to off status at "14" of a cycle. It is now understood that when Y11 is switched off, the tube Y12 becomes non-conductive. As Y12 shifts from conductive to non-conductive condition, it produces a positive pulse upon the wire cw. This wire which leads to grids of tubes CP and CN (Fig. 6f) relating to MC—DR is also capacitatively coupled to the control grid of a tetrode DV20 (Fig. 6i). The control grid of DV20 is normally biased below cut off potential. The suppressor of DV20 is connected to a suitable point of a voltage divider r45 interposed between line N and the anode of a triode M18. The grid of M18 taps a voltage divider r46 between line BI and wire MW. As now understood, if the machine were set for multiplication, the potential of line B would be on wire MW and would drive the grid of M18 above cut-off, rendering M18 conductive. The consequent low anode potential of M18 would not force the suppressor potential of DV20 above critical value. Hence, if the machine were set for multiplication, DV20 would not be conditioned to respond to the increase in potential on wire cw. In short, pentode DV20 would be inactive if the machine were set for multiplication. Assuming, however, that the machine is in dividing condition, there is no potential on wire MW, so that M18 remains constantly non-conductive. Consequently, there is constant high potential on the suppressor of DV20, conditioning it to respond to the rise in potential on its control grid fed thereto via a coupling condenser and wire cw from the tube Y12 (Fig. 6i) when trigger Y11 is restored to off status at "14" of the cycle in which the true figures of the divisor have been entered in DD—PQ. Since the control grid of DV20 is capacitatively connected to wire cw, the rise in potential on wire cw produces a positive pulse on the control grid of DV20. In response to this pulse, DV20 emits a negative pulse upon a wire md which is capacitatively coupled to the grid of a triode TR18 (Fig. 6g). Triode TR18 is normally conductive and upon receiving the negative pulse becomes non-conductive and applies a positive pulse via a coupling capacitor to the control grid of a tetrode TR19. The tetrode TR19 normally is blocked by high negative bias on its control grid. Upon the application of the positive pulse to the control grid of TR19, it becomes momentarily conductive and, through a portion of its anode resistor, applies a sharp negative pulse to the wire 126. The negative pulse on wire 126 is concurrently transmitted to the left sides of triggers S1 to S7 of the column shift commutator and turns off the trigger previously on to cause the next following trigger to be turned on, in the manner described in Section 10. Thus, the position of the column shift means is advanced substantially at "14" of a cycle to define the beginning of the next dividing step, during which divisor entries will be routed to the next comparison group of orders of DD—PQ.

14. The carry and related means of DD—PQ

The carry means of DD—PQ will be explained with reference to Figs. 6i, j, and k. The carry means functions for the usual purpose of producing a carry from one order to the next. As mentioned in Sections 11 and 12, by reason of such carry operation during dividing calculations, the nines complement entry of figures of the divisor to the left of a units order zero is converted to a tens complement entry. Further, the carry means of orders 11 to 6 of DD—PQ function in the 1st to 6th dividing steps to produce, by carry entries, the quotient value in orders 12 to 7, respectively. During the 7th or rounding-off dividing step, "go" conditions in the 5th order of DD—PQ will be effective to cause carry entries into the 6th order. A five will be entered during the 7th dividing step into the 6th order and if the carry entries from the 5th order into the 6th order total at least 5, then carry will take place from the 6th to the 7th order, rounding off the units order quotient digit in the 7th order. Associated with the carry means of orders 5 to 11 are carry suppressing means for suppressing carry out of the highest order of a comparison group of orders during a cycle in which the true figures of the divisor have been entered. Finally, in each of orders 5 to 11, there is a carry detecting means which is, in effect, a "go" detecting means for causing the true or complement control to maintain its complement condition. The column shift means selects the comparison group of orders and also selects only the carry suppressing means and the "go" detecting means of the highest order of the selected group to function. A detailed explanation of the carry means follows.

It may be mentioned that, to economize on space, only orders 1, 5, 6, 7, and 12 and related carry means of DD—PQ are illustrated.

Associated with each order of DD—PQ is a trigger K (see Figs. 6i and k) initially in off status. The wire OUT of each register order (Fig. 6j) of DD—PQ is capacitatively coupled to the right side of the trigger K of the same order. As explained in Section 5, when a register order steps from 9 to 0, a negative pulse appears on its wire OUT. The negative pulse on wire OUT of an order of DD—PQ is transmitted to the right side of trigger K of the same order and turns on the trigger. It is clear that triggers K serve as devices to manifest the carry-out conditions of the related orders of DD—PQ. Trigger K of order 12 is needed solely for such manifestation when an amount is being read out of DD—PQ, in the manner described in later Section 16. Triggers K of orders 7 to 11 have this same function during the reading out of DD—PQ, but also serve as elements of the means for carrying from one order to the next.

Connected to the grid of tube a of each trigger K of orders 1 to 11 is the grid of a follower tube KV. Hence, when K is off, KV is conductive and when K is on, KV is non-conductive. Each of the carry means in orders 1 to 11 also includes a triode V. The anodes of tubes V and KV of the same order are connected to a common output wire 150 which is capacitatively coupled to the control grid of a carry pulse-producing pentode W. As is now understood, if either V or KV of the same order is conductive, their common anode potential remains low; only when both are non-conductive is their anode potential high. Thus, if either of the tubes V and KV of the same order is rendered non-conductive, a rise in their anode potential will occur upon the other of these tubes also being rendered non-conductive. Thereupon, a positive pulse will be transferred by the output wire 150 to the capacitatively coupled grid electrode of pentode W in the same order. It is clear that tube KV in an order of DD—PQ is rendered non-conductive when the related trigger K is turned on as a result of the register order stepping from 9 to 0. The triodes V are normally biased to conductivity and are rendered non-conductive between "10.5" and "14" of each computing cycle. Thus, triodes V serve to define or delimit the carry period. In other words, a carry entry cannot be made before "10.5" of a cycle; that is, until a full cycle point interval after "9.5." As explained in Section 11, the last possible entry pulse produced by a CS tube (Fig. 6h) for an order of DD—PQ occurs at "9.5." Carry is delayed until the last possible entry step of any order of DD—PQ has been given adequate time for completion. If carry were allowed to occur at "10" of a cycle, then an order of DD—PQ which received an entry pulse at "9.5" from a tube CS might not respond to a carry entry pulse. In other words, the carry entry pulse might be lost. For this reason, tubes V are maintained conductive until "10.5" of a cycle, delaying carry entry for a full cycle point interval after "9.5." Should an order have stepped from 9 to 0 before the start of the carry period, then carry entry into the next order will take place at "10.5" when triodes V become non-conductive. Should an order stand at 9 and receive a carry entry at the "10.5" time, it will cause carry entry to be made, substantially at that time, into the next higher order. If this next higher order stands at 9 and receives a carry entry, it will cause a carry to be made to the still higher order, and so on. The carry period "10.5" to "14" is of sufficient duration to allow time for such successive carry entries to be made from orders 1 to 12 of DD—PQ.

In line with the foregoing purpose of defining the entry period, the triodes V (Figs. 6i and 6k) have their grids tied to a wire vw which connects to the midpoint of voltage divider r1 (Fig. 6i) interposed between line B1 and the wire 55 which leads to the anode of tube A9 (Fig. 6b). As explained in Section 4, when A9 is conductive, then its low anode potential maintains the grid potential of tubes V below the critical potential, under which condition the tubes V are non-conductive. But when A9 is non-conductive, its high anode potential forces the grids of triodes V above critical potential, under which condition the triodes V are conductive. The triodes V while in conductive status, delay the carry entries but when non-conductive allow carry entries to be made, in a manner explained presently. Accordingly, tube A9 must be held non-conductive to maintain triodes V conductive except during the carry period "10.5" to "14."

Referring now to Fig. 6b, the grid of A9 taps a voltage divider r47 interposed between line N (−250 v.) and the anodes of a pair of triodes A4 and A32. When either A4 or A32 or both are conductive, their common anode potential is low and forces the grid of A9 below critical potential. Tube A9 is then non-conductive and at high anode potential, holding triodes V (Figs. 6i and k) conductive. High anode potential exists for A4 and A32 (Fig. 6b) only when both are concurrently non-conductive, and this high potential forces the grid potential of A9 above cut-off. Tube A9 then is conductive to cause tubes V (Figs. 6i and k) to become non-conductive. The concurrent period of non-conductivity for A4 and A32 is timed for "10.5" to "14," in the following manner. The grid of A32 is connected by a wire a32 to the grid of tube b of trigger B4 (Fig. 6c), so as to follow the condition of the latter tube. As described in Section 11, in regard to the means for producing the rolling-out pulses for MC—DR (Fig. 6f), trigger B4 is turned on at "0.5" and returned to off status at "10.5" (see part d of Figs. 7a to 7e). With B4 off, its tube b is in non-conductive condition, as is the tube A32 (Fig. 6b). On the other hand, if B4 is on, its tube b is conductive, as is the follower tube A32. Since B4 is on between "0.5" and "10.5," tube A32 is conductive during this period and maintains A9 non-conductive. In turn, A9 in non-conductive status, maintains tubes V (Figs. 6i and k) conductive.

In the foregoing manner, A32 is held conductive until "10.5" by trigger B4 and, therefore, prevents A9 from becoming conductive to produce a non-conductive condition of tubes V until "10.5." It is also necessary to render tube A4 (Fig. 6b) non-conductive in order to allow A9 to be rendered conductive. The grid of A4 is connected to the midpoint of a voltage divider r48 between line B1 and the anode of tube A3. As explained in Section 11, in connection with the production of the "10" positive pulse for terminating the reading-out period of a true number from MC—DR, the tube A3 follows the condition of tube b of trigger A15, being conductive during the on period of A15 and non-conductive during the off period of A15. A15 is on from "10" to "14" (see part d of Figs. 7a to 7e). During this period, tube A3 is conductive and its low anode potential forces the grid of triode A4 below critical potential. Hence, between "10" and "14," A4 is non-conductive. As previously described, triode A32 is conductive during the on period of trigger B4 (Fig. 6c) from "0.5" to "10.5" and does not become non-conductive until B4 is turned off at "10.5." Since A4 is non-conductive between "10" and "14," the concurrent period of non-conductivity of A9 and A32 is between "10.5" and "14." During this period, A9 is conductive and maintains triodes V (Figs. 6i and k) non-conductive to define the carry period.

The carry means of orders 1 to 4 of DD—PQ are similar and may be understood from the showing of the carry means of order 1 in Fig. 6i. As shown there, the output wire 150 of tubes V and KV of order 1 is capacitatively coupled to the control grid of the carry-pulse producing pentode W of this order. The suppressor of this pentode W is connected to the ground line G to remain constantly above blocking potential. When the 1st order of DD—PQ exceeds its capacity during a cycle, it turns on trigger K of the 1st order, causing triode KV to become non-conductive. At "10.5" of the cycle, triode V also becomes non-conductive. Thereupon, a positive pulse is applied by wire 150 to the capacitatively coupled grid of pentode W. In response, the pentode W produces a negative, carry entry pulse upon wire ce(1). This wire is connected to the IN wire of the 2nd order (not shown) of DD—PQ in the same manner as the 4th order carry entry pulse wire ce(4) is connected to the IN wire of the 5th order (Fig. 6j) of DD—PQ.

*Relating to orders 5 to 11 of DD—PQ.*—The carry means in each of these orders also includes a carry pulse-producing pentode W. However, this pentode W is not controlled solely by tubes V and KV and trigger K of the related order but is also controlled by a carry suppressing tube WC of the same order. For this reason, the suppressor of each of pentodes W of orders 5 to 11 is connected to a voltage divider r50 interposed between line N and the anode of the related tube WC to be controlled in a manner described presently. Further, each of orders 5 to 11 also includes a "go" detecting pentode WW. The anodes of pentodes WW of orders 5 to 11 connect to a common wire ww which is connected to line B by anode resistor r56 (Fig. 6i). Resistor r56 is tapped by wire g which is capacitatively coupled to the left side of trigger Y13. The common anode line 150 of tubes KV and V of each of orders 5 to 11 is coupled capacitatively not only to the control grid of pentode W but also to the control grid of the "go" detecting pentode WW of the same order. The control grid of WC and the suppressor of WW of the 5th order (see Fig. 6i) tap a voltage divider r52 between line N and the wire w7 which leads to the anode of follower tube SS7 (Fig. 6g) of trigger S7 of the column shift commutator. In the seventh column shift position, S7 is on and holding SS7 non-conductive. The high anode potential of SS7 is then effective via wire w7 and its coupling to the suppressor grid of tube WW and the control grid of tube WC of the 5th order (Fig. 6i) to force these grids above blocking potential; i. e., to condition these tubes. Similarly, in the sixth column shift position, the tetrode SS6 (Fig. 6g) has high anode potential which is effective via wire w6 to condition the tubes WW and WC of the 6th order (see Fig. 6k), and so on.

It is clear now that in the first, second, third, fourth, fifth, sixth, and seventh column shift positions, the tubes WW and WC of the 11th, 10th, 9th, 8th, 7th, 6th, and 5th orders, respectively, of DD—PQ are conditioned for action. Further, it has been explained that in the first, second, third, etc. column shift positions, the selected comparison groups of orders have as their highest orders, the 11th, 10th, 9th, etc. orders of DD—PQ. Thus, in each column shift position, the tubes WW and WC of the highest order of the comparison group of orders selected by the column shift position are conditioned for action. The suppressors of all the WC tubes (in orders 5 to 11)

are tied to a wire *wc* which taps a voltage divider *r53* (Fig. 6i) interposed between line N and the wire *y7* which leads to the anode of triode Y7 of the true and complement control network. As described in Section 13, when this network is in complement condition; i. e., in condition to cause the complement of the divisor to be entered into DD—PQ, the trigger Y11 is off and its follower tube Y7 is conductive. With Y7 conductive, its low anode potential, transmitted to the suppressors of all the tubes WC allows these suppressors to remain below critical potential. Each of the tubes WC, including the conditioned one in the highest order of the comparison group selected by the column shift position, is then blocked and at high anode potential. With WC at high anode potential, it holds the suppressor of the pentode W in the same order above critical potential. In short, the carry pulse-producing pentodes of orders 5 to 11 are conditioned for action when the true and complement control is in complement condition. As explained in Section 13, the true and complement control cannot be switched from complement condition to true condition until "15" of a cycle. Since the entry period terminates prior to "10" and the carry period terminates at "14," it is clear that in any cycle in which a complement has been entered in DD—PQ, the carry pulse-producing pentodes of orders 5 to 11 are all conditioned by high suppressor potential to respond to an increase in control grid potential. If any of these orders exceeds its capacity, the trigger K is switched on and renders its follower tube KV non-conductive. During the carry period, "10.5" to "14," tubes V are rendered non-conductive, as previously described. With both KV and V of an order non-conductive, their common high anode potential forces the control grid of the related tube W above critical potential. With W conditioned by high suppressor potential, it acts in response to the rise in control grid potential to produce a negative carry entry pulse upon the wire *ce* which leads to the IN wire of the next register order.

It was explained in Section 12 that if, during a cycle in which the complement of the divisor has been added to the selected group of comparison orders of DD—PQ, a carry out of the highest of these orders occurs, then there is a "go" condition. In Section 13, it was explained that the true and complement control (Fig. 6i) is in complement condition in order to allow the complement of the divisor to be transferred to DD—PQ. If a "go" condition is detected during the cycle, then the true and complement control must be maintained in complement condition for the next cycle. In short, the trigger Y13 must be turned off prior to "15" of a cycle in which a "go" condition is detected. The "go" condition is synonymous here with a carry out condition in the highest order of the selected comparison group of orders of DD—PQ. As previously described, the column shift means in each position selects a particular comparison group of orders and also applies conditioning potential to the suppressor of the tube WW of the highest order of the comparison group. When there is carry out of this highest order, the output wire 150 of its tubes KV and V is at high potential which is applied to the capacitatively connected control grids of carry-pulse producing tube W and "go" tube WW. The tube W thereupon produces a negative pulse upon its output wire *ce* which leads to the IN wire of the next higher register order. Also, since the tube WW of the highest order of the comparison group is conditioned by high suppressor potential, it responds to the increase in its control grid potential and produces a negative pulse upon wire *ww* and thence to the resistance-coupled wire *g* (Fig. 6i). Wire *g* transmits the negative pulse to the left side of trigger Y13 and trips it off. Such action will occur during the carry period, terminating at "14." With Y13 turned off by the "14" time, it holds the control grid of pentode Y10 below critical potential. Hence, Y10 will not respond to the positive pulse applied by wire *w"15"* to its suppressor at "15." Accordingly, trigger Y11 will remain off. In the foregoing manner, when a "go" condition is detected during a cycle, the "go" detecting means of the highest order of the comparison group maintains the true or complement control in complement condition.

If there is no carry out of the highest order of the comparison group, the "go" detecting tube WW of this order will not produce a negative pulse for turning off Y13. Hence, at "15," tube Y10 will still have high control grid potential and will respond to the pulse on its suppressor at "15" to produce a negative pulse. This negative pulse is applied to the right side of Y11 and turns it on. In short, the true and complement control is shifted to true number entry control condition in which it will remain until "14" of the next cycle, as explained in Section 13. During this next cycle, the true figures of the divisor will be entered in the selected comparison group of orders of DD—PQ. As a result of such entry, the highest order of the comparison group will necessarily exceed its capacity, for reasons explained in Section 12. But, as already made clear, in this situation, a carry out of the highest order must be suppressed. This is done by removing the conditioning potential from the suppressor of the tube W of only the highest order of the comparison group until "14" of a cycle in which the true figures of the divisor have been entered. For such entry, the trigger Y11 (Fig. 6i) of the true or complement control is in on status. With Y11 on, its follower tube Y7 is non-conductive and at high anode potential, assuming the machine is in dividing status. This potential is applied via wire *y7* and coupled wire *wc* to the suppressors of all the tubes WC, raising them above critical potential. But only the tube WC of the highest order of the comparison group is also at high control grid potential. Hence, only this tube WC is rendered conductive by the increased suppressor potential. With this tube WC conductive, its anode is at low potential, maintaining the coupled suppressor of the related tube W below critical potential. Thus, tube W of the highest order of the comparison group is prevented from responding to the rise in control grid potential resulting from this highest order being stepped from 9 to 0 by the entry of the true figures of the divisor. In short, owing to the absence of a "go" condition, the last previous remainder is brought back to the comparison group of orders by entry of the true figures of the divisor, but carry out of the highest order of the comparison group is suppressed. However, the tube WW of this highest order is still conditioned to respond to the increase in control grid potential resulting from the carry out condition in this order. Thus, at some point during the carry period, the tube WW of the highest order of the comparison group will produce a negative pulse upon wire *g* to turn off Y13. At "14," a negative pulse is applied by, wire *w"14"* to trigger Y11 to return it to off status, as explained in Section 13. As a result of Y11 switching from on to off state, the column shift means is advanced to its next position in the manner also described in Section 13. Since Y10 has also been returned to off state prior to "14," the tube Y10 is not conditioned to respond to the "15" pulse on wire w"15" and, hence, trigger Y11 will remain in its off status until a "no go" condition again arises.

In the foregoing manner, when a "no go" condition occurs during a cycle, the true and complement control is shifted to true number entry conditions. In the next cycle, the true figures of the divisor are entered in DD—PQ. Towards the end of this next cycle, the true and complement control is returned to its complement condition and the column shift means is advanced to its next position to start the next dividing step.

Any of the triggers K which has been tripped to on status is returned to off status at the end of the carry period by the negative pulse carried by wire w"14" at the "14" time. The wire w"14" applies this negative pulse to the left sides of all the triggers K, returning any on trigger K to off state.

15. *The half pick-up and termination of dividing*

It has been brought out before, particularly in Sections 10 and 12, that a seventh dividing step is performed for rounding off purposes. The column shift means is in seventh column shift position for the seventh dividing step and selects orders 5 to 1 of DD—PQ to receive the divisor entries. Carry entries will be produced, upon "go" conditions, into the 6th order of DD—PQ. The carry entries into the 6th order during the 7th dividing step are quotient entries and if they total 5 or higher, then 1 must be added to the quotient digit in order 7 which contains the units order of the final quotient result to be recorded. To provide for the addition of 1 to the 7th order, five entry pulses will be entered in order 6 during the first dividing cycle of the seventh dividing step, so that if this dividing step produces a quotient of 5 or higher in the 6th order, a carry will be produced to the 7th order. The entry of the 5 pulses into the 6th order during the seventh dividing step may be called the half pick-up entry. With the end of the seventh dividing step, the dividing calculation is complete and operation of the computing section will be terminated. The quotient result on orders 12 to 7 of DD—PQ will then be read out and recorded by the reading-recording section described in Section 2. The half pick-up means will now be described.

The half pick-up network is shown in Fig. 6c and includes a trigger A28. Connected to the grid of tube b of A28 is the control grid of a pentode A29. The suppressor of A29 is resistance-coupled to lines G and BI so as to be biased below critical potential. This suppressor also is connected, capacitatively to the B pulse wire. Each positive B pulse raises the suppressor potential above the cut-off point. If A29 also is at operative control grid potential, it will produce negative output pulses in response to the positive B pulses applied to its suppressor. Trigger A28 initially is in off stand-by status, in which the grid of its tube b is below critical potential, as is the connected control grid of pentode A29.

The anode of tube a of trigger A28 is tied to the anodes of triodes A320 and A260. When either of these triodes is conductive, the common anode potential is low and prevents a rise in anode potential of tube a of trigger A28 or, in other words, blocks A28 from turning on. At the "0" time of each cycle, a negative pulse is produced on wire a17, in the manner described in Section 11. A connection is provided between the wire a17 and the right side of A28. Hence, at "0" of each cycle, the negative pulse received from wire a17 tends to turn on A28 but is prevented from doing so while either triode A260 or A320 is conductive. Triode A260 is a follower tube which follows the tube b of a trigger A25. Trigger A25 has an off stand-by status in which tube b is non-conductive, as is triode A260. The grid of triode A320 taps a suitable point of a voltage divider r57 between the anode of a triode A26 and the line BI, so as to remain below critical potential as long as A26 is conductive. But when A26 is non-conductive, the grid of A320 is above critical potential and A320 is conductive. The grid of A26 taps a voltage divider between the line BI and the wire w7. The wire w7, as mentioned in previous sections of the description leads to the anode of tube SS7 (Fig. 6g) of the column shift commutator. Tube SS7 remains conductive until the associated trigger S7 is turned on to start the seventh dividing step, as is clear from Section 10. With SS7 conductive, its low anode potential acts through wire w7 to sustain the grid of triode A26 (Fig. 6c) below critical potential. Triode A26 is then in non-conductive condition and its high anode potential, applied to the resistance-coupled grid of A320 maintains this grid above cut-off potential. Hence, until the seventh dividing step begins, A320 is conductive and blocks trigger A28 from being tripped on.

As previously described in Sections 13 and 14 the advance of the column shift position occurs at substantially "14" of a cycle. When the advance to the seventh column shift position occurs, tube SS7 (Fig. 6g) becomes non-conductive and applies its high anode potential to wire w7. The wire w7 transmits the high potential to the resistance-coupled grid of triode A26 (Fig. 6c), raising its potential above cut-off. Triode A26 is then conductive, in consequence of which it renders triode A320 non-conductive. This occurs substantially at "14" of the cycle upon the advance of the column shift means to the seventh position. During the next cycle, the complement of the divisor will be entered in orders 5 to 1 of DD—PQ. During this same next cycle, five entry pulses will be applied to the 6th order of DD—PQ to provide the half pick-up. With A320 non-conductive at about "14" of the preceding cycle, and with A260 normally non-conductive, the trigger A28 is released for tripping to on status by the negative "0" pulse received from wire a17 at the start of the next cycle, which is the first dividing cycle of the seventh dividing step. With A28 on, the grid of its tube b is at high potential, as is the connected control grid of pentode A29. Pentode A29 is thereby conditioned at the start of the cycle to respond to the positive B pulses applied to its suppressor. These positive B pulses occur at mid-index times (see line 2 of Figs. 7a to 7e). In response to each positive B pulse, the conditioned pentode produces a negative A pulse which is applied via a coupling capacitor to the control grid of a tetrode A300. The control grid of A300 is resistance coupled to line B (+150 v.); hence, it is normally above cut-off potential and maintaining A300 conductive. Each negative A pulse received from A29 by the control grid of A300 blocks the latter momentarily, causing it to produce a positive B pulse upon its anode. This pulse is transmitted by output wire a300 (also see Fig. 6j) and a coupling capacitor to the grid of a triode N17 which is normally biased to non-conductivity. Upon application of each positive B pulse to the grid of triode N17, it becomes momentarily conductive and feeds a negative A pulse to the resistance-coupled wire IN of the 6th order of DD—PQ, entering 1 into this order. Thus, each negative A pulse produced by pentode A29 (Fig. 6c) operates through tubes A30 and N17 to bring about an entry of 1 into the 6th order of DD—PQ.

As explained above, trigger A28 was turned on at the beginning of the first dividing cycle of the seventh dividing step to condition A29 to produce A negative pulses in response to positive B pulses applied to its suppressor. Means are provided to limit the number of the pulses produced by A29 to five pulses in order that a half pick-up entry of only 5 be made into the 6th order of DD—PQ. This means includes the pentode A27 (Fig. 6c) which is controlled by stages A21 and A23 of the primary commutator (Fig. 6a) to interpolate from the combinational patterns of these stages, negative pulses at "5," "7," "13" and "15" of each cycle (see part e of Figs. 7a to 7e). However, only the first such pulse produced at "5" is utilized in the dividing means of the present embodiment. Through biasing connections now understood and explained in Section 4, the suppressor and the control grid of A27 (Fig. 6c) are normally biased below their critical potentials. The suppressor of A27 is resistance-coupled by wire w27 to the anode of tube a of stage A23 (Fig. 6a). Stage A23 is on from "4" to "8" and from "12" to the end of each cycle (see part b of Figs. 7a to 7e). With A23 on, its tube a is non-conductive and at high potential. This high potential is applied by wire w27 to the suppressor of A27 (Fig. 6c) and drives the suppressor above the cut-off point. The pentode A27 is thus conditioned by A23 from "4" to "8" and from "12" to the end of each cycle. The control grid of A27 is capacitatively coupled to wire a21R which leads to the anode of tube a of stage A21 (Fig. 6a). Stage A21 switches on at odd index point times of each cycle. Each time A21 switches on, its tube a develops a positive pulse which is applied by wire a21R to the capacitatively coupled control grid of A27 (Fig. 6c) and momentarily increases its potential above cut-off. However, A27 will respond to positive pulsing of its control grid only when conditioned by high suppressor potential which exists within the on periods of A23. The first such on period is from "4" to "8." At "5," A21 turns on and produces a positive pulse which is transmitted to the control grid of A27. Thereupon A27 produces a negative pulse, at "5," which is applied to the left side of trigger A28 and turns it off. With A28 off, its tube b is at low grid potential and, therefore, conditioning potential is removed from the control grid of A29. Thus, responsiveness of A29 to the B positive pulses applied to its suppressor terminates at "5." In the period of its responsiveness, from "0" to "5," tube A29 produced five output pulses, at "0.5," "1.5," "2.5," "3.5," and "4.5." These five output pulses resulted in the half pick-up entry of 5 into the 6th order of DD—PQ.

Not only are means provided to limit the number of half pick-up pulses to 5 but means also are provided to limit the half pick-up entry to being made only in a single cycle; namely, the first dividing cycle of the seventh dividing step. Such single cycle limiting means includes the trigger A25 and its follower tube A260. When the trigger A28 was turned off at "5" of this cycle, its tube a produced a negative pulse which was applied to the right side of trigger A25 and turned it on. With A25 on, its tube b is conductive, as is the follower tube A260. As previously explained, when either A260 or A320 is conductive, it blocks trigger A28 from tripping on. Prior to the seventh dividing step A320 is held in conductive condition by the normally non-conductive tube A26 while tube A260 is maintained non-conductive by the trigger A25 in off status. At the beginning of the seventh dividing step A26 becomes conductive, as previously explained, and renders A320 non-conductive. At "5" of the first dividing cycle of the seventh dividing step, A25 turns on and renders A260 conductive. Hence, A28 which has been tripped off at "5" will be blocked from being turned on again at "0" of the succeeding cycles. At the end of the seventh dividing step, a negative pulse will be produced on wire 126 (Fig. 6g), in the manner explained in section 14. This negative pulse turns off trigger S7 of the column shift commutator. Thereupon, tube SS7 becomes conductive, removing high potential from wire w7, so that A26 will again become non-conductive and return A320 to conductive condition. Trigger A25 will remain in on status until the cancel bias line CBI is disconnected from line BI by the opening of cam contacts P8 (see Figs. 4a, 4b and 6a) of the reading-recording section, such action occurring after termination of the dividing calculation. When A25 returns to off status, tube A260 again becomes non-conductive. The half pick-up network is then in its initial condition.

Termination of the dividing calculation is brought about by the column shift commutator (Fig. 6g) upon stage S7 being switched off at the end of the 7th dividing step. This action occurs at "14" of a cycle, as explained in Section 13. When trigger S7 turns off, its follower tube SS7 becomes conductive, and, as it does so, produces a negative pulse upon the wire w7. Wire w7 transmits the negative pulse via a portion of a voltage divider r59 (Fig. 6a) and the coupling capacitor 16b of trigger A19 to the grid of tube b of this trigger, thus turning off the trigger. When A19 turns off at "14," it causes operation of the primary commutator to stop, as described in Section 9. Upon cessation of operation of the primary commutator, computing cycles terminate. In other words, the dividing calculation has been completed.

At the extremely high speed at which the electronic computing means functions, the maximum time required for a calculation is less than a machine cycle point. The calculation which was initiated by closure of cam contacts P11 between "11" and "12" of a machine cycle (see Figs. 4a and b) will be terminated by "12" or shortly after. The computed result figures in orders 7 to 12 of DD—PQ will be read out and recorded on the card from which the factors were taken. Such read-out and recording will be effected in the third cycle of operation upon a card as it traverses punches 18 (Fig. 1). While this card is traversing punches 18, the following card is traversing the sensing brushes 17 and its factors are being read out for a new computation. The new computation will start upon closure of cam contacts P11 and be terminated shortly thereafter. It is clear, then, that while a previously computed result in orders 7 to 12 of DD—PQ is being read out and recorded, the terms for the next computation are being entered in orders 1 to 6 of DD—PQ and in orders of MC—DR. Thus, it is necessary to reset orders 1 to 6 of DD—PQ and the orders of MC—DR before the 9 machine cycle point of the cycle, so that they may receive the new dividend and divisor from the card about to traverse the sensing brushes. At the same time, it is necessary to retain the result in orders 7 to 12 of DD—PQ until shortly after "0" of the same cycle, so that this result may be recorded on the preceding card as the latter traverses the punches. For this reason, two cancel bias lines are provided. One line, hereinbefore mentioned, is the line CBI which is disconnected from line BI upon the opening of cam contacts P8 (also see Fig. 6a) shortly after the start of a machine cycle. The other cancel line is designated CBI(A) and is disconnected from line BI upon the opening of cam contacts P9 (see Figs. 4a, 4b, and 6j) shortly after "0" of a machine cycle. The line CBI connects to the entry control triggers D and to the trigger stages of register MC—DR (Fig. 6f), to the readout triggers RT (Fig. 6h) of MC—DR, also to the entry triggers N and to the trigger stages of orders 1 to 6 of DD—PQ, to the triggers A7 and A19 (Fig. 6a) of the compute start means, to the trigger stages A21, A22, A23, and A24 (Fig. 6a) of the primary commutator, to the triggers shown in Fig. 6b, to the triggers shown in Fig. 6c, and to the triggers shown in Fig. 6d. The other cancel line CBI(A) connects to the trigger stages of orders 7 to 12 of DD—PQ (Fig. 6j), to the carry out manifesting triggers K of DD—PQ (Figs. 6i and k), to the triggers Y13 and Y11 of the true and complement control (Fig. 6i) and to the trigger stages of the column shift commutator (Fig. 6g). It may be mentioned that the triggers of the column shift commutator, of the true and complementary control, and the triggers K could be connected to the line CBI but it is more convenient with the wiring in the machine to connect them to the line CBI(A).

Considering, for instance, the first two cards of a run, the first card traverses the sensing brushes 17 during the second machine cycle (Fig. 4a) and its terms are read out, in the maner dessribed in Sections 6 and 7, into MC—DR and orders 1 to 6 of DD—PQ. Upon closure of P11, shortly after "11" of the second machine cycle, computing is initiated. The computation is completed shortly thereafter and before the start of the third machine cycle, and the result stands in register DD—PQ. Cam contacts P8 open between "D" and "14" of the third machine cycle (Fig. 4b), removing negative bias potential from line CBI. Thereupon, orders 1 to 6 of DD—PQ and the orders of MC—DR are reset and the remaining triggers connected to line CBI also are reset to stand-by status. Between "9" and "0," inclusive, of the third machine cycle, index position rows 9 to 0 of the first card are successively fed under the punches 18 and are punched with the computed result which is standing in orders 7 to 12 of DD—PQ. During the same period, "9" to "0," of the third machine cycle, the index position rows 9 to 0 of the second card are successively fed under the brushes 17 and the terms read out of this card into MC—DR and into orders 1 to 6 of DD—PQ. Between "0" and "11" of the third machine cycle, cam contacts P9 open, removing negative bias potential from line CBI (A). Thereupon, orders 7 to 12 of DD—PQ are reset to zero and the remaining triggers connected to line CBI(A) are reset to stand-by status. Cam contacts P11 close thereafter, between "11" and "12" of the third machine cycle, initiating computing operations for the terms taken from the second card. It is clear, now, that while a previously computed result is being recorded on one card, the terms involved in the next computation are being read out of the following card into the computing means.

The reading out and recording of the result standing in orders 7 to 12 of DD—PQ are explained in the next section.

16. *Recording the result*

In order that the result may be recorded in a chosen field of six card columns, the operator, before starting operations on a run of cards, inserts plug wire connections between the six sockets RP (Fig. 6k) and six of the sockets PMP (also see Fig. 5). There are eighty sockets PMP wired to the eighty punch magnets PM. The six sockets RP are outlet sockets for the result in orders 7 to 12 of DD—PQ. For the example shown in Fig. 2, the result is to be recorded in columns 72 to 77. In a field of card columns, the highest order column is the left hand column and the lowest order is the right hand column. Since the highest order of the result stands in order 12 of DD—PQ and the lowest stands in order 7 of DD—PQ, it is clear that sockets RP7 to 12 must be plugged to sockets PMP77 to 72, respectively, for the assumed example.

The result in orders 7 to 12 of DD—PQ will be read out by applying negative, entry pulses to these orders, just as MC—DR was read out (see Section 11). It is understood that a number of entry or rolling out pulses equal to the tens complement of the registered digit will advance the register order from 9 to 0. Production of the rolling out pulses is timed by cam contacts CB1, CB2, CB3, and CB4 (Figs. 4a, 4b, and 6d). Associated with this group of cam contacts is a trigger B21 (Fig. 6d) initially in off status. Cam contacts CB1 and CB2, card lever relay contacts R1BL and a resistor r60 are in series between the +40 v. line and the grid of tube b of trigger B21. Cam contacts CB3 and CB4 and a similar resistor are in series between the +40 v. line and the grid of tube a of trigger B21. The anode of tube b of B21 is connected by a suitable coupling capacitor to the control grid of a tube B22 and by a similar coupling capacitor to the control grid of a tube B20. Tube B20 is normally biased on while tube B22 is normally biased off. There will be no change in condition of either of these tubes until a switch in status of B21 is effected. Closure of cam contacts CB1 and CB2 is effective, provided card lever relay contacts R1BL are closed, to cause the +40 v. line potential to be applied to the grid of tube b of trigger B21, so as to trip the trigger to on state. Upon B21 tripping on, its tube b falls in anode potential, causing a negative pulse to be applied to the grids of tubes B20 and B22. Since B22 is biased off, the negative pulse has no appreciable effect therein. But B20 is biased on so that the negative pulse renders it non-conductive, whereupon a positive pulse is produced on output wire b20. Wire b20 is connected via a coupling capacitor C20 to the grids of triodes F (Fig. 6j), one of which is provided for each orders 7 to 12 of DD—PQ. The triodes F are normally biased off and upon receiving the positive pulse from wire b20 and capacitor C20, they become conductive. Thereupon, the tube F, in each of orders 7 to 12 of DD—PQ produces a negative, rolling out pulse which is transmited via a portion of its anode resistor to the IN line of the same order. In the foregoing manner, each time B21 (Fig. 6d) is switched from off to on status, a rolling out pulse is produced for each of orders 7 to 12 of DD—PQ. It has been pointed out that card lever relay contacts R1BL must be closed in order to render the closure of cam contacts CB1 and CB2 effective to lead the +40 v. line potential to the left side of B21 so as to turn on B21. Reference to Figs. 4a and 4b shows that card lever relay R1 is not energized until the 0 time of the second machine cycle. At the same time, there is a closure of cam contacts CB1 and CB2, so that B21 (Fig. 6d) is turned on and causes a rolling out pulse to be produced for orders 7 to 12 of DD—PQ. Consequently, these orders which have been resting in zero status will be advanced one step. However, cam contacts P9 open shortly after, thus removing negative potential from cancel line CB1(A), so that orders 7 to 12 of DD—PQ are zeroized as explained towards the end of the preceding Section 15. The group of orders 7 to 12 of register DD—PQ therefore is at zero prior to closure of cam contacts P11, which initiates the computing operations, and after the factors designated on the first card have been read into their receiving registers. Computation upon these factors is terminated, as previously explained, before the start of the third machine cycle. During this third machine cycle, the first card is fed intermittently past punches 18 (Fig. 1) in such manner that index position rows 9 to 0 of the card successively idle at the punch position at cycle times 9 to 0, respectively, to be punched selectively according to the computed result in orders 7 to 12 of DD—PQ. Ten pulses for rolling out these orders of DD—PQ are produced at cycle times 9 to 0, respectively. The first such pulse, in the third and subsequent machine cycle, is produced substantially at the 9 time when CB1 and CB2 both are made. With contacts CB1, CB2, and R1 (Fig. 6d) closed, a positive pulse from the +40 v. line is applied to the grid of tube b in trigger B21, tripping on the trigger. As B21 goes on, it blocks tube B20 which thereupon applies a positive pulse via wire b20 to tubes F (Fig. 6j). Tubes F, in response to the positive pulse, produce rolling out pulses for advancing orders 7 to 12 of DD—PQ one value step each. About midway between the "9" and "8" machine cycle and punching times, cam contacts CB3 and CB4 are both in closed condition, routing a positive pulse from the +40 v. line to the right side of trigger B21 (Fig. 6d) so as to turn it off again. As B21 turns off, the anode of its tube b rises in potential, so that a positive pulse is applied to the grids of tubes B20 and B22. Since B20 is normally biased on, the positive pulse has no practical effect thereon. But B22, which is normally biased off, is rendered conductive momentarily in response to the positive pulse from B21. As B22 becomes conductive, it applies a negative pulse to wire w"14" which is coupled to the left sides of triggers K (Figs. 6i and k) to turn off any of them which may happen to be on. Similarly, at the "8" machine cycle time, B21 (Fig. 6d) is turned on and at substantially midway between the "8" and "7" cycle times, B21 is turned off. These double reversals, to on and back to off state, of B21 thus occur ten times in each machine cycle following the second machine cycle, the last reversal of B21 to on state occurring at substantially the "0" time and the succeeding reversal to off state occurring at substantially half-way between "0" and "11," as may be understood from the timing lines, of cam contacts CB1, 2, 3, and 4, shown in Figs. 4a and b.

Any of orders 7 to 12 of DD—PQ standing at 9 is stepped to 0 by the first rolling out pulse substantially at the "9" machine cycle time, any of these orders standing at 8 is stopped from 9 to 0 by the second such pulse substantially at the "8" time, and so on. When an order steps from 9 to 0, it turns on its trigger K (see Fig. 6k). The anode of tube b in each of the triggers K of the 7th to 12th orders is connected to line B1 by a voltage divider r65 which is tapped at the midpoint by the grid of a triode Z. Trigger K is off in its inactive status, so that the anode potential of its tube b is high and forces the grid potential of the related tube Z above the critical point. Thus, tubes Z are normally held in conductive condition. The output of each triode Z is fed via a large capacitor C55; for example, a .1 microfarad capacitor, and thence via parallel resistors r68 to the grids of a pair of tubes PO. The anodes of all the tubes PO in orders 7 to 12 are connected to a common wire po which receives power from the +140 v. line (also see Fig. 5) during the closure period of cam contacts P10 which covers the 9 to 0 machine cycle times (see Figs. 4a and 4b). The cathodes of the pair of tubes PO in each of orders 7 to 12 are wired in parallel to the outlet plug socket RP for the related order. For instance, the tubes PO(7) have their cathodes wired to plug socket RP(7) and the tubes PO(12) have their cathodes wired to plug socket RP(12). It is clear that the anode-cathode paths of the tubes PO in each pair are in parallel between wire po and a related outlet plug socket RP. The tubes PO serve as current valves and they are paired in order to safely carry the relatively heavy current required for operating the punch call magnets PM. Normally, the tubes PO are all biased off. When one of the orders 7 to 12 of DD—PQ steps from 9 to 0, it turns on the related trigger K. As the trigger goes on, the anode of its tube b drops in potential, whereupon the related triode Z becomes non-conductive and its anode potential rises. The recovery time of the circuit path which includes capacitor C55 and resistors r680 is comparatively long, so that the rise in potential of the anode of tube Z results in the application of a prolonged positive pulse to the grids of the related pair of tubes PO. This positive pulse renders this pair of tubes PO conductive, allowing them to pass current from the +140 v. line via cam contacts P10, to wire po thence through these paired tubes PO, to the related plug socket RP. From socket RP, the circuit continues to the chosen socket PMP and thence through the connected punch selecting magnet PM, to ground. This circuit remains energized long enough to allow the magnet PM to couple the associated interponent 186 (Fig. 1) to the punch-operating plate 177 during the down stroke of this plate, in consequence of which the card is punched in the chosen column with the digit read out of one of orders 7 to 12 of DD—PQ.

As an example, assume that order 7 of DD—PQ registers the result digit 4. The sixth rolling out pulse, at the "4" machine cycle time steps the order from 9 to 0. Trigger K of order 7 turns on and renders tube Z(7) non-conductive. Thereupon, a positive pulse is fed from the anode of Z(7) via the related capacitor C55 and resistors r68 to the pair of tubes PO(7), rendering them conductive. A circuit is thereupon completed from the +140 v. line via P10, wire po, thence via parallel tubes PO(7), to plug socket RP7. From socket RP12, the circuit is completed by way of the plugwire to chosen socket PMP77 and through magnet PM for the 77th card column punch, to ground. Magnet PM(77) causes the punch for the 77th card column to be coupled to the punch operating plate 177. In consequence, the 4 index position in card column 77 is punched, designating the digit 4 in the units order of the result.

As previously described in this section, negative pulses are produced by tube B22 (Fig. 6d) upon wire w"14" to follow, at half machine cycle point times, the rolling out pulses. Wire w"14" connects to the left sides of triggers K. Thus, half a cycle point interval after a trigger K in any of orders 7 to 12 is turned on during a machine cycle, it is turned off by the next negative pulse on wire w"14." To insure the triggers K of orders 7 to 12 being in off status before the start of the next computation, the cam contacts P9 open after the "0" punching time, whereby cancel line CBI(A) is disconnected from line BI, causing reset of the triggers K of these orders to off status.

17. A dividing example

Operations of the dividing computation will be summarized with reference to the example given in Fig. 8. In this example, the dividend is 99105 and the divisor is 66. The chart of computing cycles (Figs. 7a to 7j) is particularly directed to the chosen example.

Shortly after the start of the second machine cycle of operations on the card bearing the chosen terms, cam contacts P8 (Figs. 4a, 4b, and 6a) open, disconnecting cancel bias line CBI from line BI, whereby register MC—DR (Fig. 6f) and orders 1 to 6 of DD—PQ (Fig. 6j) are zeroized and various triggers connected to line CBI and mentioned towards the end of Section 15 are reset to stand-by status. Between machine cycle points "9" to "1," the dividend and divisor terms designated on the card are read into orders 1 to 6 of DD—PQ (Fig. 6j) and into MC—DR (Fig. 6f), in the manner explained in Sections 6 and 7. Between "0" and "11" of the machine cycle, cam contacts P9 (also see Fig. 6j) open, disconnecting the auxiliary cancel bias line CBI(A) from line BI, whereby orders 7 to 12 of DD—PQ are zeroized and the remaining triggers are reset to stand-by status, as explained towards the end of Section 15. Between "11" and "12" of the machine cycle, cam contacts P11 (see Figs. 4a and b and Fig. 6a) close, whereupon trigger A7 trips on and, in turn, trips A19 to on state (see part d of Fig. 7a). With A19 on, it conditions A20 (part e, Figs. 7a to 7e) to produce tripping pulses for the primary commutator A21, A22, A23, and A24 (part b, Figs. 7a to 7e).

Initially, the column shift means is in 1st position; hence, S1 (Fig. 6g) is on (see part c, Fig. 7a), and D1 (Fig. 6e) emits negative A pulses (see part f, Fig. 7a) in response to the continually applied B pulses. Tube DT1 (Fig. 6e) inverts the negative A pulses to positive B pulses applied via wire d1 to the suppressors of the column of tubes CS1 (Fig. 6h).

Since the machine is in dividing condition, the trigger Y11 (Fig. 6i and part g, Fig. 7f) initially is in off status and its follower tube Y12 is nonconductive, applying high potential to wire cw. Accordingly, the tubes CN and CP (Fig. 6f) are conditioned for enabling the complement of the divisor to be read out of MC—DR. At the "0" time of the first computing cycle (Fig. 7a), a positive pulse is produced on wire w"0" in the manner explained in Section 11, so that tube CN in the first order of MC—DR is rendered conductive. Consequently, trigger RT in the first order (see Fig. 6h) goes on (see part h, Fig. 7a) and conditions tube CS1 (see Fig. 6h and part j, Fig. 7a) in said order. Tube CS1 which, in 1st column position, is continually receiving B pulses, is now conditioned to respond to these pulses and produce negative A entry pulses which are transmitted by wire t6 to the 6th order of DD—PQ (Fig. 6j). At the "0" time, trigger A8 (Fig. 6b) is turned on (see Section 11) and at the "1" time it is turned off (see part d, Figs. 7a to 7e). When A8 turns off, it causes tube A2 (Fig. 6b) to produce a positive pulse on wire A2 (Fig. 6b) to produce a positive pulse on wire w"1" which renders tubes CN of orders 2 to 6 of MC—DR (see Fig. 6f) conductive. These tubes CN thereupon turn on triggers RT (Fig. 6h) of orders 2 to 6 to condition tubes CS1 of these orders to produce negative A entry pulses. These pulses are transmitted by wires t7 to t11 to orders 7 to 11 of DD—PQ (Fig. 6j). In the manner described in Section 11, trigger B4 (Fig. 6c) is turned on for the period "0.5" to "10.5" (see part d of Figs. 7a to 7e). With B4 on, tube B11 (Fig. 6c) responds to the continually applied A pulses and produces negative B pulses. Ten pulses are produced by B11 at "1," "2" . . . "10" (see part e of Figs. 7a to 7e) before trigger B4 is turned off. The pulses produced by B11 are inverted by tube B12 to positive A pulses. These pulses are transmitted by wire b12 and a coupling capacitor to the tubes E of orders 1 to 6 of MC—DR (Fig. 6f). Tubes E, in response to the applied pulses impress negative B entry pulses upon the IN lines of these orders.

These entry pulses roll out the amount from the MC—DR (see Section 11). In the chosen example, the units and tens orders of MC—DR each registers digit 6. Hence, four rolling-out pulses will advance each of these orders from 9 to 0. Consequently, at the "4" time of the computing cycle, tubes CP of orders 1 and 2 of MC—DR become conductive and turn off related triggers RT (Fig. 6h), removing conditioning potential from the grids of tubes CS1 of these orders. Accordingly, production of entry pulses by these tubes ceases. Since CS1 (1st order) was conditioned at "0" and its conditioning terminated at "4," it produced four negative A entry pulses (see part j, Fig. 7f) for order 6 of DD—PQ. Tube CS1 (2nd order) was conditioned at "1" and its conditioning was removed at "4," so that it produced three negative A entry pulses (see part k, Fig. 7f) for order 7 of DD—PQ. With respect to orders 3 to 6 of MC—DR, they registered 0000, so that ten rolling-out pulses step them from 9 to 0. Hence, at the "10" time, tubes CP of these orders become conductive and turn off the related triggers RT to remove conditioning potential from tubes CS1 (3rd to 6th orders). Since these tubes were conditioned at "1," they produced during their conditioned interval, nine negative A entry pulses for orders 3 to 6 of DD—PQ. Thus, as shown in Fig. 8, during the first computing cycle, the tens complement, 999934 of the divisor (DR) is entered in orders 7 to 11 of DD—PQ. It is to be noted that, in order to simplify the chart of computing cycles, the operation of the tubes CSI to CS7 of orders 3 to 6 of MC—DR is not indicated. It is to be understood that since these orders register zero, in the chosen example, the related CS tubes produce nine entry pulses during each cycle of complement entry and do not produce any entry pulses during each cycle of true value entry.

Since orders 7 to 11 of DD—PQ registered zero, the addition thereto of the complement, 999934, of the divisor does not produce carry out of the 11th order of DD—PQ. As explained in Sections 12 and 14, "no carry" out of the highest order of the comparison group of orders signifies "no go." Since there has been no carry out of the 11th order of DD—PQ during the first computing cycle, the "go" detecting tube (such as WW of the shown orders in Figs. 6i and k) of this order does not become effective to turn off trigger Y13 (Fig. 6i). Consequently, at the "15" time of the first computing cycle, tube Y10 applies a tripping pulse to trigger Y11 to turn it on (see part g, Fig. 7f and Section 13). With Y11 on, its follower tube Y15 applies high potential to wire tw so as to condition tubes TP and TN (Fig. 6f and part i, Fig. 7f) for enabling the true value of the divisor to be read out in the second computing cycle.

During the second computing cycle, ten rolling out pulses are applied to the orders of MC—DR, in the manner previously explained. At the "4" time, orders 1 and 2 of MC—DR step from 9 to 0, rendering the related tubes TP conductive to turn on triggers RT (Fig. 6h) of these orders. Accordingly, tubes CSI of orders 1 and 2 are conditioned at "4" to produce negative A entry pulses for orders 6 and 7 of DD—PQ (Fig. 6j). At the "10" time, trigger A15 (see Fig. 6b and part d of Figs. 7a to 7e) turns on, rendering its follower tube A3 conductive. Tube A3 applies a negative pulse to tube A11 which thereupon produces a positive pulse upon wire w"10." This pulse renders tubes TN (Fig. 6f) conductive to turn off all the triggers RT (Fig. 6h), removing conditioning potential from tubes CSI. Since the tubes CSI of orders 1 and 2 were conditioned from "4" to "10," they produced six negative A entry pulses for orders 6 and 7 of DD—PQ. In other words, during the second computing cycle, the true value, 66 of the divisor, has been entered in the comparison group of orders of DD—PQ, as indicated in Fig. 8. Since order 6 of DD—PQ registered digit 4 prior to addition of 6 thereto during the second cycle, this order steps from 9 to 0 upon receiving the sixth entry pulse, at "9.5." Hence, trigger K (Fig. 6k) of the 6th order goes on at substantially "9.5" (see part m, Fig. 7f). The tubes V (Figs. 6i and k) are rendered non-conductive, as explained in Section 14, for the period "10.5" to "14" of each computing cycle to define the carry period. When tube V of the 6th order becomes non-conductive at "10.5," it causes tube W of this order to produce a carry entry pulse for the 7th order. Since the 7th order stood at 9 prior to reception of the carry pulse, the latter pulse advances this order to 0, so that its trigger K goes on and its tube W produces a carry entry pulse for the 8th order. Similarly, successive carries are effected from the 8th to the 9th order, from the 9th to the 10th order, and from the 10th to the 11th order. Carry out of the 11th order is suppressed since, in the 1st column shift position, the carry suppression tube (WC) of the 11th order is conductive and rendering the carry pulse producing tube (W) of this order ineffective (see Section 14). The carry or "go" detecting tube (WW) of the 11th order is effective, however, to turn off Y13 (Fig. 6i) at about "10.5" (see part g, Fig. 7f). At "14," triggers K and Y11 (Figs. 6i and k) are turned off. When Y11 goes off, its follower tube Y12 experiences a rise in anode potential which is transmitted by wire cw to tube DV20. Tube DV20, in response, emits a negative pulse upon wire md. Tube TR18 (Fig. 6g) receives the negative pulse from wire md and produces a positive pulse which is applied to tube TR19. Tube TR19 thereupon applies a negative pulse to wire 126, as a result of which the column shift means is stepped to its 2nd position. Also, since wire cw now is at high potential, tubes CP and CN (Fig. 6f) are conditioned to enable a complement to be read out of MC—DR.

The remaining operations concerned with the chosen example are performed in a manner now understood and indicated in Figs. 7a to 7j and in Fig. 8.

The entire dividing computation is completed before the end of the second machine cycle of operations upon the card from which the terms for the computation were taken. Referring to Figs. 4a and b, cam contacts P8 open shortly before "14" of the next machine cycle, thus removing bias potential from line CBI, whereupon register MC—DR and orders 1 to 6 of DD—PQ are zeroized. Between "9" and "1" of this next machine cycle, the terms from the following card are read into MC—DR and orders 1 to 6 of DD—PQ. Also between "9" and "0" of this same cycle, the computed result standing in orders 7 to 12 of DD—PQ is recorded (see Section 16) on the card from which the terms for the chosen example were taken during the preceding machine cycle.

18. Concerning multiplication

For the multiplication computation, the multiplicand factor is read into register MC—DR (Fig. 6f) in the manner explained in Section 7, while the multiplier factor is read into the register MP (Fig. 6m). Multiplication is effected here by over-and-over addition of the multiplicand. The multiplicand is routed into orders of DD—PQ (Fig. 6j) selected by the same column shift means (see Section 10) utilized for the dividing calculation. The number of times the multiplicand is entered into selected orders of DD—PQ in each column shift position is determined by the digit in the multiplier factor order which is brought into control in the column shift position. In the 1st column shift position, the multiplicand will be routed into orders 6 to 11 of DD—PQ. Also, in the 1st column shift position, the 6th order of register MP (Fig. 6m) will be rendered effective to control the number of times the multiplicand is entered into orders 6 to 11 of DD—PQ. When the multiplicand has been entered in orders 6 to 11 of DD—PQ a number of times equal to the value of the digit in order 6 of MP, the column shift means will be stepped to 2nd position. Similarly, successively lower orders of register MP will serve as cycle controllers in successive column shift positions to determine the number of cycles of multiplicand entry into orders of DD—PQ selected by the column shift positions. The true and complement control (Fig. 6i) explained in Section 13 remains in "true" position throughout multiplication. Advance of the column shift means is effected under control of a commutator which is stepped at "14" of each computing cycle and completes one commutator cycle in nine computing cycles. At the ninth or final step of each commutator cycle, it advances the column shift means to its next position. Such advance occurs at "14" of a computing cycle. At the "15" time of each computing cycle, including the "15" time between "D" and the first complete computing cycle (see Fig. 9a), a stepping pulse is applied to that order of MP which is selected by the column shift position to serve as multiplicand entry cycle controller. The first stepping pulse for an order of MP occurs at "15" of the same computing cycle in which at "14," the column shift means was advanced to the position which selected the order of MP. Such advance of the column shift means resulted from completion of the cycle of the multiply control commutator (Fig. 6L). Thus, the latter commutator is in its starting position during the next computing cycle after the selected order of MP has been advanced one value step. Assuming this order of MP initially registered 9, then it would be advanced to zero by its first step. It will require nine more computing cycles to complete another cycle of the column shift control commutator. During these nine computing cycles, as a result of the selected order of MP having been advanced by its first step from 9 to 0, rolling out pulses will be applied to register MC—DR (Fig. 6f) to cause the multiplicand to be entered nine times in selected orders of DD—PQ. The column shift means will be advanced to its next position at "14" of the last of the nine cycles of entry. It is clear, now, that a set of nine computing cycles is available in each column shift position for possible multiplicand entries. All nine cycles are utilized for such entries if the controlling order of MP registered multiplier digit 9. If the multiplier digit were 8, the MP order would be advanced to 0 at "15" of the first cycle of the set of nine and multiplicand entries would take place in the next eight cycles, and so on. Thus, multiplicand entries start in that cycle, of the set of nine, which is the tens complement of the controlling multiplier digit, so that the number of multiplicand entry cycles in any column shift position equals the value of the multiplier digit. For instance, if the multiplier digit is 9, multiplicand entries start in the first cycle of the set of nine and occur for all nine cycles; if the multiplier digit is 4, multiplicand entries occur in four cycles of a set of nine, starting with the sixth cycle of the set, and so on for other multiplier digits.

When the machine is to perform multiplication, the operator plugs the six brush sockets PB (Fig. 5) wired to the brushes for reading the multiplier factor field of the cards to the plug sockets mp1 to 6 (Fig. 6m). Also, the brush sockets PB wired to the brushes for reading the multiplicand field are plugged to sockets PF1 to PF6 (Fig. 6f). Hence, during the second machine cycle of operation on a card, the multiplicand factor will be read into MC—DR in the manner clear from Section 7. As explained in Section 6, nine positive pulses are applied at mid-index times of machine cycle points "9" to "1" to the wire 101 (Fig. 6d) which leads via capacitor 110, as described in Section 7, to the suppressors of tubes 116 related to register MC—DR (Fig. 6f). The wire 101 also is coupled via the capacitor 110 to a wire 210 which connects to the suppressors of pentodes 216 (Fig. 6m) related to the six orders of register MP. When a brush 17 (Fig. 5) senses a perforation in a column of the multiplier factor field of the card, a circuit is established from the +40 v. line via cam contacts CB5 and CB6 and via card lever relay contacts R8B, the brush common 1021 and the brush 17 to the brush plug socket PB, thence by plugwire (not shown) to a socket mp (Fig. 6m) and to the left side of a trigger ME. Trigger ME is thereby turned on to apply high potential to the control grid of the related pentode 216, conditioning it to respond to the positive pulsing of its suppressor. The pentode 216 thereupon inverts the positive pulses applied to its suppressor to negative entry pulses which are transmitted to the IN wire of the related order of register MP. In the foregoing manner, the multiplier factor is entered in orders of register MP.

The machine is set for multiplication by plugging the socket MPY (Fig. 6d) to socket COM, whereby wire MW is placed at the potential of line B (+150 v.). Accordingly, tube M10 (Fig. 6c) is conditioned by high suppressor potential to respond to changes in its control grid potential. The control grid of M10 connects by wire m10 to the grid of tube a of trigger B3 (Fig. 6L). When B3 is off, the grid of its tube a is at high potential, as is the control grid of M10, but when B3 is on, the reverse is true. Hence, M10 is conductive when B3 is off and non-conductive when B3 is on. The tube M10 when non-conductive, permits the production of rolling-out pulses for MC—DR (Fig. 6f) to be effected upon triode B9 being rendered non-conductive. During dividing calculation, M10 remains continuously non-conductive, so that trigger B3 and M10 do not participate in determining when rolling-out pulses for MC—DR shall be produced. But with the machine set for multiplication, M10 is conductive or non-conductive according to the status of B3, so that B3 and M10 participate in determining when rolling-out pulses for MC—DR shall be produced (see Section 11).

The high potential on wire MW renders triode M15 (Fig. 6e) conductive, thereby rendering tube DV15 ineffective to function in the 7th column shift position. Hence, the tube D7 and tubes CS7 (Fig. 6h) will not be operative during the multiplying computation to route entries into orders of DD—PQ (Fig. 6j). The wire MW also applies potential to the tubes M7 and M14 (Fig. 6i) to render them conductive. Tube M7, being conductive, prevents tube Y7 from being effective to apply conditioning potential to the carry suppression tubes WC relating to orders 5 to 11 of DD—PQ (see also Fig. 6k). Tube M14, upon being rendered conductive, reduces the anode potential of tube b of trigger Y11, so that Y11 turns on and stays on as long as the machine is set in multiplying condition. With Y11 on, the true and complement control (see Section 13) remains in "true" condition, in which there is high potential on wire tw. With high potential present on wire tw, tubes TP and TN (Fig. 6f) remain conditioned to enable the true amount to be read out of MC—DR (see Section 11). It was explained in the latter part of Section 13 that when the machine is set for dividing operation, pentode DV20 (Fig. 6i) is at high suppressor potential, thereby being conditioned to respond to a positive pulse of potential produced upon wire cw when the true and complement control changes from "true" to "complement" condition. Tube DV20, when responsive to the pulse of potential on its control grid, negatively pulses the wire md to cause tubes TR18 and TR19 (Fig. 6g) to function for causing the column shift commutator to be stepped to its next column shift position. It was also pointed out in Section 13 that when the machine is in multiplying condition, the potential on wire MW is effective to cause tube M18 (Fig. 6i) to become conductive and disable tube DV20 from functioning. Hence, during the multiplying calculation, tube DV20 remains non-conductive. With DV20 non-conductive, the potential on wire md will depend on the status of a pentode M17. The suppressor of M17 is resistance-coupled to wire MW. Hence, when the machine is in dividing condition, the lack of potential on wire MW maintains M17 unconditioned and non-conductive. With M17 non-conductive, the potential on wire md depends on the status of pentode DV20. But when the machine is in multiplying status, the pentode DV20 remains non-conductive, so that the potential on wire md may change upon a change in current flow through pentode M17. Further, during the multiplying calculation, pentode M17 is conditioned by high suppressor potential to be effective. Operation of M17 and, hence, advance of the column shift means during multiplication, is controlled by a nine-step commutator (Fig. 6L) including four trigger stages B14, B15, B16, and B17 and a blocking tube BX. Initially, all four stages are off and tube BX is non-conductive. Both sides of the first stage B14 and the left side of the fourth stage B17 are suitably coupled to a wire a30M which taps the anode resistor of tube A30 (Fig. 6b). Tube A30 is a follower tube which follows tube a of trigger A15. In the manner explained in Section 11, trigger A15 goes on at "10" of each computing cycle and turns off at "14" (also see the multiplication timing chart Figs. 9a to e). Hence, tube A30 becomes non-conductive each cycle at "10" and returns to conductive status at "14." Each time A30 returns to conductive status, it produces a negative pulse upon wire a30M. Each such negative pulse reverses the status of stage B14 (Fig. 6L) since it is applied to opposite sides of this stage. Each negative pulse on wire a30M is also applied to the left side of the fourth stage and, hence, is effective only if this stage is on, in which case the negative pulse turns it off. Referring to Figs. 6L and 9a to 9e the first negative pulse applied by wire a30M after the start of multiplying, computing cycles turns on the first stage B14 at "14" of the first computing cycle. The second such pulse turns off B14 at "14" of the second cycle, and as B14 goes off, it turns on the second stage B15. The third pulse turns on B14 again. The fourth pulse turns off B14 which thereupon turns off B15. As B15 turns off, it turns on the third stage B16. The fifth pulse turns on B14. The sixth pulse turns off B14 which causes B15 to turn on. The seventh pulse turns on B14. The eighth pulse trips off B14, causing B15 to trip off and, in turn causing B16 to trip off. As B16 trips off, it trips on the fourth stage B17. With B17 now on, its tube a has high anode potential which is applied via resistance-coupling to the grid of blocking tube BX. Tube BX thereby is rendered conductive, and its low anode potential blocks the first stage from being turned on by the ninth pulse from wire a30M. The ninth pulse is therefore effective merely to turn off the fourth stage B17. It may be noted that the anode of tube b of stage B17 is coupled by a capacitor 47M to the grid resistor of the blocking tube BX, so that as stage B17 goes off, it maintains BX conductive until the capacitor 47M is charged. As a result, the blocking action of tube BX persists until the ninth pulse is spent. The tube BX and its coupling to the first and last stages of the control commutator shown in Fig. 6L are similar to the blocking tube X and its coupling connections to the second and fourth stages of the register order (Fig. 6j), explained in Section 5.

The foregoing has described nine-step commutator B14, B15, B16, and B17 which performs a commutator cycle for each successive series of nine computing cycles. The last or ninth step of the commutator cycle is characterized by the last stage B17 being turned off. As B17 turns off, its tube b produces a positive pulse upon wire b17 which is capacitatively coupled to the control grid of pentode M17 (Fig. 6i). Since pentode M17 is conditioned by high suppressor potential during the multiplying calculation, the positive pulse received by its control grid renders it conductive. Thereupon, M17 produces a negative pulse on wire md. Consequently, tube TR18 (Fig. 6g) becomes non-conductive and renders tube TR19 conductive. Tube TR19 thus produces a negative pulse on wire 126, in consequence of which the column shift means is stepped to its next position.

In the foregoing manner, the control commutator B14, B15, B16, and B17 (Fig. 6L) is operated through one commutator cycle in nine successive computing cycles, and each commutator cycle advances the column shift means one step. Thus, a set of nine computing cycles is available in each column shift position. For convenience, the cycles of each set of nine are numbered 1 to 9 in Figs. 9a to 9e.

Referring to Fig. 6m, showing the multiplier register and related elements, there is a pentode 217 for each order, and the output of this pentode connects to the IN wire of the order. The suppressors of the pentodes 217 are capacitatively coupled to wire w"15." A positive pulse appears on wire w"15" at the "15" time of each computing cycle as a result of tube A13 (Fig. 6b) being rendered non-conductive when trigger A14 is turned off at that time, as explained in Section 13. Thus, at "15" of each computing cycle, and of the portion of the cycle between "D" and the first computing cycle (Fig. 9a), a positive pulse is produced on wire w"15" and fed therefrom to the suppressors of tubes 217 (Fig. 6m). Only one of these tubes at a time is conditioned by high control grid potential to respond to the positive pulsing of its suppressor. The tubes 217 are selectively conditioned by the column shift means. For this purpose, the output wires w1 to w6 of tubes SS1 to SS6 (Fig. 6g) of the column shift commutator are coupled to the control grids of tubes 217(6) to 217(1), respectively. As explained in Section 10, wires w1 to w6 are respectively at high potential in column shift positions 1 to 6. Accordingly, with wire w1 coupled to the control grid of tube 117(6), the latter is conditioned when the column shift means is in 1st position. Similarly, 117(5) is conditioned when the column shift means is in 2nd position, and so on. The conditioned one of the tubes 117 will produce a negative entry pulse for the related order of register MP in response to each applied "15" positive pulse upon its suppressor. A number of such entry pulses equal to the tens complement of the multiplier digit in the register order steps the order from 9 to 0. Thereupon, a positive pulse is produced on the output wire 8b of the order, as explained in Section 5. This output pulse is transmitted by a capacitor C10 to the grid of a triode H, rendering it conductive, whereupon it develops a negative pulse upon a wire h connected to the anodes of all the triodes H(1) to H(6). The wire h is suitably coupled to the right side of trigger B3 (Fig. 6L) and, therefore, the negative pulse on wire h turns on this trigger. When trigger B3 is on, the grid of its tube a is at low potential and since this grid is connected by wire m10 to the control grid of now-conditioned tube M10 (Fig. 6), the latter tube becomes non-conductive. With M10 non-conductive, it allows effective functioning of the means for producing rolling-out pulses for MC—DR, as described in Section 11. Hence, in the cycle following the stepping of an order of MP (Fig. 6m) from 9 to 0, rolling out puses for MC—DR are produced, whereby the multiplicand is read into selected orders of DD—PQ (Fig. 6j). Meanwhile, the column shift controlling commutator B14, B15, B16, and B17 (Fig. 6L) is advancing each computing cycle. When this accumulator performs the ninth, last step of its cycle, stage B17 goes off to cause the column shift means to step to its next position, as already explained. At the same time, upon trigger B17 going off, its tube a produces a negative pulse which is communicated to the left side of trigger B3, returning it to off status. Accordingly, tube M10 (Fig. 6c) becomes conductive and renders the means for producing rolling-out pulses for MC—DR ineffective.

In the 7th column shift position, the five rounding-off pulses will be applied, in the manner explained in Section 15, to order 6 of DD—PQ. Thereafter, the multiplying computation will be terminated.

The essential elements for performing multiplication have been outlined. The multiplying computation will be summarized briefly with respect to the problem to which Figs. 9a to 9e are particularly directed; namely, the multiplication of 6 by 376528.

The multiplicand and multiplier factors are entered into register MC—DR (Fig. 6f) and register MP (Fig. 6m) during the second machine cycle of operation on the card bearing the chosen factors. Upon the closure of cam contacts P11 between "11" and "12" of the machine cycle (see Figs. 4a or 4b), computing cycles are initiated in the manner explained in Section 9, the D point (Figs. 9a and f) being taken as substantially the time of closure of cam contacts P11. Trigger A19 (Fig. 6a) turns on directly after "D," conditioning tube A20 to produce negative B tripping pulses for the primary commutator A21, A22, A23, and A24. Stage A21 turns on at "15" after "D" and produces a negative pulse on wire a21L which trips trigger A14 (Fig. 6b) off. As A14 goes off, it applies a negative pulse to tube A13. A13 thereupon produces a positive pulse transmitted by wire w"15" and a coupling capacitor to the suppresors of tube 217(1) to 217(6), of register MP (see Fig. 6m). Since the column shift means initially is in 1st position, wire w1 is "hot," conditioning tube 217(6) alone to respond to the "15" pulse on its suppressor. Tube 217(6) applies a negative entry pulse to the IN wire of the 6th order of MP advancing it from value 3 to value 4. Thus, the 6th order of MP is advanced one value step just prior to cycle 1 of the first set of nine cycles provided for the 1st column shift position.

As explained in Section 11, pentode A16 (Fig. 6b) is conditioned by A24 (Fig. 6a) in on state to respond to pulses produced by AA going on. Hence, A16 (Fig. 6b) produces negative pulses at "10" and "14" of each cycle (see part e, Figs. 7a to 7e). These successive pulses turn on trigger A15 at "10" and turn off the trigger at "14." When A15 goes off at "14," its tube a and the follower tube A30 become conductive. Tube A30 thereupon produces a negative pulse which is applied by wire a30M to the control commutator (Fig. 6L), advancing the commutator one step. Thus, in cycle 1 of the first set of nine attending the 1st column shift position, the commutator stage B14 is turned on.

At "15" of cycle 1 of the first set, the 6th order of MP is stepped from 4 to 5. At "14" of cycle 2 of the first set, the commutator stage B14 (Fig. 6L) is turned off and causes stage B15 to go on. At "15" of this cycle 2, the 6th order of MP is stepped from 5 to 6. At "14" of cycle 3 of the first set, stage B14 (Fig. 6L) is turned on. At "15" of this cycle, the 6th order of MP is advanced to 7. At "14" of cycle 4 of the first set, stages B14 and B15 are turned off and stage B16 is turned on. At "15" of this cycle, the 6th order of MP is stepped to 8. At "14" of cycle 5 of the first set, stage B14 is turned on. At "15" of the same cycle, the 6th order of MP is stepped to 9. At "14" of cycle 6 of the first set, stage B14 is turned off, turning on B15, while stage B16 remains on. At "15" of this 6th cycle, the 6th order of MP (Fig. 6m) is advanced from 9 to 0. Thereupon, triode H(6) produces a negative pulse which is transmitted by wire h to the right side of trigger B3 (Fig. 6L), turning it on (see Fig. 9b). When B3 is on, the tube M10 (Fig. 6c) is non-conductive, allowing the means for producing rolling-out pulses for MC—DR to become effective during succeeding cycles. As explained in Section 11, trigger A8 (Fig. 6b) is turned on at "0" of each cycle to condition tube B6 (Fig. 6c) to respond to an applied positive B pulse at "0.5" and thereupon to trip trigger B4 on. Trigger B4, in turn, renders triode B9 non-conductive. Since tube M10 is non-conductive during cycle 7 of the first set, the switching of B9 to non-conductive status at "0.5" of this cycle is effective to condition B11 to respond to the applied positive A pulses. The tube B11 then produces negative pulses which are inverted by tube B12 to positive A pulses upon its output wire b12. These pulses are transmitted to the entry control triodes E for register MC—DR (Fig. 6f), and, therefore, triodes E produce negative, rolling-out pulses for the MC—DR orders. Ten such pulses are produced, the first at "1" and the tenth at "10" of each cycle in which tube M10 (Fig. 6c) is non-conductive. In the manner explained in Section 11, the true number in MC—DR is thereby read out of MC—DR. Since the column shift means is in 1st position, tube D1 (Fig. 6e) is producing negative A pulses which are inverted by tube DT1 to positive B pulses applied by wire d1 to tubes CS1 (Fig. 6h) of the MC—DR orders. Since, in the chosen example, the multiplicand is 6, orders 2 to 6 of MC—DR register zero and the column shift pentodes CS for these orders are not conditioned during true number readout. The tubes CS of the first order are conditioned at "4" of each cycle in which rolling-out pulses are applied thereto, since this order contains the multiplier digit 6. At "10" of each cycle, conditioning is removed from tubes CS, as explained for true number readout in Section 11. During the interval between "4" and "10" of cycle 7 of the first set, tube CS1 produces six entry pulses which are transmitted by wire t6 to order 6 of register DD—PQ (Fig. 6j). Thus, the multiplicand 6 is entered in the 6th order of MC—DR within cycle 7 of the first set. At "14" of this cycle, the control commutator (Fig. 6L) is given its seventh step; i. e., stage B14 goes on while stages B15 and B16 stay on. In cycle 8 of the first set, rolling-out pulses for MC—DR again are produced, and a second entry of 6 into order 6 of DD—PQ occurs. At "14" of the cycle, stage B14 goes off, turning off B15 which turns off B16, and B16 turns on B17. In cycle 9 of the first set, rolling-out pulses for MC—DR again are produced, and a third entry of 6 into order 6 of DD—PQ occurs. At "14" of cycle 9 of the first set, the ninth step of the control commutator (Fig. 6L) is effected; i. e., stage B17 is turned off, thus completing the nine-step commutator cycle. As B17 turns off, it produces a positive pulse which is transmitted by wire b17 to the capacitatively coupled control grid of pentode M17 (Fig. 6i). M17, in response, produces a negative pulse on wire md, rendering tube TR18 (Fig. 6g) non-conductive to cause tube TR19 to apply a negative pulse to wire 126, thus advancing the column shift commutator. In short, the column shift means is now in 2nd position. Further, when stage B17 of the control commutator (Fig. 6L) goes off at "14" of cycle 9 of the first set, its tube a applies a negative pulse via wire b3 to the left side of trigger B3, returning B3 to off status. Consequently, tube M10 again becomes conductive to suppress effective operation of the means for rolling out register MC—DR.

It has been shown specifically that when the 6th order multiplier digit is 3, then three cycles of entry of the multiplicand into the proper orders of DD—PQ occur in the 1st column shift position.

At "14" of the last cycle of the first set, the column shift means has been stepped to 2nd position, so that wire w2 is "hot" and conditioning tube 117(5) relating to the 5th order of register MP (Fig. 6m) to respond to the "15" pulse derived from wire w"15." If the 5th order multiplier digit were 9, then the "15" pulse, towards the end of cycle 9, would advance the 5th order of MP from 9 to 0, causing tube H(5) to produce a negative pulse on wire h for turning on trigger B3 (Fig. 6L), so that tube M10 would be non-conductive. Rolling out of MC—DR would then start in cycle 1 of the second set of nine. However, in the chosen example, the fifth order multiplier digit is 7, so that rolling out of MC—DR starts in cycle 3 of the second set of nine (see Fig. 9c).

The manner in which the multiplicand entries are brought about in the 2nd, 3rd, 4th, 5th and 6th column shift is believed clear and need not be explained further. At "14" of cycle 9 of the sixth set (see Fig. 9e), the column shift means is advanced to 7th position. Since tube M15 (Fig. 6e) is conductive all through the multiplying computation, tubes D7 and CS7 will not function to cause entries to be made into DD—PQ. However, in cycle 1 of the seventh set, the half-pick up entry of 5 is made into the 6th order of DD—PQ, in the manner explained in Section 15, the fact of such entry being denoted in Fig. 9e by the five pulse portions of the timing line for tube A29 (also see Fig. 6c). At "15" of cycle 9 of the seventh set, the column shift commutator (Fig. 6g) receives a negative pulse from wire 126, so that stage S7 is turned off. Consequently, computing cycles are terminated, in the manner explained in Section 15.

Computations are completed prior to the beginning of the third machine cycle of operation upon the card from which the factors entering into the computation were taken. In the third machine cycle, the product is read out of orders 7 to 12 DD—PQ and recorded on this card, in the manner explained in Section 16.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In apparatus to divide a dividend term by a divisor term, an accumulator registering the dividend term, means for producing carries from lower to higher orders, means for effecting repeat entries of the complement of the divisor into orders of the accumulator to produce successive remainders, with the carry means of the highest order operating upon the production of a positive remainder and failing to operate upon the production of a complement remainder, and means associated with the carry means of said highest order for bringing about termination of said repeat entries upon the production of a complement remainder.

2. Computing apparatus comprising an accumulator registering a first amount, carry means, including a carry out manifesting circuit, associated with lower orders for carrying to higher orders, means for repeatedly entering a second amount to produce, with the aid of the carry means, successive cumulative result amounts in the accumulator, and means under control of the carry out manifesting circuit of the highest order for terminating the repeat entries upon failure of a carry out manifestation from said highest order.

3. Dividing apparatus including an accumulator registering a dividend term in a number of lower orders, carry means to produce carries from lower to higher orders, means for entering the complement of a divisor term a number of times in a selected group of orders to produce successive remainders, with the carry means in the highest order of the group functioning to produce a quotient entry into an order to the left of said highest order upon the formation of each true remainder amount in said group, means associated with the carry means of said highest order for terminating entries of the complement into said group upon the production of a complement remainder, means thereafter effective to enter the true divisor amount into said group so as to produce the previous true remainder amount, and means for suppressing quotient-producing carry from the highest order of the group upon the production of said previous true remainder amount.

4. Dividing apparatus to divide a dividend quantity by a divisor quantity in successive dividing steps, comprising an accumulator settable with the dividend quantity, a counter circuit having denomination order networks of trigger circuits representing the divisor, means effective in the successive dividing steps for entering the divisors into successive groups of orders of the accumulator to ascertain the quotient, column shift means having successive column shift positions in the successive dividing steps to select the successive groups of orders to receive the divisor entries, means for applying pulses to the networks of trigger circuits to produce electrical manifestations of the represented digits, and means under control of said manifestations for controlling the divisor entering means according to the divisor digits.

5. Apparatus to perform division, including means representing a dividend quantity, means representing a divisor quantity, circuits for comparing the divisor quantity with the dividend portion in a selected group of orders of the dividend representing means to determine "go" or "no go," column shift means including an electronic commutator having a common pulse input and composed of a series of sequentially coupled electronic triggers sequentially reversed in electronic discharge status in response to pulses successively applied to said common input, a plurality of tube circuits, each rendered operative under control of a different one of said triggers in reversed status, for successively selecting different comparison groups of orders, electronic discharge means controlled by said circuits for producing alternative values of output potential selectively manifesting "go" and "no go," and a circuit network under control of said electronic discharge means according to the potential produced thereby for applying a pulse to said commutator to effect the sequential reversal of a next trigger.

6. Apparatus to divide a dividend by a divisor in successive dividing steps, comprising an accumulator set with the dividend and each order of which includes a counter circuit for performing a value advance in response to and in proportion to the number of pulses, plural order divisor representing means, means to transfer the divisor to successively lower order groups of orders of the accumulator in successive dividing steps to be compared with the dividend or dividend remainder portion in said groups of orders so as to evaluate the quotient, the transferring means including successive groups of pulse producers, each group producing pulses for the counter circuits in a related group of orders of the accumulator so as to transfer the divisor to this group of orders during a dividing step, means testing for "no go" in each dividing step, column shift means having successive column shift positions for selecting the successive groups of pulse producers for operation, means under control of said testing means for advancing the column shift means in position in consequence of "no go" during a dividing step, so as to start the next dividing step, and circuits coacting with the divisor representing means for controlling each group of pulse producers, as selected by the column shift means to produce numbers of pulses for the related group of orders of counter circuits, according to the divisor.

7. In apparatus selectively to perform dividing or multiplying computations, electronic tubes functioning in one of the computations to produce potentials controlling computing operations, other electronic tubes operable during the other of the computations to render the first named tubes ineffective, and means for operating said other electronic tubes during the performance of said other of the computations including a common control line for said other tubes, a source of potential, and means for selecting said other computation to be performed, to the exclusion of the computation controlled by the first mentioned tubes, by supplying suitable potential from said source to said control line such as to bring said other tubes into operation.

8. In apparatus to perform division or multiplication, column shift means including a counter circuit for counting the number of column shift steps, said counter circuit comprising a group of electronic discharge devices operable in response to pulsing of the counter circuit for advancing the count, means for pulsing the counter circuit including a pair of electronic tubes alternatively operable to control the pulsing means, and means for selectively conditioning said tubes for operation, according to whether multiplication or division is being performed.

9. Cyclical apparatus for performing multiplication or division in successive computing steps, comprising a result determining accumulator having in each order electronic trigger devices responsive to applied pulses for receiving a value entry, means for applying a dividend quantity to the accumulator for a dividing computation, means representing a divisor or multiplicand quantity, circuits selectively effective in successive computing steps for applying pulses under control of said representing means to selected orders of the electronic trigger devices so as to enter the represented quantity as a divisor during a dividing computation to be compared with the dividend portion in the selected orders and so as to enter the quantity as a multiplicand during multiplying computations, "no go" manifesting means operable during a dividing computation, means under control thereof for determining the number of cycles, in each dividing computing step, of application of the pulses by the selected circuits to the group of orders selected in the latter step, multiplier quantity representing means, and means effective during multiplication for controlling the number of cycles of pulse application, in each multiplying computing step, in accordance with a multiplier digit representation.

10. In a cyclical apparatus to perform division or multiplication in successive dividing or multiplying steps, a register having networks of electronic discharge devices selectively energized to represent a divisor quantity in division and a multiplicand quantity in multiplication, a result determining circuit system, and means to transfer the quantity in the register to the result forming circuit system each cycle in a dividing step and in a limited number of cycles in a multiplying step and including means to apply pulses each cycle in the dividing step to the networks to operate the electronic discharge devices for manifesting the digits of the divisor quantity and means effective in multiplication to limit the number of cycles of pulse application in a multiplying step in accordance with the value of a multiplier digit.

11. Cyclically operating apparatus to perform multiplication or division, including column shift means having successive column shift positions, no go detection means, a circuit coacting therewith for advancing the column shift means from one position to the next after a variable number of cycles during a dividing computation, depending on the relation between dividend and divisor terms, an electronic counter performing a counter cycle in each of similar series of a predetermined number of cycles of said apparatus, a circuit controlled by said counter once each counter cycle to advance the column shift means, and means for selectively conditioning the first or the second circuit for advancing the column shift means to be effective according to whether dividing or multiplying is performed.

12. Computing apparatus for performing multiplication or division, comprising storage means for divisor or multiplicand terms, a result determining accumulator, means for transferring either the divisor or multiplicand term from the storage means to selected orders of the accumulator, column shift means for controlling the selection of the term receiving orders of the accumulator and having successive column shift positions in each of which it selects different receiving orders, said column shift means including an electronic commutator for determining the column shift positions and comprised of a group of electronic discharge devices interrelated for operation by successive pulses to successive column shift determining places, means effective during the dividing computation for controlling the pulsing of said electronic commutator after each dividing step, and cyclically operating means alternatively controlling the pulsing of the electronic commutator during the multiplying computation.

13. In cyclically operating apparatus to perform a multiplying or dividing computation upon a pair of terms, a result forming accumulator having in each order a counter circuit provided with a plurality of electronic discharge tubes operated by pulses for receiving value entries, circuits for applying pulses to selected groups of the counter circuits to produce entries therein of a term of either computation, column shift means acting through said pulse applying circuits for selecting successive groups of counter circuits in successive column shift positions, and means conditioned during a multiplying computation for suppressing operation of the pulse applying circuits in the last column shift position.

14. Cyclical computing apparatus including a result forming accumulator for receiving entries in selected groups of orders during successive computing steps, each embracing a plurality of cycles, column shift means having successive shift positions in successive dividing steps for selecting the groups of orders to receive the entries, each order of the accumulator comprising a counter circuit responsive to pulses for receiving a value entry proportional to the number of applied pulses, and rounding off means comprising a pulse producer for producing a predetermined number of pulses for application to a sub-units result order of the accumulator, a circuit rendered effective by the column shift means in a single one of its column shift positions for enabling the pulse producer to operate during a cycle of the computing step defined by the position of the column shift means, means operating during said cycle for returning said enabling circuit to ineffective status after said predetermined number of pulses have been produced, and means thereafter maintaining said circuit ineffective during the remaining cycles of the latter computing step.

15. Cyclically operable apparatus including an accumulator for registering a result amount and having in each order a counting circuit with a plurality of electrical devices selectively energizable in response to pulses for receiving a value entry proportional to the number of applied pulses, in combination with rounding off means comprising means for applying a predetermined number of pulses to the counting circuit of the order below the order which is to register the units order digit of the result, a circuit for controlling the pulse applying means to restrict the number of pulses to the predetermined number during a cycle, and means for limiting the operation of the pulse applying means to a single cycle in each computation.

16. A machine comprising an accumulator having denominationally related orders of electronic discharge tubes selectively energized to represent digits of a notation and operable to produce the cumulative result of a succession of value entries, means to read out the result digits in a group of the orders, means simultaneously to enter a new value in another group of said orders, means to clear the latter group of orders prior to entry of the new value by so biasing the tubes of this group as to produce the energization thereof representative of zero, and means operable subsequently to the entry of the new value and the reading out operation for clearing the first mentioned group of orders by biasing the tubes thereof so as to produce the energization thereof representative of zero.

17. Calculating apparatus comprising electrical divisor storage means, an accumulator having orders of entry receiving networks registering a dividend or dividend remainder, each network including a series of electronic discharge devices coupled for interrelated operation by applied electric pulses to receive a value entry dependent on the number of applied pulses, circuits for transferring from the divisor storage means to the accumulator either the complement or true amount of the divisor, said circuits including means producing pulses for application to the networks of the accumulator and electrical control means including the divisor storage means for controlling the pulse producing means to produce numbers of pulses representative of the complement or numbers of pulses representative of the true amount of the divisor, a circuit testing the accumulator for "go" or "no go" of the divisor into the dividend or dividend remainder, and a true-complement circuit controlled selectively by the testing circuit according to "go" or "no go" for selectively conditioning said control means for complement or true amount entry control of the pulse producing means.

18. Calculating apparatus comprising electrical divisor storage means, an accumulator having orders of entry receiving networks registering a dividend or dividend remainder, each network including a series of electronic triggers coupled for interrelated operation by applied pulses to receive a value entry dependent on the number of applied pulses, cyclically operable circuits for transferring from the divisor storage means to the accumulator either the complement or true amount of the divisor, said circuits including means producing pulses for application to the networks of the accumulator and electrical control means, including the divisor storage means, conditionable selectively for controlling the pulse producing means to produce numbers of pulses representative of the divisor complement or, alternatively, numbers of pulses representative of the true divisor amount, a circuit testing the accumulator for a complement or true balance, and a true-complement circuit selectively controlled by said testing circuit for continuing said electrical control means in complement transfer control of the pulse producing means as long as the testing circuit detects a true balance and for conditioning the electrical control means for true divisor amount transfer control of the pulse producing means following detection by the testing circuit of a complement balance.

19. In calculating apparatus having divisor registering means, an accumulator registering a dividend or dividend remainder, and cyclically operable circuits coacting with the divisor registering means and alternatively conditionable for transferring the divisor to the accumulator either in the same or opposite sign sense to the dividend; an electronic discharge switch operatively connected to the circuits and having either of two, alternative electrical states, in a first of which the switch maintains the circuits effective for transferring the divisor in opposite sign sense to the dividend into the accumulator and in the other of which the switch conditions the circuits to transfer the divisor in the same sign sense as the dividend into the accumulator, an electronic valve circuit comprising reversing means for said switch, cyclically operating means for applying potential, each cycle of divisor transfer, to said valve circuit for potentially reversing the electronic switch from its first state to the other state, and a circuit testing the accumulator, in each cycle of transfer of the divisor in opposite sign sense to the dividend, for a balance of the same sign sense as the dividend and upon detecting such balance applying potential to the valve circuit counteracting the effect of the cyclically applied potential, so as to prevent reversal of the electronic switch.

20. In calculating apparatus having divisor registering means, an accumulator registering a dividend or dividend remainder, and cyclically operable circuits coacting with the divisor registering means and alternatively conditionable for transferring either the complement or true amount of the divisor to the accumulator; an electronic trigger operatively connected to said circuits and having a first electrical status for conditioning said circuits to produce complement transfer and having a reverse electrical status for conditioning said circuits to produce true amount transfer, an electronic valve circuit comprising reversing means for said trigger, means for cyclically pulsing said valve circuit so as to tend therethrough to reverse said trigger, and a circuit cyclically testing the accumulator for a true balance and thereupon applying potential to the valve circuit for blocking it from reversing said trigger.

21. Calculating apparatus comprising multi-order divisor registering means, accumulating means settable in suitable orders with a dividend or dividend remainder, each order of each said means including a network of electronic discharge devices selectively energized to represent a value and coupled for value advance in response to successively applied electrical pulses, such network of the divisor registering means generating an output pulse upon progressing to a limit value, cyclic means to apply electrical pulses to the networks of the divisor registering means to effect a cycle of value advance of each of the latter networks during which each of these networks generates its output pulse at a differential cyclic time representative of the registered divisor digit, pulse producing circuits connected to divisor receiving orders of the accumulating means, electrical control means receiving the output pulses representative of the divisor and selectively conditionable to control the pulse producing circuits for supplying to the divisor receiving orders of the accumulating means numbers of pulses for entering the complement of the divisor therein or, alternatively, numbers of pulses for entering the true amount of the divisor therein, a circuit for testing the accumulating means for "go" or "no go" of the divisor into the dividend or dividend remainder, and circuit means controlled by the testing circuit for selectively conditioning said electrical control means, depending on "go" or "no go" detection by the testing circuit.

22. Calculating apparatus as defined in claim 21, the networks of the accumulating means also functioning, each, to generate an output pulse upon advancing from one limit digit to another, and said testing circuit including an electronic switch controlled by the output pulse from the highest order of the divisor receiving orders of the accumulating means for applying control potential to said circuit means.

23. Calculating apparatus comprising multi-order electrical registering means for a divisor, an accumulator having denominationally ordered networks settable with a dividend or dividend remainder, each network being composed of a series of electronic valves coupled for value advance in response to successively applied electrical pulses, means for cyclically transferring the divisor or its complement from the divisor registering means to a selected group of orders of the accumulator, said transferring means including groups of pulse producers respectively electrically connected to successively lower order groups of the accumulator orders, column shift circuit means having successive column shift positions to condition one group after another of the pulse producers to function so as to select successively lower order groups of the accumulator orders to receive the divisor or its complement, a true-complement network having either a "complement" status or a "true" status, cyclically operating readout circuits intermediate the orders of the divisor registering means and each group of pulse producers and controlled by the divisor registering orders, in each cycle, according to the divisor digits registered therein and further controlled by the true-complement network according to its status for enabling the conditioned group of pulse producers to supply, in each cycle, to the associated group of accumulator orders numbers of pulses representative of the complement of the divisor or, alternatively numbers of pulses representative of the true value of the divisor, a circuit cyclically testing the accumulator for "go" or "no go" of the divisor into the dividend or dividend remainder, and electrical means coacting with the testing circuit for determining the status of the true-complement network.

24. Calculating apparatus as defined in claim 23, the last named electrical means reversing the true-complement network from one status to the other upon the testing circuit detecting "no go" during a cycle so as to condition the transferring means for transferring the divisor during the next cycle in opposite sign sense to the divisor transfer effected in the preceding cycle, said electrical means returning the true-complement network to its former status during said next cycle, and a circuit thereupon controlled by the true-complement network for advancing the column shift circuit means to its next column shift position.

25. Computing apparatus including an accumulator registering a first amount and provided with carry means denominationally relating its orders, means for effecting repetitive entries of a second amount into the accumulator orders to produce, with the aid of the carry means, successive balances in the accumulator, the carry means of the highest order including a circuit with an output line varied in potential depending on whether or not said highest order exceeds its capacity, and a control circuit for said repetitive entry means operatively connected to said output line, to be selectively controlled according to the potential on said line, for selectively controlling said means.

26. Computing apparatus including an accumulator registering a first amount and provided with carry means denominationally relating its orders, means for effecting repetitive entries of a second amount into a group of the accumulator orders to produce successive balances in the accumulator, the carry means of the highest order including an electronic trigger reversed in electrical status by this highest order upon exceeding its capacity, an electronic tube circuit operatively connected to said trigger to experience a change in output potential under control of said trigger in its reversed status, and a control network for said repetitive entry means and selectively operating under control of said tube circuit, according to whether this circuit does or does not experience a change in output potential.

27. Dividing apparatus including an accumulator registering a dividend term in a number of orders, carry means to produce carries from lower to higher orders, divisor registering means, operating circuits controlled by the divisor registering means according to the divisor term and selectively conditioned for entering either the complement or true value of the divisor term into the accumulator orders, a true-complement network having a first electrical status conditioning said operating circuits to enter the divisor complement, with the carry means in the highest order of the accumulator functioning to produce a quotient entry upon the formation of each true remainder following an entry of the divisor complement, means testing for a complement remainder, a circuit rendered effective thereby in consequence of its detecting a complement remainder for operating the true-complement network to a reverse electrical status in which it conditions the operating circuits for entering the true value of the divisor into said accumulator so as to restore the previous true remainder, and a circuit controlled by the true-complement network for suppressing quotient-producing carry operation by the carry means of the highest order upon the restoration of said previous true remainder.

28. Apparatus to effect division in a succession of dividing steps, comprising an accumulator registering a dividend, means to subtractively enter a divisor amount into successively lower order groups of the accumulator orders during the successive dividing steps, a plurality of electronic discharge devices, one for each said groups, a column shift network having successive positions during the successive dividing steps to select the successively lower order groups for receiving the divisor amount, said column shift network having a plurality of circuit lines, each effective in a different column shift position to apply conditioning potential to the electronic discharge device associated with the group of orders selected in the same column shift position, and circuit means effective under control of the selected group upon the formation of a true remainder for applying further potential to the electronic discharge device for said group to serve in conjunction with the conditioning potential for operating the electronic discharge device to manifest "go" of the divisor into the dividend or dividend remainder.

29. Apparatus as defined in claim 28, said circuit means including an electronic trigger reversed by the highest order upon said order exceeding its capacity and a circuit rendered effective by the trigger in reversed state for applying said further potential to the conditioned electronic discharge device.

30. Apparatus as defined in claim 28, and an electronic tube circuit having a common connection to said electronic discharge devices to be controlled similarly therethrough by any of said conditioned devices for advancing the column shift means to its next position upon occurrence of "no go" in the selected group of orders.

31. Apparatus to perform division in successive dividing steps, comprising an accumulator having ordered networks registering a dividend and subsequent dividend remainders, each network being composed of a series of electronic triggers coupled for entry receiving operation in response to and according to a number of applied pulses, divisor representing means, circuits for transferring the divisor in successive dividing steps into successively lower order groups of the accumulator orders for comparison with the dividend and dividend remainders during correspondingly successive dividing steps, said transferring circuits including groups of pulse producing tubes, each group electrically connecting the respective orders of the divisor representing means to a different group of accumulator orders to supply entry effecting pulses to said orders in numbers determined by the divisor in the representing means, a column shift network including an electronic counter for the dividing steps and composed of a series of electronic discharge devices differently energized in each count position of the counter and coupled for changes in energization, to advance the count position, in response to electrical pulses successively applied to the counter, a plurality of output circuits sequentially rendered effective by said counter in its sequential count positions, each output circuit being commonly connected to one said tube group to enable this group to produce said entry effecting pulses, a circuit testing the accumulator for "go" or "no go" of the divisor into the dividend or dividend remainder, and circuit means effective under control of the testing circuit following its detection of "no go" for applying a pulse to the electronic counter to advance its count position.

32. Apparatus selectively to perform multiplying and dividing computations, including value entry receiving means and means to effect value entries of different kinds into said receiving means, a circuit network controlling entry operations in both computations and including electronic switching means having one electrical condition for controlling the entry effecting means to effect entries of one kind and having an alternative electrical condition to control the entry effecting means for effecting entries of another kind, circuit means functioning in both computations for attempting to reverse the condition of the electronic switching means, and a blocking circuit including an electron tube biased during the dividing computation to ineffective blocking control over the switching means and differently biased during the multiplying computation to block reversal of the switching means.

33. Apparatus to effect multiplying or dividing computations, comprising an accumulator with entry receiving orders and associated carry means, said accumulator registering a dividend during a dividing computation and receiving additive and subtractive divisor entries for algebraic accumulation with the dividend to determine the quotient, said accumulator receiving partial products during a multiplying computation and accumulating them to form the product, circuits selectively conditionable to effect additive or subtractive entries into the accumulator, an electronic discharge circuit having either of two, alternative states, one for conditioning the entry circuits for making additive entries and the other for conditioning the entry circuits to make subtractive entries, a "go" and "no go" detecting circuit operated by the carry means during multiplying or dividing computations, means joining with the detecting circuit for attempting to reverse the electronic discharge circuit from one status to the other and back again according to operations of the carry means during algebraic accumulation of the dividend and divisor entries during a dividing computation and of the partial products during a multiplying computation, operations of the carry means during dividing computation being selectively indicative of "go" and "no go" according to the signs of algebraic balances and being effective during multiplication to produce product carry entries, a blocking circuit coupled to the electronic discharge circuit and biased during dividing computation to allow the electronic discharge means to be reversed in status by said means joining with the detecting circuit, according to "go" and "no go" conditions, and means biasing the blocking circuit during the multiplying computation to block the reversal of the electronic discharge circuit from one chosen status in which it conditions said entry circuits for making only partial product entries of one sign.

34. Computing apparatus including an accumulator for registering the result of a computation and having denominational orders of counting circuits, each comprising a plurality of electronic triggers selectively switched in status in response to pulses for receiving a value entry proportional to the number of applied pulses, in combination with rounding off means comprising means for applying rounding off pulses to a counting circuit in an order below the order for registering the lowest order digit of the result, a source of input pulses, electronic discharge means for operating in response to these input pulses to supply a predetermined plurality of rounding off pulses to said applying means, and a circuit operable once during a computation for bringing said electronic discharge means into responsive operation to the input pulses.

35. Computing apparatus including an accumulator for registering the result of a computation and having denominational orders of counting circuits, each comprising a plurality of electronic triggers selectively switched in status in response to pulses for receiving a value entry proportional to the number of applied pulses, in combination with rounding off means comprising a circuit network conditionable for response to input pulses to produce and supply a predetermined plurality of rounding off pulses to a subunits result order counting circuit of the accumulator, electronic switching means having a normal status for de-conditioning said network from response to the input pulses, a circuit operating once in a computation to reverse the status of the electronic switching means to a status for conditioning said network to operate in response to the input pulses to produce the rounding off pulses, and means for restoring said electronic switching means to its normal status when the network has produced the predetermined plurality of rounding off pulses.

36. A cylically operating dividing machine having means to sense a record, while in motion during a portion of a cycle, for a represented dividend means to record a quotient on a record on its travel through the recording means in a similar portion of the cycle, mechanism feeding a record past the sensing means and after an intervening fractional cycle period feeding it through the recording means, whereby such record is sensed in one cycle and recorded on in the next cycle and whereby in the same cycle one record is sensed while a preceding record is recorded on, in combination with an accumulator having orders of electronic entry receiving and accumulating elements and electronic carry means denominationally relating the orders, circuits controlled by the sensing means during said portion of a cycle for entering the dividend represented on a record into a lower order group of orders of the accumulator, electronic dividing means operating within said fractional cyclic period for effecting divisor entries into the accumulator to be algebraically accumulated with the dividend and dividend remainders so as to produce successive quotient entries into a higher order group of accumulator orders, circuits for reading out the quotient from said higher order group to operate the recording means for recording the quotient on the record during said portion of the next cycle, cyclic means operating within said fractional cyclic period, following completion of division, for zeroizing the lower order group of accumulator orders to condition this group for receiving the dividend entry from a following record during the recording of the quotient on the preceding record, and means acting during said fractional cyclic period, preceding the dividing computation, for zeroizing the higher order group of accumulator orders, whereby a record is sensed and a dividend represented therein is entered into the lower order group of accumulator orders during said portion of a cycle while the previously computed quotient is being read out of the higher order group and being recorded, after which the higher order group is zeroized, the dividing computation performed, and the lower order group zeroized prior to the beginning of the next such portion of a cycle.

37. Apparatus to perform division or multiplication and including a common accumulator to register a dividend and its remainders and to receive additive and subtractive divisor entries during successive dividing steps to be compared with the dividend and dividend remainders for ascertaining the quotient digits, said accumulator receiving partial product entries during successive multiplying steps to produce the product digits, common entry circuits, including electrical routing elements operated in successive dividing or multiplying steps to route the entries into successive groups of accumulator orders, for effecting the divisor entries or the partial product entries, a control circuit having alternative electrical states respectively controlling said entry circuits for making additive or subtractive entries, a column shift circuit having sequential electrical positions in the successive multiplying or dividing steps to render the routing elements effective in successive steps to route entries into successive groups of accumulator orders, "no go" detecting means operating during division for reversing the control circuit to change the condition of the entry circuits, a tube circuit ineffective to block reversal of the control circuit during division, an electronic circuit coacting with the control circuit for advancing the column shift circuit at the end of each dividing step, a second electronic circuit, ineffective during division, for advancing the column shift circuit at the end of each multiplying step, a common circuit line upon which a change of potential is produced in preparation for the multiplying computation, a circuit connected to said line for applying the effect of the change of potential thereon to said tube circuit to bias this circuit for blocking reversal of said control circuit, so as to maintain the entry circuits in condition for making partial product entries of only one sign, and a circuit connected to said line for applying the effect of the change of potential thereon to said second electronic circuit to condition the latter for operation to advance the column shift means at the end of each multiplying step.

38. Computing apparatus including an electronic accumulator having in each order electronic discharge tubes interrelated for operation to receive a digit entry, means for applying a first amount to suitable orders of the accumulator, electronic means for applying to selected orders of the accumulator the complement of another amount, repeatedly, to be algebraically accumulated with digits of the first amount and of the successive remainders, electronic means for detecting a complement remainder and means under control thereof for interrupting complement entering.

39. Computing apparatus including an electronic accumulator having in each order electronic discharge tubes interrelated for operation to receive a digit entered, means for applying to selected orders of the accumulator another amount in opposite sign sense to the first amount sign sense respectively so as to produce therein successive balances, a circuit for maintaining said applying means in operation to apply said other amount in said opposite sign sense into the selected order, electronic means for disabling the circuit from maintaining the applying means in operation and electronic means coacting with the accumulator for enabling said disabling means to be effective upon a balance of said opposite sign sense being produced in the accumulator.

40. In apparatus to divide a dividend term by a divisor term, an accumulator registering the dividend term in a lower order of the accumulator, circuits for producing carries from lower to higher orders, means for effecting over and over subtraction of the divisor term from the portion of the dividend or dividend remainder, in a group of orders, to produce successive remainders with the carry circuit of the highest order, of said groups, operative upon formation of each positive remainder to produce a quotient entry in an order, to the left of said highest order, and a control circuit conditioned in one sense by the carry circuit of said highest order of the group upon producing a quotient entry for maintaining said subtracting means effective to continue subtraction of the divisor term and conditioned in an alternative sense by the latter carry circuit in the absence of a quotient entry for bringing about termination of the over and over subtraction of the divisor from said dividend or dividend remainder.

41. A computing device including electronic computing elements, electronic control elements regulating the pattern of operation of said computing elements in a series of steps of a computation to produce an end result, electronic means comprising an electron valve circuit operative to either of two alternative electrical states controlled by said computing elements to produce by operation to one state an electrical manifestation indicative of the algebraic sign of a step result said state maintaining said electronic control elements in their initial pattern upon production of said one state indicative of one algebraic sign and operative to alter their pattern upon production of the other state indicative of the opposite algebraic sign.

42. A device as in claim 41, said pattern of operation initially comprising repeated similar steps of operation and said alteration of pattern comprising one step change in the repeated steps of operation.

43. A device as in claim 42, said alteration in pattern further comprising a return to the initial pattern subsequent to said one step change.

44. An electronic calculator comprising a series of orders each including electronic trigger elements, said elements, per order, being less in number than the radix employed, pulse producing means controlled to produce pulses whose numbers are representative of the value of a digit to be entered in any selected order, means for selecting an order or orders to receive a number of pulses indicative of a digit to be entered therein, said digit being represented in said order by the pattern of electrical conditions assumed by said trigger elements, means for producing impulses indicative of another digit and means for applying said pulses to a selected order or orders to diminish the value entry indication repeatedly in steps in said chosen orders and means for counting the number of steps to reduce the initial entry to zero or less.

45. A device as in claim 44, said device including means for applying said other digit pulses to the selected order or orders to increase the value during one step subsequent to reduction of the initial entry to less than zero.

46. A device as in claim 45, and including means for column shifting the entries of said other digit pulses upon said last increase in value of the initial entry.

47. In combination, an electronic calculator, a cyclically operable recorder, one electronic timer, another electronic timer controlled by said first, means controlled by said recorder for initiating operation of said first timer, and means controlled by said other timer for stopping said first timer invariably at a chosen step of its cyclical operation, upon completion of operation of said other timer.

ARTHUR H. DICKINSON.
    BYRON E. PHELPS.
    CARL A. BERGFORS.

REFERENCES CITED

The following references are of record in the file of this patent:

UNITED STATES PATENTS

| Number | Name | Date |
|---|---|---|
| 2,209,434 | Umhauer | July 30, 1940 |
| 2,217,196 | Bryce et al. | Oct. 8, 1940 |
| 2,359,631 | Dickinson | Oct. 3, 1944 |
| 2,361,996 | Dickinson | Nov. 7, 1944 |
| 2,364,540 | Luhn | Dec. 5, 1944 |
| 2,369,662 | Deloraine et al. | Feb. 20, 1945 |
| 2,386,481 | Lang | Oct. 9, 1945 |
| 2,398,771 | Compton | Apr. 23, 1946 |
| 2,402,988 | Dickinson | July 2, 1946 |
| 2,403,873 | Mumma | July 9, 1946 |
| 2,404,697 | Desch et al. | July 23, 1946 |
| 2,442,428 | Mumma | June 1, 1948 |
| 2,502,360 | Williams | Mar. 28, 1950 |

FOREIGN PATENTS

| Number | Country | Date |
|---|---|---|
| 476,935 | Great Britain | Apr. 26, 1937 |

OTHER REFERENCES

Potter, "A Four-Tube Counter Decade," Electronics, June 1944; pages 110–113, 358 and 360.

Electronic Counters, Grosdoff, RCA Review, Sept. 1946; page 445, Figure 12.